United States Patent
Omasa

(10) Patent No.: US 7,964,104 B2
(45) Date of Patent: Jun. 21, 2011

(54) ACTIVE ANTISEPTIC WATER OR ACTIVE WATER-BASED FLUID, AND PRODUCTION METHOD AND APPARATUS FOR THE SAME

(75) Inventor: Ryushin Omasa, Fujisawa (JP)

(73) Assignee: Japan Techno Co., Ltd., Tokyo (JP)

(*) Notice: Subject to any disclaimer, the term of this patent is extended or adjusted under 35 U.S.C. 154(b) by 1180 days.

(21) Appl. No.: 10/553,525

(22) PCT Filed: Apr. 14, 2004

(86) PCT No.: PCT/JP2004/005324
§ 371 (c)(1),
(2), (4) Date: Dec. 29, 2006

(87) PCT Pub. No.: WO2004/096432
PCT Pub. Date: Nov. 11, 2004

(65) Prior Publication Data
US 2008/0050471 A1    Feb. 28, 2008

(30) Foreign Application Priority Data
May 2, 2003    (JP) .................. 2003-127451

(51) Int. Cl.
*C02F 1/32* (2006.01)
*C02F 1/34* (2006.01)
(52) U.S. Cl. ............ 210/748.01; 422/186.3; 422/66
(58) Field of Classification Search ............ 210/748.01; 422/22, 23, 24, 28, 29
See application file for complete search history.

(56) References Cited

U.S. PATENT DOCUMENTS

| | | | |
|---|---|---|---|
| 5,375,926 A | 12/1994 | Omasa | |
| 5,875,384 A | 2/1999 | Peill et al. | |
| 6,468,428 B1 * | 10/2002 | Nishii et al. | 210/497.3 |
| 6,605,252 B2 | 8/2003 | Omasa | |
| 2001/0053332 A1 * | 12/2001 | Omasa | 422/22 |

FOREIGN PATENT DOCUMENTS

| | | |
|---|---|---|
| EP | 1 151 757 A1 | 11/2001 |
| JP | 62-14777 | 1/1987 |
| JP | 62-14777 A | 1/1987 |
| JP | 3-275130 | 12/1991 |

(Continued)

OTHER PUBLICATIONS

Patent Abstracts of Japan, Publication No. 62-014777; Publication Date: Jan. 23, 1987; in the name of Miyazaki et al.

(Continued)

*Primary Examiner* — Walter D Griffin
*Assistant Examiner* — Cameron J Allen
(74) *Attorney, Agent, or Firm* — Christie, Parker & Hale, LLP.

(57) ABSTRACT

A method which comprises using a treatment apparatus comprising (1) a treatment tank, (2) a vibrating stirrer disposed inside the treatment tank, (3) a photocatalyst layer or a layer comprising a photocatalyst and a bactericidal metal, disposed on any surface inside the treatment tank, and (4) a light irradiator; placing water or a water-containing fluid to be treated in the treatment tank; carrying out the steps of (i) transmitting vibration between 10 and 200 Hz to a vibration vane by a vibration generator to causing the vibration vane to vibrate at an amplitude of 0.01 to 15 mm, and (ii) irradiating the photocatalyst or the layer comprising a photocatalyst and a bactericidal metal with light.

22 Claims, 30 Drawing Sheets

FOREIGN PATENT DOCUMENTS

| | | |
|---|---|---|
| JP | 6-220697 | 8/1994 |
| JP | 6-280035 | 10/1994 |
| JP | 6-287799 | 10/1994 |
| JP | 6-304461 | 11/1994 |
| JP | 6-312124 | 11/1994 |
| JP | 6-330395 | 11/1994 |
| JP | 7-54192 | 2/1995 |
| JP | 7-126896 | 5/1995 |
| JP | 7-185340 | 7/1995 |
| JP | 7-185340 A | 7/1995 |
| JP | 8-173785 | 7/1996 |
| JP | 8-281272 | 10/1996 |
| JP | 9-40482 | 2/1997 |
| JP | 10-43569 | 2/1998 |
| JP | 10-309453 | 11/1998 |
| JP | 11-189880 | 7/1999 |
| JP | 11-253782 | 9/1999 |
| JP | 2000-263049 | 9/2000 |
| JP | 2000-263049 A | 9/2000 |
| JP | 2000-317295 | 11/2000 |
| JP | 2001-288591 | 10/2001 |
| JP | 2002-47936 | 2/2002 |
| JP | 2002-191680 | 7/2002 |
| JP | 2002-210341 | 7/2002 |
| JP | 2002-282669 | 10/2002 |
| JP | 2004-8093 | 1/2004 |
| WO | WO 01/83385 A2 | 11/2001 |
| WO | WO 02/09774 A1 | 2/2002 |
| WO | WO 02/092514 A2 | 11/2002 |
| WO | WO 03/000395 A1 | 1/2003 |
| WO | WO 03/037504 A1 | 5/2003 |

OTHER PUBLICATIONS

Patent Abstracts of Japan, Publication No. 03-275130; Publication Date: Dec. 5, 1991; in the name of Omasa.
Patent Abstracts of Japan, Publication No. 06-220697; Publication Date: Aug. 9, 1994; in the name of Omasa.
Patent Abstract of Japan, Publication No. 06-280035; Publication Date: Oct. 4, 1994; in the name of Omasa.
Patent Abstracts of Japan, Publication No. 06-287799; Publication Date: Oct. 11, 1994; in the name of Omasa.
Patent Abstracts of Japan, Publication No. 06-304461; Publication Date: Nov. 1, 1994; in the name of Omasa.
Patent Abstracts of Japan, Publication No. 06-312124; Publication Date: Nov. 8, 1994; in the name of Omasa.
Patent Abstracts of Japan, Publication No. 06-330395; Publication Date: Nov. 29, 1994; in the name of Omasa.
Patent Abstracts of Japan, Publication No. 07-054192; Publication Date: Feb. 28, 1995; in the name of Omasa.
Patent Abstracts of Japan, Publication No. 07-126896; Publication Date: May 16, 1995; in the name of Omasa.
Patent Abstracts of Japan, Publication No. 07-185340; Publication Date: Jul. 25, 1995; in the name of Yamagata.
Patent Abstracts of Japan, Publication No. 08-173785; Publication Date: Jul. 9, 1996; in the name of Omasa.
Patent Abstracts of Japan, Publication No. 08-281272; Publication Date: Oct. 29, 1996; in the name of Omasa.
Patent Abstracts of Japan, Publication No. 09-040482; Publication Date: Feb. 10, 1997; in the name of Omasa.
Patent Abstracts of Japan, Publication No. 10-043569; Publication Date: Feb. 17, 1998; in the name of Omasa.
Patent Abstracts of Japan, Publication No. 10-309453; Publication Date: Nov. 24, 1998; in the name of Omasa.
Patent Abstracts of Japan, Publication No. 11-189880; Publication Date: Jul. 13, 1999; in the name of Omasa.
Patent Abstracts of Japan, Publication No. 11-253782; Publication Date: Sep. 21, 1999; in the name of Omasa.
Patent Abstracts of Japan, Publication No. 2000-263049; Publication Date: Sep. 26, 2000; in the name of Uemitsu et al.
Patent Abstracts of Japan, Publication No. 2000-317295; Publication Date: Nov. 21, 2000; in the name of Omasa.
Patent Abstracts of Japan, Publication No. 2001-288591; Publication Date: Oct. 19, 2001; in the name of Omasa.
Patent Abstracts of Japan, Publication No. 2002-191680; Publication Date: Jul. 9, 2002; in the name of Omasa.
Patent Abstracts of Japan, Publication No. 2002-210341; Publication Date: Jul. 30, 2002; in the name of Omasa.
Patent Abstracts of Japan, Publication No. 2002-282669; Publication Date: Oct. 2, 2002; in the name of Omasa.
Patent Abstracts of Japan, Publication No. 2004-008093; Publication Date: Jan. 15, 2004; in the name of Omasa.
Bundesminiisteriums der Justiz: "Verordnung uber die Qualitat von Wasser fur den menschlichen Gebrauch"; May 21, 2001; 28pp. (Plus 31 pages of machine translation).
Supplemental European Search report for corresponding European Patent Application No. 04727390.9; dated Nov. 17, 2009; 7pp.
English translation of Japan Publication JP 2002-47936, dated Feb. 15, 2002, in the name of Hiroshi Fukushi listed above.
Japanese Office action dated May 7, 2008, for priority Japanese application 2003-127451, with English translation indicating relevance of references listed in an IDS filed on Jan. 31, 2007.
Japanese Office action dated Jul. 30, 2008, for priority Japanese application 2003-127451, with English translation indicating relevance of reference listed in this IDS.
International Search Report dated Sep. 7, 2004, of Corresponding PCT/JP2004/005324.

* cited by examiner

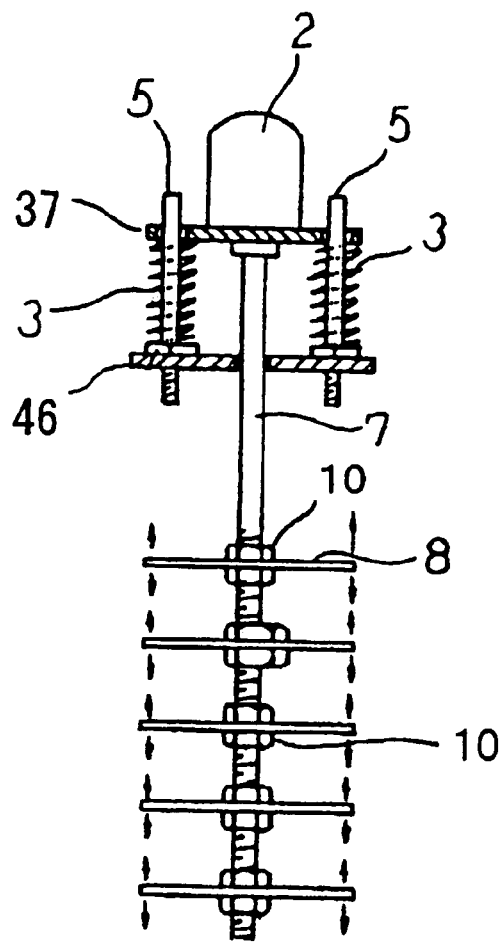
FIG.5
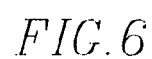
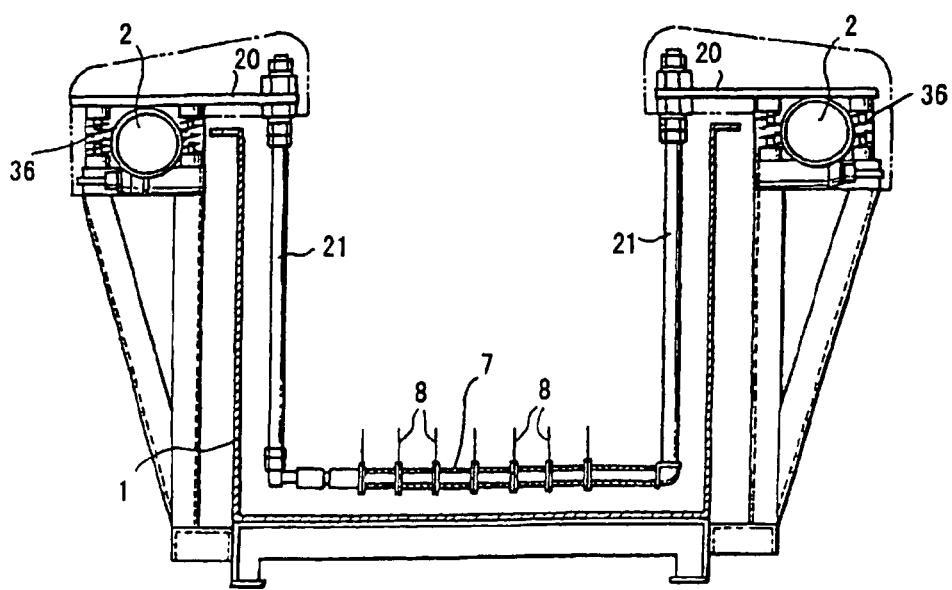
FIG.6

ACTIVE ANTISEPTIC WATER OR ACTIVE WATER-BASED FLUID, AND PRODUCTION METHOD AND APPARATUS FOR THE SAME

CROSS-REFERENCE TO RELATED APPLICATION

This application is a National Phase Patent Application of International Application Number PCT/JP2004/005324, filed on Apr. 14, 2004, which claims priority of Japanese Patent Application Number 2003-127451, filed on May 2, 2003.

BACKGROUND OF THE INVENTION

1. Field of the Invention

The present invention relates to the antisepticization and activation of drinking water, cooking water, juice water, tea (including coffee, black tea, cocoa, and oolong tea) water, alcoholic beverage water, juices, teas (including coffee, black tea, cocoa, and oolong tea), and alcoholic beverages; soy sauce, mirin (Japanese sweet cooking wine), and other brewed products; tomato ketchup; flower arrangement water; water used for cleaning and disinfecting hospitals and the like; water used in stock raising, feeding, agriculture and forestry, fisheries, and the like (water for raising aquatic animals and water for raising fish, for example); and other types of water, and to water-based fluids containing such water. The present invention also relates to a method and apparatus for breaking down, reducing, or removing trihalomethanes, dioxins, and other organic halogen compounds from water (tap water, for example) that contains halogen ions (chlorine ions), and water (well water, wastewater, and the like) that contains trihalomethanes, dioxins, and other organic halogen compounds, and to removing halogens (chlorine, in particular). As used herein, the term "activation" refers to the process of activating humans, animals, and plants that require water.

2. Description of the Related Art

Nitrite and/or sulfite is conventionally known to be added in small amounts to preserve water, wine, and other food products that contain water. However, drinks to which these preservatives have been added may degrade in quality and may cause nausea and other side effects when ingested in large quantities.

Nitrate ions are contained in rainwater (0.2 to 0.4 mg/L), upstream water of rivers and streams (0.2 to 1 mg/L), and downstream water (2 to 6 mg/L). Conversely, even if the water is groundwater that does not contain ammoniac nitrogen, for example, when the water makes contact with air above ground, the water rapidly absorbs ammonia in the air and comes to contain about 1 to 3 ppm of ammoniac nitrogen. Japan's rivers and streams also contain an average of 10 to 15 mg/L of $SO_4$. In the case of tap water, since natural water containing about 1 to 3 ppm of ammoniac nitrogen is treated with chlorine, the nitrogen component in tap water is not present as ammoniac nitrogen, but is present in about the same concentration as sulfuric nitrogen.

Trihalomethanes, which are created in a reaction between disinfectant chlorine used for treating and/or sterilizing tap water and small amounts of organic substances present in water, are highly toxic to the human body, and are difficult to inexpensively break down or remove from water. Dioxins that are contained in well water and wastewater are furthermore particularly difficult to break down or remove.

SUMMARY OF THE INVENTION

A first object of the present invention is to provide a novel water, more specifically, active antiseptic water and a water-based fluid containing the water, without the addition of a synthetic preservative, having antiseptic ability equivalent to or greater than the same and having activating ability with respect to living organisms, by effectively using nitrogen components and/or sulfur components that are naturally present in tap water and natural water (effectively using components that are present in the form of $NO_3^-$ ions and $SO_4^{2-}$ ions as $NO_2^-$ ions and $SO_3^{2-}$ ions); and to provide a production method and device for the same. A second object of the present invention is to provide a method and device that breaks down, reduces, or removes trihalomethanes, dioxins, and other organic halogen compounds from water (tap water, for example) containing halogen ions (chlorine, for example), and that removes halogens (chlorine, in particular).

A first aspect of the present invention relates to active antiseptic water containing 0.08 to 0.5 mg/L of nitrite ions and/or sulfite ions, and substantially containing no chlorine.

A second aspect of the present invention relates to an active antiseptic water-based fluid containing 0.08 to 0.5 mg/L of nitrite ions and/or sulfite ions, and substantially containing no chlorine.

A third aspect of the present invention relates to the active antiseptic water-based fluid according to claim 2, wherein the active antiseptic water-based fluid is sake.

A fourth aspect of the present invention relates to the active antiseptic water-based fluid according to claim 2, wherein the active antiseptic water-based fluid is wine.

A fifth aspect of the present invention relates to the active antiseptic water-based fluid according to claim 2, wherein the active antiseptic water-based fluid is juice.

A sixth aspect of the present invention relates to a production method for the active antiseptic water or active antiseptic water-based fluid according to any of claims 1 to 5, which comprises using a treatment apparatus having (1) a treatment tank, (2) a vibrating stirrer disposed inside the treatment tank, (3) a photocatalyst layer or a layer having a photocatalyst and a bactericidal metal, disposed on any surface inside the treatment tank, and (4) a light irradiator for emitting light to the photocatalyst layer or the layer having a photocatalyst and a bactericidal metal, disposed inside and/or outside the treatment tank; placing water or a water-containing fluid to be treated (water-based fluid, including a fluid in the form of a paste) in the treatment tank; and carrying out the steps of (i) generating a desired vibration between 10 and 200 Hz in a vibration vane by using a vibration generator, and transmitting the vibrations to the vibration vane to cause the vibration vane to vibrate at an amplitude of 0.01 to 15 mm, and (ii) breaking down, reducing, or removing halogen components in the water and converting the nitrogen components contained in the water into nitrite ions, and/or sulfur components into sulfite ions, by irradiating the photocatalyst or the photocatalyst and bactericidal metal with light for 30 minutes or longer. The nitrogen components and the sulfur components are essentially nitrate ions and sulfate ions.

A seventh aspect of the present invention relates to a production method for active antiseptic water or an active antiseptic water-based fluid according to any of claims 1 to 5, which comprises using (1) a treatment tank, (2) a vibrating stirrer disposed inside the treatment tank, (3) a photocatalyst layer or a layer having a photocatalyst and a bactericidal metal, disposed on any surface inside the treatment tank, (4) a light irradiator for emitting light to the photocatalyst layer or the layer having a photocatalyst and a bactericidal metal, disposed inside and/or outside the treatment tank, and (5) a magnetic force generation member disposed inside the treatment tank; placing water or a water-containing fluid to be treated (water-based fluid, including a fluid in the form of a paste) in the treatment tank; and carrying out the steps of (i) generating a desired vibration between 10 and 200 Hz in a vibration vane by using a vibration generator, and transmitting the vibrations to the vibration vane to cause the vibration vane to vibrate at an amplitude of 0.01 to 15 mm, and (ii) breaking down, reducing, or removing halogen components in the water and converting the nitrogen components contained in the water into nitrite ions, and/or sulfur components into sulfite ions by irradiating the photocatalyst or the photocatalyst and bactericidal metal with light for 30 minutes or longer.

An eighth aspect of the present invention relates to a production method for active antiseptic water or an active antiseptic water-based fluid according to any of claims 1 to 5, which comprises using as the vibrating stirrer (a) a vibration generator, (b) a vibration rod connected to the vibration generator or a linkage section between the vibration generator and the vibration rod, (c) at least one vibration vane fixed to the vibration rod, and (d) a vibration vane-fixing member; placing water or a water-containing fluid to be treated (water-based fluid, including a fluid in the form of a paste) in the treatment tank; and carrying out the steps of (i) generating a desired vibration between 10 and 200 Hz in the vibration vane by using the vibration generator and transmitting the vibrations to the vibration vane to cause the vibration vane to vibrate at an amplitude of 0.01 to 15 mm, and (ii) breaking down, reducing, or removing halogen components in the water and converting the nitrogen components contained in the water into nitrite ions, and/or sulfur components into sulfite ions by irradiating the photocatalyst or the photocatalyst and bactericidal metal with light for 30 minutes or longer.

A ninth aspect of the present invention relates to a production method for active antiseptic water or an active antiseptic water-based fluid according to any of claims 1 to 5, which comprises using as the vibrating stirrer an insulated vibrating stirrer having (a) a vibration generator, (b) a vibration rod connected to the vibration generator or a linkage section between the vibration generator and the vibration rod, (c) at least one vibration vane fixed to the vibration rod, (d) a vibration vane-fixing member, and (e) an insulation member for electrically separating the vibration rod or a vibration transmission member in a non-immersed position in a treatment bath, near the vibration generator and away from the vibration vane; placing water or a water-containing fluid to be treated (water-based fluid, including a fluid in the form of a paste) in the treatment tank; and carrying out the steps of (i) generating a desired vibration between 10 and 200 Hz in the vibration vane by using the vibration generator and transmitting the vibrations to the vibration vane to cause the vibration vane to vibrate at an amplitude of 0.01 to 15 mm, (ii) irradiating the photocatalyst or the photocatalyst and bactericidal metal with light, and (iii) allowing electric current to flow for 30 minutes or longer in the water or water-containing fluid to be treated to break down, reduce, or remove halogen components in the water and convert the nitrogen components contained in the water into nitrite ions, and/or sulfur components into sulfite ions, with at least one component selected from (a), (b), (c), and (d) serving as an anode or a cathode.

A tenth aspect of the present invention relates to a production method for active antiseptic water or an active antiseptic water-based fluid according to any of claims 1 to 5, which comprises using, as the vibrating stirrer, an insulated vibrating stirrer having (a) a vibration generator, (b) a vibration rod connected to the vibration generator or a linkage section between the vibration generator and the vibration rod, (c) at least one vibration vane and at least one auxiliary vane fixed to the vibration rod, (d) a vibration vane-fixing member, and (e) an insulation member for electrically separating the vibration rod or a vibration transmission member in a non-immersed position in a treatment bath, near the vibration generator and away from the vibration vane and auxiliary vane; placing water or a water-containing fluid to be treated (water-based fluid, including a fluid in the form of a paste) in the treatment tank; carrying out the steps of (i) generating a desired vibration between 10 and 200 Hz in the vibration vane by using the vibration generator and transmitting the vibrations to the vibration vane to cause the vibration vane to vibrate at an amplitude of 0.01 to 15 mm, (ii) irradiating the photocatalyst or the photocatalyst and bactericidal metal with light, and (iii) allowing electric current to flow for 30 minutes or longer in the water or water-containing fluid to be treated to break down, reduce, or remove halogen components in the water and convert the nitrogen components contained in the water into nitrite ions, and/or sulfur components into sulfite ions, with at least one component selected from (a), (b), (c), and (d) serving as an anode or a cathode.

An eleventh aspect of the present invention relates to the production method for active antiseptic water or an active antiseptic water-based fluid according to any one of claims 6 to 10, wherein the photocatalyst layer or the layer comprising a photocatalyst and a bactericidal metal is disposed so as to cover at least a portion of the vibration vane and/or the auxiliary vane.

A twelfth aspect of the present invention relates to the production method for active antiseptic water or an active antiseptic water-based fluid according to any of claims 6 to 11, wherein the flow velocity of the treated fluid produced by vibration stirring is 150 mm/second or higher as measured with a three-dimensional electromagnetic flow meter.

A thirteenth aspect of the present invention relates to the production method for active antiseptic water or an active antiseptic water-based fluid according to any of claims 6 to 12, wherein (1) the treated fluid and/or (2) the photocatalyst layer or the layer comprising a photocatalyst and a bactericidal metal are exposed to ultrasonic waves.

A fourteenth aspect of the present invention relates to a production apparatus for active antiseptic water or an active antiseptic water-based fluid, comprising (1) a treatment tank, (2) a vibrating stirrer disposed inside the treatment tank, (3) a photocatalyst layer or a layer having a photocatalyst and a bactericidal metal, disposed on any surface inside the treatment tank, and (4) a light irradiator for emitting light to the photocatalyst layer or the layer having a photocatalyst and a bactericidal metal, disposed inside and/or outside the treatment tank, wherein the light irradiator comprises (i) a light source, (ii) a light-leaking portion disposed near and/or in close contact with the photocatalyst layer or the layer having a photocatalyst and a bactericidal metal inside the treatment tank, and (iii) an optical fiber for optically connecting the light source and the light-leaking portion.

A fifteenth aspect of the present invention relates to the production apparatus for active antiseptic water or an active antiseptic water-based fluid according to claim 14, further comprising (5) a magnetic force generation member disposed inside the treatment tank.

A sixteenth aspect of the present invention relates to the production apparatus for active antiseptic water or an active antiseptic water-based fluid according to claim 14 or 15, wherein the vibration stirrer comprises (a) a vibration generator, (b) a vibration rod connected to the vibration generator or a linkage section between the vibration generator and the vibration rod, (c) at least one vibration vane fixed to the vibration rod, and (d) a vibration vane-fixing member.

A seventeenth aspect of the present invention relates to the production apparatus for active antiseptic water or an active antiseptic water-based fluid according to claim 14 or 15, wherein the vibrating stirrer is an insulated vibrating stirrer having (a) a vibration generator, (b) a vibration rod connected to the vibration generator or a linkage section between the vibration generator and the vibration rod, (c) at least one vibration vane fixed to the vibration rod, (d) a vibration vane-fixing member, and (e) an insulation member for electrically separating the vibration rod or the vibration transmission member in a non-immersed position in a treatment bath, near the vibration generator and away from the vibration vane.

An eighteenth aspect of the present invention relates to the production apparatus for active antiseptic water or an active antiseptic water-based fluid according to claim 14 or 15, wherein the vibrating stirrer is an insulated vibrating stirrer having (a) a vibration generator, (b) a vibration rod connected to the vibration generator or a linkage section between the vibration generator and the vibration rod, (c) at least one vibration vane and at least one auxiliary vane fixed to the vibration rod, (d) a vibration vane-fixing member, and (e) an insulation member for electrically separating the vibration rod or the vibration transmission member in a non-immersed position in the treatment bath, near the vibration generator and away from the vibration vane and auxiliary vane.

A nineteenth aspect of the present invention relates to the production apparatus for active antiseptic water or an active antiseptic water-based fluid according to any one of claims 14 to 18, wherein the photocatalyst layer or the layer having a photocatalyst and a bactericidal metal is disposed so as to cover a portion of the vibration vane and/or auxiliary vane.

A twentieth aspect of the present invention relates to the production apparatus for active antiseptic water or an active antiseptic water-based fluid according to any one of claims 14 to 18, wherein the photocatalyst layer or the layer having a photocatalyst and a bactericidal metal and the light-leaking portion are formed on at least a portion of a plate-like body, and one or a plurality of plate-like bodies is disposed inside the treatment tank, facing in a direction that least obstructs the flow produced by vibration stirring.

A twenty-first aspect of the present invention relates to the production apparatus for active antiseptic water or an active antiseptic water-based fluid according to any one of claims 14 to 20, further having an ultrasonic emitter.

A twenty-second aspect of the present invention relates to a method for breaking down, reducing, or removing halogen components contained in water, which comprises using a treatment apparatus having (1) a treatment tank, (2) a vibrating stirrer disposed inside the treatment tank, (3) a photocatalyst layer or a layer having a photocatalyst and a bactericidal metal, disposed on any surface inside the treatment tank, and (4) a light irradiator for emitting light to the photocatalyst layer or the layer having a photocatalyst and a bactericidal metal, disposed inside and/or outside the treatment tank; placing water or a water-containing fluid to be treated (water-based fluid, including a fluid in the form of a paste) in the treatment tank; and carrying out operations (i) and (ii) for 1 minute or longer and less than 30 minutes, the operations comprising the steps of (i) generating a desired vibration between 10 and 200 Hz in a vibration vane by using a vibration generator, and transmitting the vibrations to the vibration vane to cause the vibration vane to vibrate at an amplitude of 0.01 to 15 mm, and (ii) irradiating the photocatalyst or the photocatalyst and bactericidal metal with light.

As used in the present invention, the term "halogen component" generically refers to chlorine ions and other halogen ions present in water due to decontamination of water and to other causes, and to halogen-based inorganic compounds or trihalomethanes, dioxins, and other organic halogen compounds.

A twenty-third aspect of the present invention relates to a method for breaking down, reducing, or removing halogen components contained in water, which comprises using (1) a treatment tank, (2) a vibrating stirrer disposed inside the treatment tank, (3) a photocatalyst layer or a layer having a photocatalyst and a bactericidal metal, disposed on any surface inside the treatment tank, (4) a light irradiator for emitting light to the photocatalyst layer or the layer having a photocatalyst and a bactericidal metal, disposed inside and/or outside the treatment tank, and (5) a magnetic force generation member disposed inside the treatment tank; placing water or a water-containing fluid to be treated (water-based fluid, including a fluid in the form of a paste) in the treatment tank; and carrying out operations (i) and (ii) for 1 minute or longer and less than 30 minutes, the operations having the steps of (i) generating a desired vibration between 10 and 200 Hz in a vibration vane by using a vibration generator, and transmitting the vibrations to the vibration vane to cause the vibration vane to vibrate at an amplitude of 0.01 to 15 mm, and (ii) irradiating the photocatalyst or the photocatalyst and bactericidal metal with light.

A twenty-fourth aspect of the present invention relates to a method for breaking down, reducing, or removing halogen components contained in water, which comprises using as the vibrating stirrer (a) a vibration generator, (b) a vibration rod connected to the vibration generator or a linkage section between the vibration generator and the vibration rod, (c) at least one vibration vane fixed to the vibration rod, and (d) a vibration vane fixing member; placing water or a water-containing fluid to be treated (water-based fluid, including a fluid in the form of a paste) in the treatment tank; and carrying out operations (i) and (ii) for 1 minute or longer and less than 30 minutes, the operations having the steps of (i) generating a desired vibration between 10 and 200 Hz in the vibration vane by using the vibration generator, and transmitting the vibrations to the vibration vane to cause the vibration vane to vibrate at an amplitude of 0.01 to 15 mm, and (ii) irradiating the photocatalyst or the photocatalyst and bactericidal metal with light.

A twenty-fifth aspect of the present invention relates to a method for breaking down, reducing, or removing halogen components contained in water, which comprises using, as a vibrating stirrer, an insulated vibrating stirrer comprising (a) a vibration generator, (b) a vibration rod connected to the vibration generator or a linkage section between the vibration generator and the vibration rod, (c) at least one vibration vane fixed to the vibration rod, (d) a vibration vane-fixing member, and (e) an insulation member for electrically separating the vibration rod or a vibration transmission member disposed in a non-immersed position in the treatment bath, near the vibration generator and away from the vibration vane; placing water or water-containing fluid to be treated (water-based fluid, including a fluid in the form of a paste) in the treatment tank; and carrying out operations (i), (ii), and (iii) for 1 minute or longer and less than 30 minutes, the operations having the steps of (i) generating a desired vibration between 10 and 200 Hz in the vibration vane by using the vibration generator, and transmitting the vibrations to the vibration vane to cause the vibration vane to vibrate at an amplitude of 0.01 to 15 mm, (ii) irradiating the photocatalyst or the photocatalyst and bactericidal metal with light, and (iii) allowing electric current to flow in the water or water-containing fluid to be treated, with at least one component selected from (a), (b), (c), and (d) serving as an anode or a cathode.

A twenty-sixth aspect of the present invention relates to a method for breaking down, reducing, or removing halogen components contained in water, which comprises using, as a vibrating stirrer, an insulated vibrating stirrer comprising (a) a vibration generator, (b) a vibration rod connected to the vibration generator or a linkage section between the vibration generator and the vibration rod, (c) at least one vibration vane and at least one auxiliary vane fixed to the vibration rod, (d) a vibration vane-fixing member, and (e) an insulation member for electrically separating the vibration rod or the vibration transmission member disposed in a non-immersed position in a treatment bath, near the vibration generator and away from the vibration vane and the auxiliary vane; placing water or water-containing fluid to be treated (water-based fluid, including a fluid in the form of a paste) in the treatment tank; and carrying out operations (i), (ii), and (iii) for 1 minute or longer and less than 30 minutes, the operations having the steps of (i) generating a desired vibration between 10 and 200 Hz in the vibration vane by using the vibration generator, and transmitting the vibrations to the vibration vane to cause the vibration vane to vibrate at an amplitude of 0.01 to 15 mm, (ii) irradiating the photocatalyst or the photocatalyst and bactericidal metal with light, and (iii) allowing electric current to flow in the water or water-containing fluid to be treated, with at least one component selected from (a), (b), (c), and (d) serving as an anode or a cathode.

A twenty-seventh aspect of the present invention relates to the method for breaking down, reducing, or removing halogen components contained in water according to any one of claims 22 to 26, wherein the photocatalyst layer or the layer comprising a photocatalyst and a bactericidal metal is disposed so as to cover a portion of the vibration vane and/or auxiliary vane.

A twenty-eighth of the aspect of the present invention relates to the method for breaking down, reducing, or removing halogen components contained in water according to any one of claims 22 to 27, wherein the flow velocity of the treated fluid produced by vibration stirring is 150 mm/second or higher as measured with a three-dimensional electromagnetic flow meter.

A twenty-ninth aspect of the present invention relates to the method for breaking down, reducing, or removing halogen components contained in water according to any one of claims 22 to 28, wherein (1) the treated fluid and/or (2) the photocatalyst layer or the layer comprising a photocatalyst and a bactericidal metal are exposed to ultrasonic waves.

A thirtieth aspect of the present invention relates to an apparatus for breaking down, reducing, or removing halogen components contained in water, comprising (1) a treatment tank, (2) a vibrating stirrer disposed inside the treatment tank, (3) a photocatalyst layer or a layer having a photocatalyst and a bactericidal metal, disposed on any surface inside the treatment tank, and (4) a light irradiator for emitting light to the photocatalyst layer or the layer having a photocatalyst and a bactericidal metal, disposed inside and/or outside the treatment tank, wherein the light irradiator comprises (i) a light source, (ii) a light-leaking portion disposed near and/or in close contact with the photocatalyst layer or the layer having a photocatalyst and a bactericidal metal inside the treatment tank, and (iii) an optical fiber for optically connecting the light source and the light-leaking portion.

A thirty-first aspect of the present invention relates to the apparatus for breaking down, reducing, or removing halogen components contained in water according to claim 30, further comprising (5) a magnetic force generation member disposed inside the treatment tank.

A thirty-second aspect of the present invention relates to the apparatus for breaking down, reducing, or removing halogen components contained in water according to claim 30 or 31, wherein the vibrating stirrer comprises (a) a vibration generator, (b) a vibration rod connected to the vibration generator or a linkage section between the vibration generator and the vibration rod, (c) at least one vibration vane fixed to the vibration rod, (d) a vibration vane-fixing member.

A thirty-third aspect of the present invention relates to the apparatus for breaking down, reducing, or removing halogen components contained in water according to claim 30 or 31, wherein the vibrating stirrer is an insulated vibrating stirrer having (a) a vibration generator, (b) a vibration rod connected to the vibration generator or a linkage section between the vibration generator and the vibration rod, (c) at least one vibration vane fixed to the vibration rod, (d) a vibration vane-fixing member, and (e) an insulation member for electrically separating the vibration rod or the vibration transmission member in a non-immersed position in a treatment bath, near the vibration generator and away from the vibration vane.

A thirty-fourth aspect of the present invention relates to the apparatus for breaking down, reducing, or removing halogen components contained in water according to claim 30 or 31, wherein the vibrating stirrer is an insulated vibrating stirrer having (a) a vibration generator, (b) a vibration rod connected to the vibration generator or a linkage section between the vibration generator and the vibration rod, (c) at least one vibration vane and at least one auxiliary vane fixed to the vibration rod, (d) a vibration vane-fixing member, and (e) an insulation member for electrically separating the vibration rod or the vibration transmission member in a non-immersed position in a treatment bath, near the vibration generator and away from the vibration vane and the auxiliary vane.

A thirty-fifth aspect of the present invention relates to the apparatus for breaking down, reducing, or removing halogen components contained in water according to any one of claims 30 to 34, wherein the photocatalyst layer or the layer having a photocatalyst and a bactericidal metal is disposed so as to cover a portion of the vibration vane and/or the auxiliary vane.

A thirty-sixth aspect of the present invention relates to the apparatus for breaking down, reducing, or removing halogen components contained in water according to any one of claims 30 to 35, wherein the photocatalyst layer, or the layer having a photocatalyst and a bactericidal metal, and the light-leaking portion are formed on at least a portion of a plate-like body, and one or a plurality of plate-like bodies is disposed inside the treatment tank, facing in a direction that least obstructs the flow produced by vibration stirring.

A thirty-seventh aspect of the present invention relates to the apparatus for breaking down, reducing, or removing halogen components contained in water according to any one of claims 30 to 36, further comprising an ultrasonic emitter.

The water obtained by the method of the present invention contains essentially no chlorine, but does not change even if left standing for 1 to 3 months, and when administered to flowers, the lifespan of the flowers is extended several-fold in comparison with normal water. The United States Public Health Service stipulates that the nitric acid concentration in water should be 45 mg/L or less, and that the nitrate nitrogen concentration should be 10 mg/or less. Also, it is said that when these substances rise above a certain level, the hemoglobin in the blood changes into methemoglobin, and such a level is theorized to be toxic to humans. The water of the present invention, however, is estimated to be two orders of magnitude less than the stipulated value of 10 mg/L, the toxicity for humans is thereby eliminated, and bacterial growth is inhibited. Therefore, juice, black tea, coffee, and other beverages, as well as rice water, tomato ketchup, and other water-containing processed foods that are obtained by using the resulting water have far superior stability in comparison with products obtained by using normal water. Antiseptic properties can be imparted by using the water of the present invention, or by applying the method of the present invention to substances that are placed in the form of a liquid or paste by the presence of water. Halogens, trihalomethanes, and dioxins are excellently removed from tap water, well water, wastewater, and other types of water treated by the method and apparatus of the present invention.

The advantages of the present invention are as follows.

(1) The water of the present invention demonstrates antiseptic activity, bactericidal ability, plant and animal activating ability in a wide variety of applications including beverage water, cleaning water, cooking water, and processed water. When the level of nitrite and sulfite ions is less than 0.08 mg/L, the antiseptic effect is inadequate, and a danger is posed to goldfish and the like when the level is greater than 0.5 mg/L (goldfish die when the level of 0.8 mg/L).

(2) The ability of the water is also adequately demonstrated in paste-like foodstuffs, beverages, liquiform condiments, and the like that contain the water of the present invention. The method and apparatus of the present invention may be used to make the water of the present invention, and this can be used to produce processed food. Furthermore, the method and apparatus of the present invention may also be applied to paste-like foodstuffs, beverages, and liquiform condiments. Examples of such processed foods include sake, wine, liquor, whiskey, distilled spirits, brandy, gin, mirin, soy sauce, fruit juice, miso (bean paste), tomato ketchup, and tofu (bean curd).

(3) Water with good antiseptic properties, flavor, and taste, paste-like foods, beverages, and liquiform condiments can now be obtained by using the apparatus of the present invention and by using the method that utilizes the same.

(4) When the water of the present invention is used as the base water in fermentation of sake, or when the water of the present invention is used as water for producing tofu, bread, noodle soup, and the like, the antiseptic properties of the product are improved, and the taste and texture are enhanced.

(5) The freshness, preservability, yield, and other aspects of fruits and vegetables are improved when the water of the present invention is used as spray water in greenhouse cultivation.

(6) The occurrence of bacteria is inhibited when the water of the present invention is used as bath water.

(7) When the method and apparatus of the present invention are used, trihalomethane is generated by a reaction between very small amounts of organic substances in the water and the disinfecting chlorine used for sterilizing tap water in recent years, but trihalomethane, which is conventionally difficult to break down and remove, can be extremely effectively broken down and removed, the resulting water is highly antiseptic despite the absence of halogens, and the water has the surprising effect of improving taste and texture.

(8) When the method and apparatus of the present invention is used, even if dioxins are contained in the water to be treated, the dioxins can be effectively broken down and removed.

BRIEF DESCRIPTION OF THE DRAWINGS

FIG. 5 is a cross-sectional diagram showing an example of the simplest type of vibrating stirring device that is different from the vibrating stirring device shown in FIGS. 1 and 2.

FIG. 6 is a cross-sectional diagram in the same manner as FIG. 1 showing another type of vibrating stirring device, wherein the vibrating stirring device is a type that causes the vibration vanes to vibrate in the horizontal direction (however, the vibration vanes may be vibrated at an angle of 20° or less).

DESCRIPTION OF THE PREFERRED EMBODIMENTS

Figure 1:
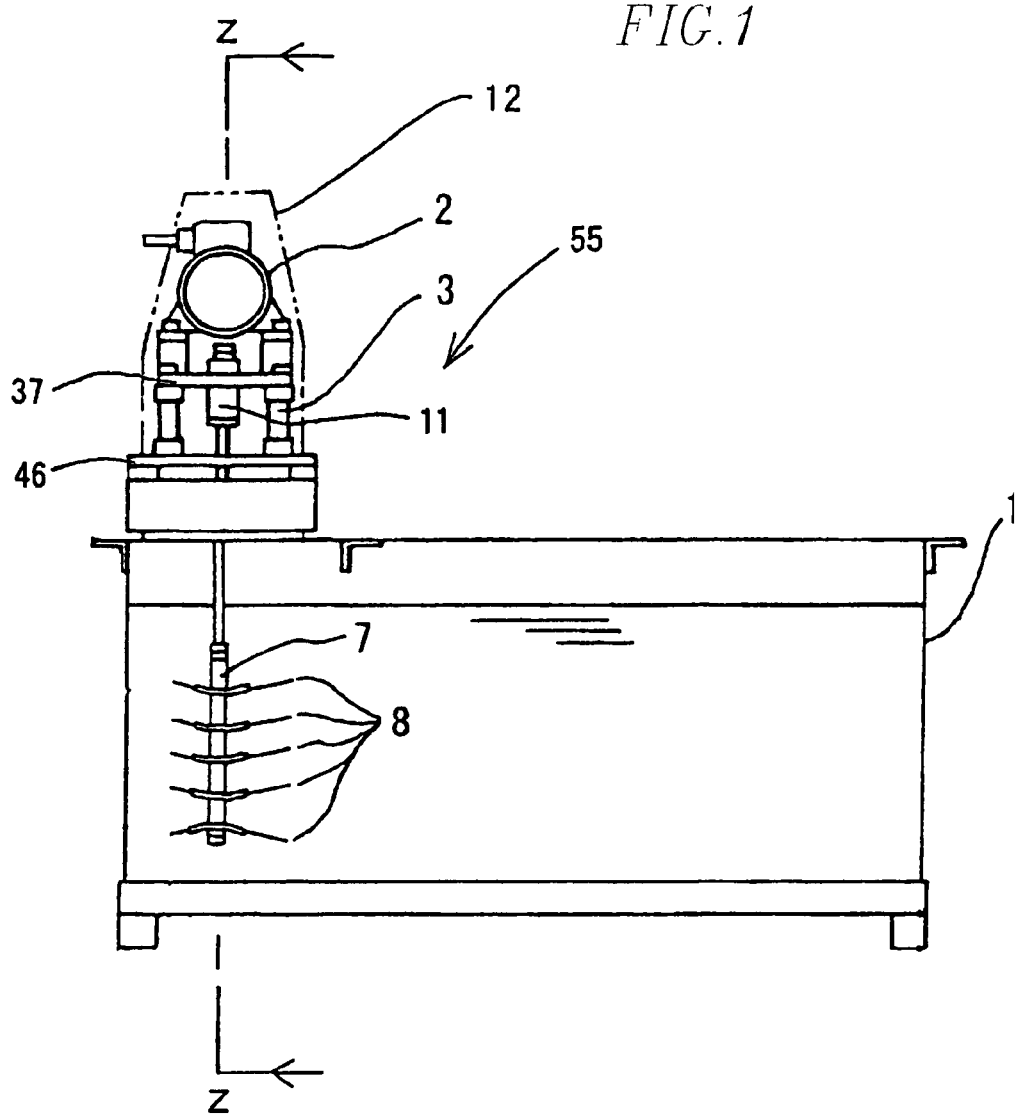
FIG. 1 is a cross-sectional diagram showing a specific example of an apparatus according to the present invention for the production of active antiseptic water or active antiseptic water-based fluid.

Specific embodiments of the present invention are described hereinafter with reference to the figures. In the figure, members and components having the same functions are assigned the same reference numerals. More specifically, 1 is a treatment tank, 2 is a vibration motor, 3 is a spring that absorbs vibrations, 5 is a guide shaft, 7 is a vibration rod, 8 is a vibration vane, 8' is an electrode auxiliary vane, 9 is a vibration vane- and/or electrode-fixing member, 10 is a vibration vane fixing member, 11 is a connection portion (stress-dispersing device), 12 is a vibration-generating device, 13 is an aperture for the vibration rod, 14 is a rubber portion, 15 is a balance weight, 20 is a first vibration transmission member, 21 is a second vibration transmission member, 23 is a columnar insulation member, 24 and 25 are fitting apertures, 26 is a magnetic material, 27 is an electrical wire, 30 is a spacer, 31 is an inverter, 32 is a power source, 33 is a synthetic resin sheet or a rubber sheet (for cushioning effect), 36 is a spring, 37 is a vibration motor mounting platform, 46 is a base plate, 47 is a support rod (guide shaft) extended perpendicularly in the downward direction from the basic vibration member or table mounted thereon or an auxiliary member, 48 is a support rod (guide shaft) extended perpendicularly in the upward direction from the base plate 46, 55 is a vibrating stirring device, 56 is an insulated vibrating stirring device, 60 is a UV lamp, 61 is a reflective plate, 62 is a cover, 64 is a quartz glass tube, 65 is a holder, 71 is a UV light source, 72 is an optical fiber, 73 is a light-leaking portion, 74 is a presser member, 75 is a flexible waterproof connector, 76 is a light-leaking area in the light-leaking portion, 77 is a photocatalytic layer or a layer composed of a photocatalyst and bactericidal metal, 78 is a flexible sheet, 79 is a bolt and nut, 81 is an electrode (positive pole), 82 is an electrode (negative pole), 83 and 84 are insulating members, 91 is a plate having a photocatalytic layer, 92 is a bolt and nut, and 93 is a photocatalytic set.

For the vibrating stirring device used in the present invention may be utilized the inventions by the present inventor, which are disclosed in Japanese Patent No. 1941498 (Publication Number of the Unexamined Patent Application: JP 3-275130, A), Japanese Patent No. 2707530 (JP 6-220697, A), Japanese Patent No. 2762388 (JP 6-312124, A), Japanese Patent No. 2767771 (JP 8-281272, A), Japanese Patent No. 2852878 (JP 8-173785, A), Japanese Patent No. 2911350 (JP 7-126896, A), Japanese Patent No. 2988624 (JP 11-189880, A), Japanese Patent No. 2989440 (JP 7-54192, A), Japanese Patent No. 2992177 (JP 6-330395, A), Japanese Patent No. 3035114 (JP 6-287799, A), Japanese Patent No. 3244334 (JP 6-280035, A), Japanese Patent No. 3142417 (JP 6-304461, A), Japanese Unexamined Patent Application Publication No. JP 10-43567, A, Japanese Patent No. 3220954 (No. JP 10-43569, A), Japanese Unexamined Patent Application Publication No. JP 10-369453, A, Japanese Patent No. 3196890 (JP 11-253782, A), Japanese Unexamined Patent Application Publication No. JP 2000-317295, A, Japanese Unexamined Patent Application Publication No. JP 2001-288591, A, Japanese Patent Application No. JP 2000-9540, Japanese Patent Application No. JP2001-135528, Japanese Patent Application No. JP 2001-338422, Japanese Patent Application No. JP2002-166238, and other documents.

Figure 2:
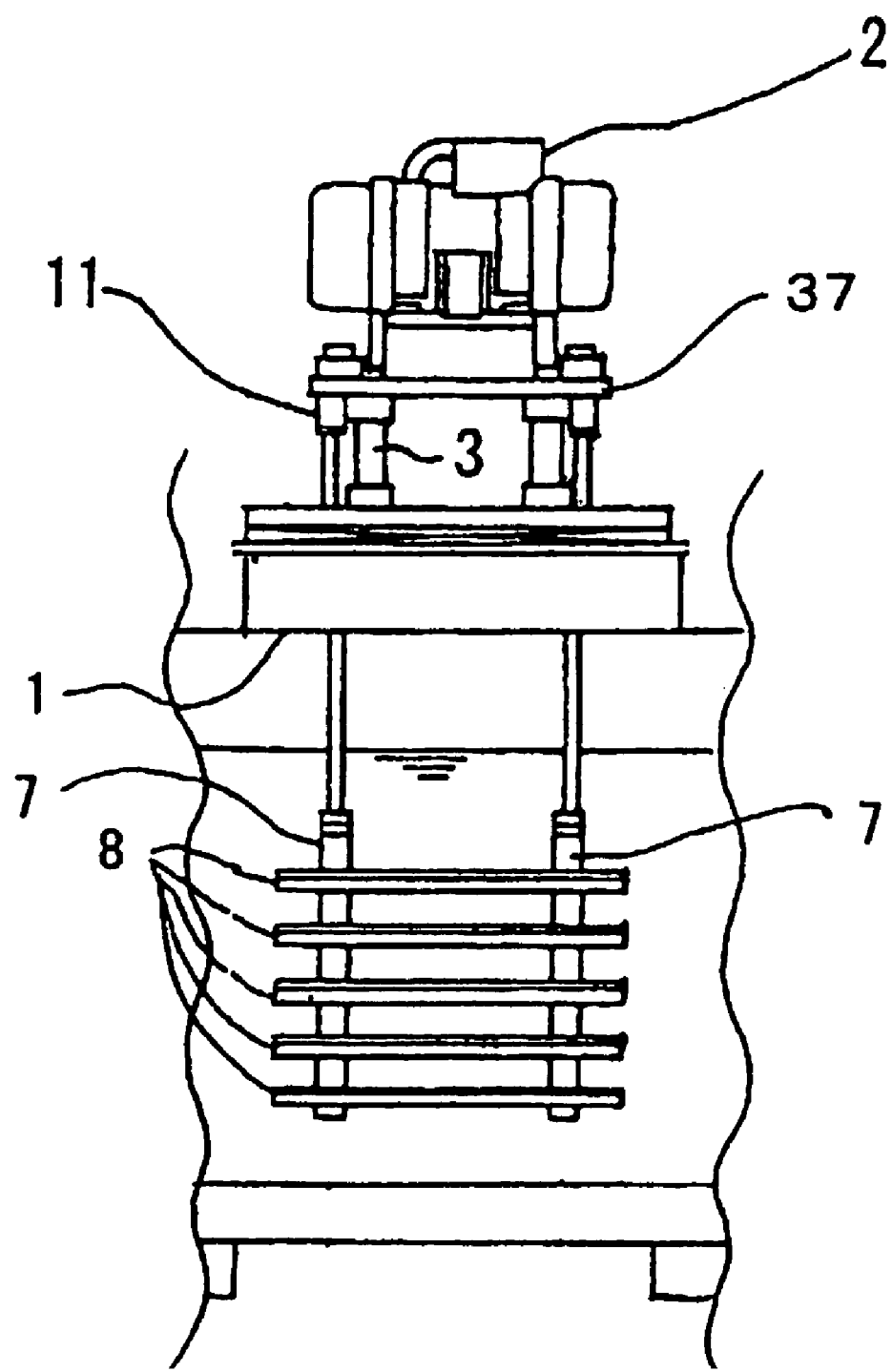
FIG. 2 is a cross-sectional diagram taken along the line Z-Z shown in FIG. 1.
Figure 7:
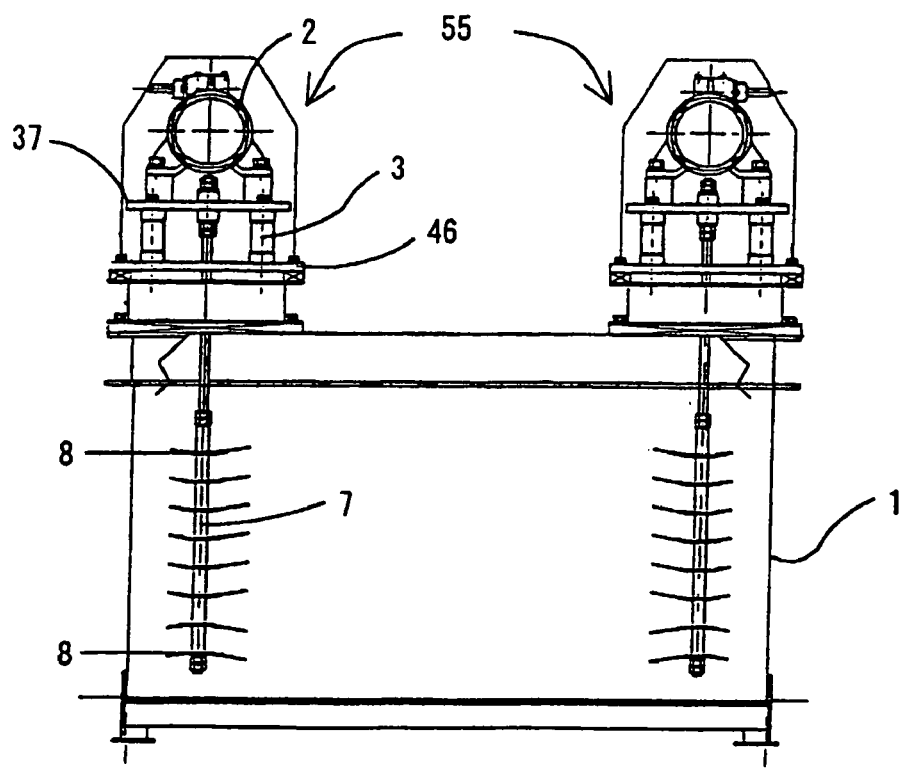
FIG. 7 is a cross-sectional diagram of an embodiment in which vibrating stirring devices are disposed to both sides of the treatment tank.

FIG. 1 is a cross-sectional diagram showing an example of the apparatus in which a specific, single type of vibrating stirring device is set inside the treatment tank 1. FIG. 2 is a cross-sectional diagram taken along the line Z-Z of FIG. 1. In the device shown in FIGS. 1 and 2, the vibrating stirring device is disposed to only one side of the treatment tank, but vibrating stirring devices may be disposed to both sides of the treatment tank, as shown in FIG. 7. Alternatively, a single vibrating stirring device may be disposed in the center of the treatment tank, the length of the vibration vanes projecting to the left from the vibration rod portion may be set to the same as that of the vanes projecting to the right, and the left and right surface sides of the treatment tank can be uniformly vibrationally stirred by the single vibrating stirring device.

Figure 3:
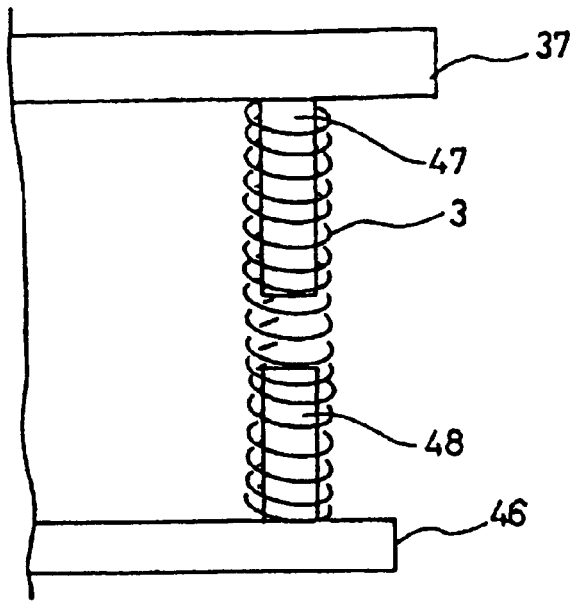
FIG. 3 shows a specific example of a vibration-absorbing mechanism that doubles as a sideslip prevention mechanism used in the present invention.
Figure 4:
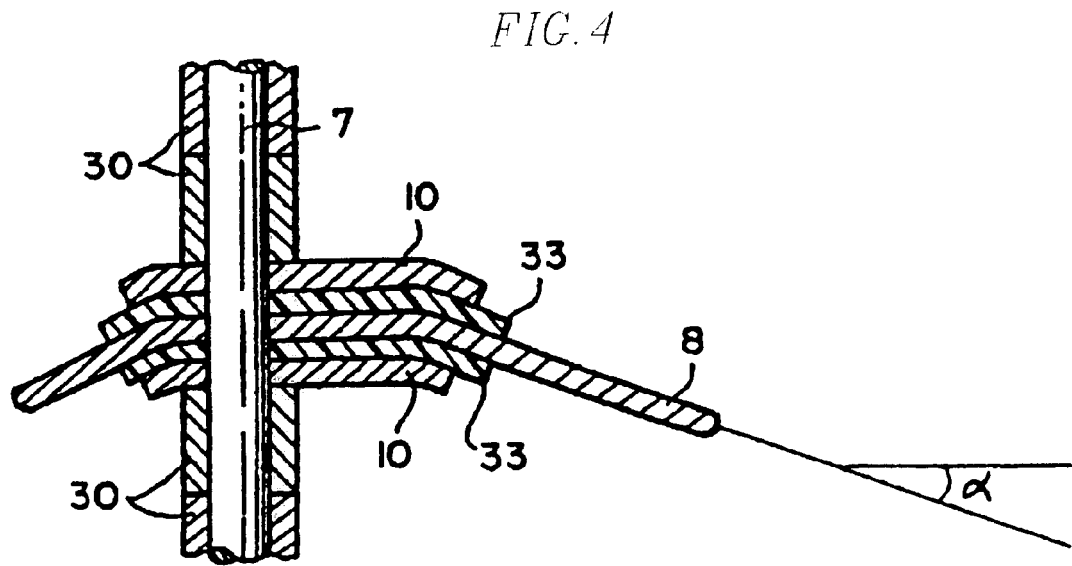
FIG. 4 is an enlarged cross-sectional view of a vibration vane portion in which a synthetic resin sheet or rubber sheet is intermediately disposed between a vibration vane and a vibration vane-fixing member.

An example of the vibrating stirring device used in the present invention will be described in detail with reference to attached FIGS. 1 to 5. The vibrating stirring device used in the present invention is configured so that the vibration rod 7 is attached to the vibration motor mounting platform 37 on which the vibration motor 2 is mounted. The vibration vanes 8 having at least one photocatalyst layer is, preferably non-rotatably, fixed to the vibration rod 7 with, for example, a nut, fixing plate, or the like, through a synthetic resin sheet or rubber sheet 33 and a vibration vane fixing member (preferably made of a magnetic material) 10, as shown in FIG. 4. In this example, there are five vibration vanes 8. In order to prevent the vibrations of the vibration motor 2 from being transmitted to the treatment tank 1, if necessary, a stress-dispersing device 11 is disposed below the vibration motor mounting platform 37, the upper face of which fixedly supports the vibration motor 2. The vibration-absorbing mechanism is configured, for example as shown in FIG. 3, with a spring 3 placed between the vibration motor mounting platform 37 and a base plate 46. The base plate 46 has a guide shaft 48 fixed to the top of the base plate 46 for preventing side slippage. The vibration motor mounting platform 37 has a guide shaft 47 fixed to the bottom thereof. The guide shafts 47 and 48 are completely inserted into the spring 3 in the vertical direction, so that the guide shafts can move up and down slidably inside the spring 3. Rubber or another buffer may be used in place of the spring 3. In this case, guide shafts 5 and buffers are arranged in a different way. The vibration vanes are composed of plastic or a metal such as Ti, on whose surface an anatase-type titanium oxide layer is provided as a photocatalyst layer, and the thickness of 1.0 mm is used.

A transistor inverter is connected by wire to the vibration motor in order to control the vibration frequency, and is used with a power feed of 200 V. The vibration energy of the vibration motor 2 is insulated from the treatment tank 1 by a vibration-absorbing body, spring 3, for example, of the vibration-absorbing mechanism. The energy is transmitted from the vibration rod 7 to the treated water or water-based fluid through the vibration vanes 8, and the treated water or water-based fluid flows accordingly. The vibration motor 2 may be used as the vibration generator.

The vibration motor controlled by the inverter produces any specified number of vibrations between 10 and 200 Hz, and preferably between 20 and 60 Hz in the vibration vanes. The material and thickness of the vibration vanes are preferably set so that the vanes flexibly vibrate due to the vibrations. The treatment time is 60 minutes or longer, and is preferably 90 minutes or longer when the aim is to produce active antiseptic water or an active antiseptic water-based fluid, and the treatment time is 5 to 30 minutes, and is preferably 5 to 15 minutes when the aim is to remove halogens, or break down and remove halogen compounds in the water.

The vibration motor is ordinarily set on the treatment tank, on the sidewall of the treatment tank, or on a platform on a hard floor. The employment of a platform outside the tank is preferable, when the tank is thin (stainless tank with a thickness of 5 mm or less) and the vibrations in the liquid cause the sidewall or bottom of the tank to vibrate. When the tank thickness is 5 mm or less, a reinforcing member may be attached, such as using a band to gird the side wall of the tank, and the vibration device may be mounted thereon. The vibrations generated by the vibration motor are transmitted to the vibration rod via a single or plurality of vibrating members (including the vibration transmission member). In this case, the vibration motor is preferably suspended from the lower side of the vibrating members (FIG. 6, for example), which allows the center of gravity to be lowered, and side slippage can be considerably reduced.

Adopted as the vibration-generating device in the present invention is a system in which a vibration motor (including magnet motors, air motors, or the like) causes a vibration member, vibration transmission member, or other members to vibrate. An electromagnet, an air gun, or another vibration-generating device may also be used in place of the vibration motor.

The vibration vane portion is composed of vibration vanes and a vibration vane fixing member, but a configuration with a plurality of overlapped vibration vanes, or a configuration in which the vibration vanes and vibration vane fixing member are integrally molded may also be used.

The material of the vibration vanes is preferably thin metal, but it is also possible to use an elastic synthetic resin or the like. The thickness is preferably such that the vertical vibrations of the vibration motor introduce a flutter phenomenon (a state in which waves are created) in at least the distal portions of the vane plate, and thereby applies vibrations to impart a flow to the system. Titanium, aluminum, copper, steel, stainless steel, magnetic steel and other magnetic metals, and alloys thereof may be used for the material of the metal vibration vane. Polycarbonate, vinyl chloride resin, polypropylene, or another synthetic resin may be used for the synthetic resin. The thickness is not particularly limited; however, in order to transmit the oscillation energy and enhance the effect of the vibration, the thickness is preferably set to 0.2 to 2 mm in the case of a metal vane, and 0.5 to 10 mm in the case of a plastic vane. If the thickness is excessively large, the effect of vibration stirring is reduced.

When an elastic synthetic resin or the like is used as the vibration vane material, the thickness is not particularly limited, but a thickness of 0.5 to 5 mm is generally preferred. In the case of a metal, stainless steel, for example, the thickness is preferably 0.2 to 1 mm, for example 0.6 mm. The width of the vibration plate is 0.1 to 15 mm, and preferably 0.1 to 5 mm.

A single or several tiers of vibration vanes may be attached to the vibration shaft. When several tiers of vibration vanes are used, the number of vanes varies depending on the water level, tank capacity, and size of the vibration motor, and the number of vanes can be increased up to 5 to 7 vanes as required. When the number of tiers is increased, the vibration amplitude is reduced due to the larger load placed on the vibration motor, and the vibration motor may generate heat. In this case, the capacity of the vibration motor must be increased. The vibration vanes may have an integral configuration. The angle of the vibration vanes may be horizontal with respect to the vibration shaft, but it is possible to set the vanes with an angle, and the vibrations can be given directionality by setting the angle α (see FIG. 4) to between 5 and 30 degrees, or particularly to between 10 and 20 degrees. When several vibration vanes are used, the lowest one or two vanes may be set with a downward angle, and the other vanes above them may be set with an upward angle, as shown in FIG. 1.

The vibration vane portion may be formed by sandwiching the vibration vanes between the upper and lower surfaces of the vibration vane-fixing members and fixing the vanes to the vibration rod. The vibration vane fixing members and the vibration vanes may be integrally inclined when viewed from the side of the vibration shaft, as shown in FIG. 4.

The vibration vane fixing members and the vibration vanes may be manufactured by integral molding using, for example, plastic. In this embodiment, the drawback that treated substances penetrate and become affixed to the connection portions, and time-consuming cleaning is required can be avoided, in comparison with the embodiment in which the vibration vanes and the vibration vane fixing members are separately used. Furthermore, differences in thickness do not occur and concentration of stress can be avoided with an integral configuration of the vanes and fixing member, and the service life of the vanes can therefore be considerably extended.

If, on the other hand, the vibration vanes and vibration vane-fixing members are separately fabricated, the vibration vanes alone can be changed, although changing is also possible in an integrally molded configuration. The vibration vanes, vibration vane fixing members, and integrally molded product are not limited to being made of plastic, and any of the above-described materials may be used. When the vibration vane-fixing members 10 are used, a vibration vane is sandwiched between an upper vibration vane-fixing member and a lower vibration vane-fixing member. The size of the upper vane-fixing member may be different from that of the lower vibration vane-fixing member, which can disperse vibration stress.

A synthetic resin sheet, such as a fluororesin sheet or rubber sheet 33, can be interposed between the vibration vane-fixing member 10 and vibration vane 8 to impart a cushioning effect thereto, and thereby allow stress in the vibration vane to be dispersed, as shown in FIG. 4. Also, the synthetic resin sheet or the rubber sheet 33 is preferably longer than the vibration vane fixing member 10, so that the ends of the sheet project from those of the vibration fixing member toward the ends of the vibration vane.

The vibration vanes 8 shown in FIGS. 1 and 2 are laid between two vibration rods 7 and 7. However, the vibration vanes 8 may be attached to a single vibration rod 7, as shown in FIG. 5.

The vibration stirring devices shown in FIGS. 1, 2 and 5 are a type in which the vibration vanes vibrate substantially in the vertical direction, but the vibration vanes may be caused to vibrate substantially in the horizontal direction (see FIG. 6). FIG. 6 is a cross-sectional diagram taken in the same manner as FIG. 1.

In this case, the vibrations of the vibration motor 2 are transmitted to the vibration rods 7 disposed at the bottom of the treatment tank by way of the first vibration transmission member 20 and second vibration transmission member 21. The vibration vanes 8 in FIG. 6 are fixed in the direction perpendicular to the vibration rod 7, but it is naturally possible to incline the vanes at α degrees with respect to the vibration rod 7, as shown in FIG. 4.

The photocatalyst used in the present invention may be an oxide from the periodic table sub-groups Ia, IIa, and IIb, such as $TiO_2$, $MnO_2$, $ZnO_2$, $SnO_2$ or the like, or a complex oxide composed of an alkali metal and a Va group element, or another known photocatalyst. Especially preferred is an anatase-type titanium oxide.

Ag, Pd, Au, Pt, Ni, Zn, Mg, Sn, Pb, and alloys composed of these metals, or alloys composed of these metals and other metals may be used as the bactericidal metal. The minimum inhibitory concentration (denoted as MIC) with respect to typhoid bacillus is $2 \times 10^{-6}$ for Ag and $1.2 \times 10^{-4}$ for Au.

This type of photocatalyst and bactericidal metal does not deteriorate in its activity if UV light (including near UV light of 380 nm or less) is irradiated. When a layer is formed by using both of a photocatalyst and a bactericidal metal, the photocatalyst and the bactericidal metal may be laid alternately to form an alternating striped layer. Also, a composite plating method, that is a method of plating the surface with the bactericidal metal with the photocatalyst particles dispersed therein, may be employed. Or, a method using the bactericidal metal layer with photocatalyst particles interspersed and bonded thereto may be adopted.

Figure 37:
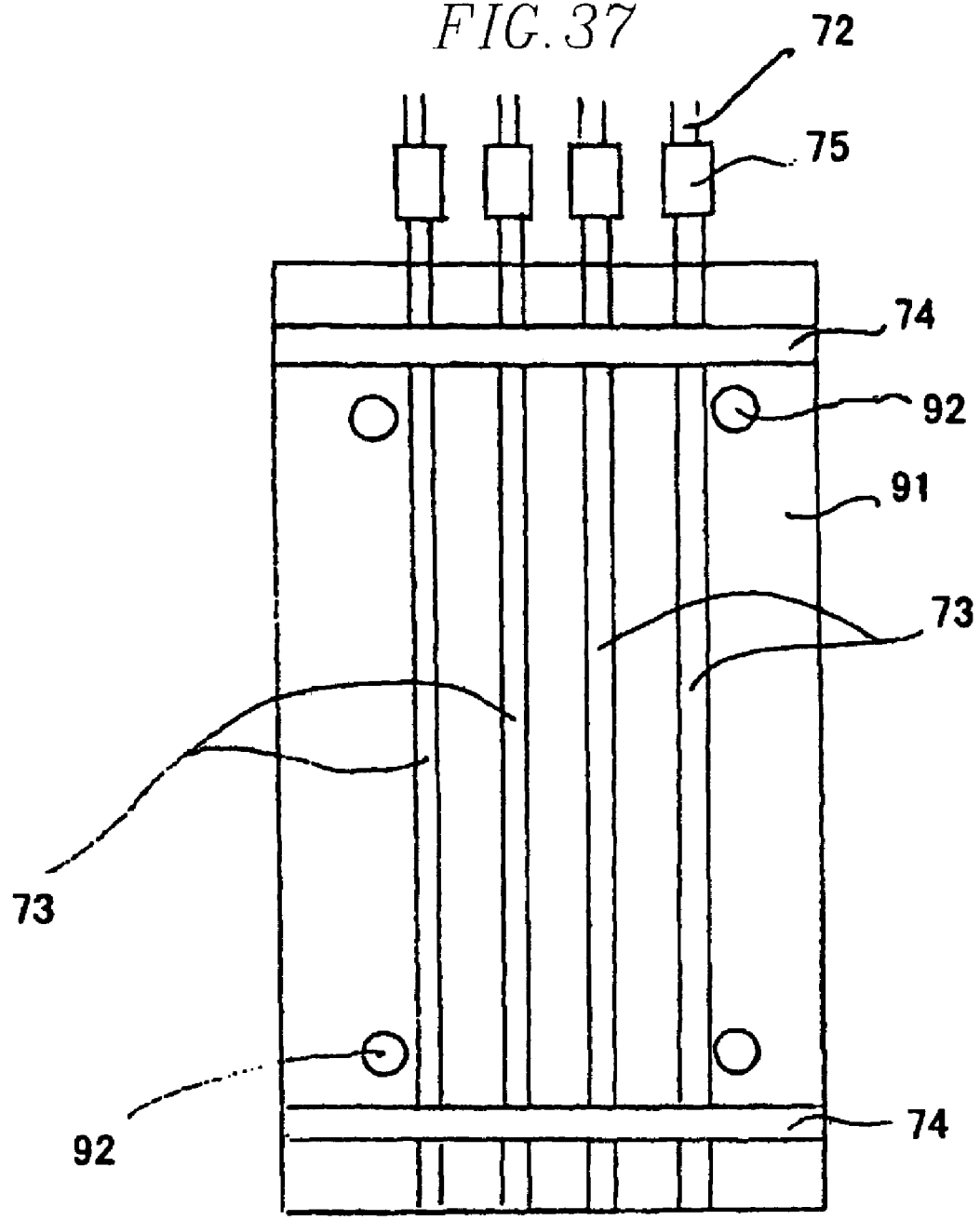
FIG. 37 is a plan view showing the light-leaking portions attached to the plate-like body, which has a photocatalyst layer or a layer composed of a photocatalyst and a bactericidal metal.
Figure 38:
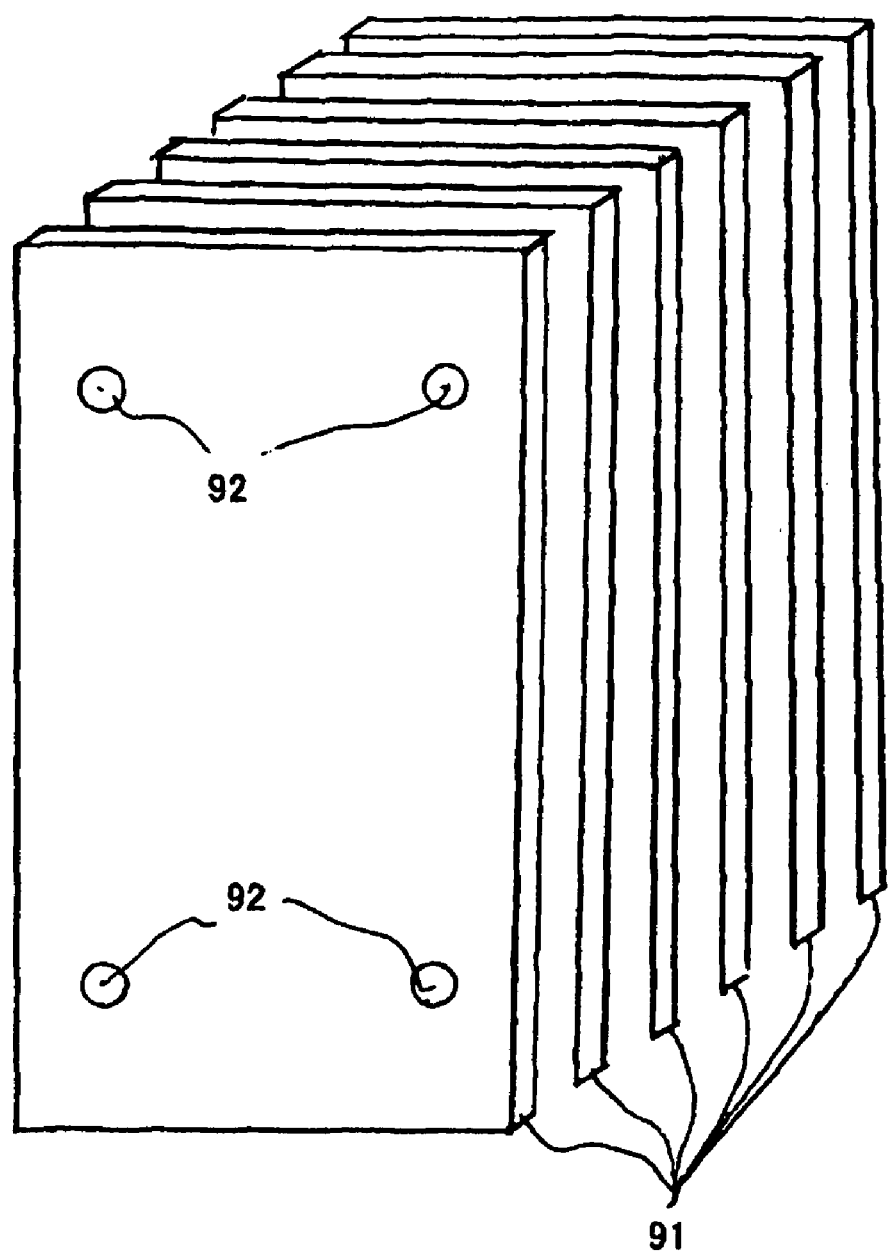
FIG. 38 is a schematic diagram of the photocatalytic set composed of a fixed number of plate-like bodies, which have a photocatalyst layer or a layer composed of a photocatalyst and a bactericidal metal, arranged at regular intervals.

Any place inside the treatment tank that is in contact with fluid to be treated may be selected for the location where a layer of the photocatalyst and bactericidal metal is formed thereon as its surface layer. More particularly, the layer of the photocatalyst and bactericidal metal may be formed on the surfaces of the vibration vanes and auxiliary vibration vanes. Or the photocatalyst may be disposed inside the treatment tank in the form of a photocatalyst set, as shown in FIGS. 37 and 38, the explanation of which will be provided later. In some cases, a layer composed of the photocatalyst and bactericidal metal may be formed on the inside surfaces of the treatment tank. The photocatalyst may be laid as a layer on the surface of any plate-like body. The body may be disposed so that the vibrationally stirred liquid flows smoothly and so that UV light or other light strikes the photocatalyst layer with good efficiency.

For the magnetic material in the present invention, a permanent magnet (hard magnetic material) or an electromagnet can be used. In some cases, a soft magnetic material may be used. Ferrite magnetic material, rare earth magnetic material, magnetic steel or the like may be used for the hard magnetic material, and specific examples thereof include Alnico magnet, samarium cobalt magnet, neodymium magnet, iron magnet, and boron magnet. When the soft magnetic material is used, a coil is wound around the soft magnetic material, and necessary magnetization is induced in the soft magnetic material, based on the electromagnet principles, by making current flow through the coil. Soft iron, silicon steel, Permalloy or the like may be used as the soft magnetic material. When the soft magnetic material is magnetized based on the electromagnet principles, the polarity may be selectively set to plus or minus by changing (1) from plus to minus, (2) from minus to plus, (3) setting all to minus, (4) setting all to plus, or (5) by setting, for example, specific metal components to plus and the other specific components to minus. The flexible thin plate magnet disclosed in Japanese Utility Model Examined Publication No. 53-21438, or a composition obtained by dispersing magnetic material particles in rubber or plastic may also be used as the magnetic material. The intensity of the magnetic field is preferably 800 to 15,000 gauss, and is more preferably 9,000 to 12,000 gauss.

Figure 8:
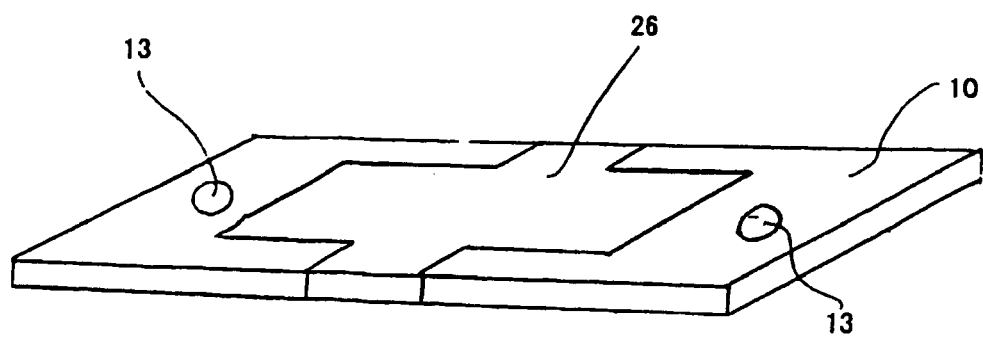
FIG. 8 is a perspective view showing an embodiment in which a magnetic material 26 is used in a form in which the magnetic material is inserted into the vibration vane-fixing member 10.

Since magnetic materials are generally difficult to work, the components configured with the magnetic material should not be used for the parts with shapes that require precision working. As a specific example, a cross-shaped notch is formed in the vibration vane-fixing member 10, as shown in FIG. 8, and the magnetic material 26 is fitted therein. As another example, the entire treatment tank or a portion of the walls of the treatment tank may be composed of a magnetic material. A magnetic material may also be used as an insert in the form of a grid, a metal net, a porous plate, a Raschig ring, a sphere, or another shape in the treated fluid (water or water system to be treated) entrance and exit portions of the treatment tank. These inserts may have a bactericidal metal-plated layer or a bactericidal metal compound surface layer, if necessary.

UV radiation (including near UV radiation) to the treated system may be carried out by using a UV radiation device in which a UV lamp is sealed in a quartz tube and submerged in the treatment tank, by irradiating UV light from outside the treatment tank, or by drawing out the treated system through a pipe, preferably a glass pipe or quartz pipe to the exterior of the treatment tank and irradiating the treated fluid with UV light in a location separate from the treatment tank. There is some effect even when irradiation of UV light alone is used, if the amount of irradiation is large. However, when metals, alloys or oxides thereof are used as the bactericidal material in the present invention, they should be irradiated with UV light. In particular, when titanium oxide, manganese oxide, or another material with a photocatalytic function is employed, UV light, even if the amount thereof is small, can further improve the bactericidal ability.

When a metal, alloy, or oxide as a bactericidal material is used for a portion of the stirring device, the portion is preferably irradiated with UV light. For example, when an Ag-plated material or a $TiO_2$ film is used on the surface of the vibration vane fixing member, the surface is preferably irradiated with UV light with good efficiency.

The following are examples of radiation lamps for emitting UV light.

Hydrogen discharge tube: Continuous spectrum of 1,680 to 5,000 Å

Xenon discharge tube: Continuous spectrum and far-infrared spectrum of 2,400 to 12,000 Å

Mercury lamp: Emission line spectrum of mercury (2,000 to 3,000 Å)

Extra-high pressure mercury lamp: Continuous spectrum of 2,000 to 3,000 Å

Bactericidal lamp: Emission line spectrum of mercury (2,000 to 3,000 Å)

Fluorescent erythemal lamp: About 2,900 Å and emission line spectrum of mercury (2,000 to 3,000 Å)

Black light lamp: Fluorescent line of about 3,600 Å and emission line spectrum of mercury High-pressure CUV lamp: High output with wide band, UV energy efficiency extremely high The wavelength is typically 200 to 400 nm, and is preferably 200 to 300 nm. A high-pressure mercury lamp or the like with a center wavelength of 253.7 nm may be suitably used.

Ordinarily, when a photocatalytic metal oxide such as $TiO_2$ and $ZnO_2$ is used as the bactericidal material, it is preferable to place a UV lamp inside a two-layer quartz tube inside the treatment tank, or to attach a UV lamp that has a reflective cover above the tank in proximity to the vanes of the vibrating stirring device and adjust the angle of the lamp so that the light strikes the vibration vanes. In either case, the lamp should be installed so as to activate the surface of the bactericidal material, continuously provide irradiation during the treatment to shorten the treatment time, and maintain activation for a long period of time.

Figure 9:
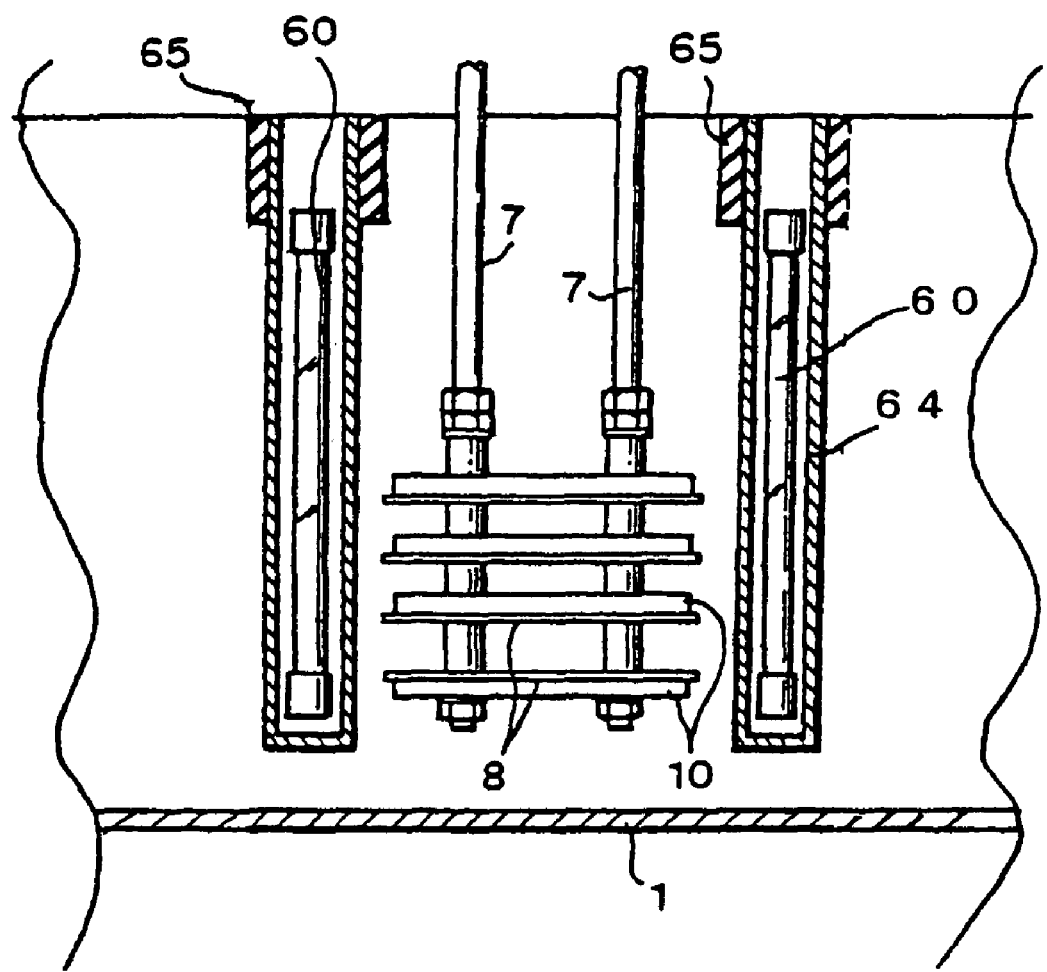
FIG. 9 is a partial cross-sectional diagram of a portion that corresponds to FIG. 1, showing an embodiment in which a light irradiation device is jointly used in the production apparatus for an active antiseptic water-based fluid according to the present invention.

FIG. 9 shows an example in which a UV lamp or a near UV lamp 60 is sealed in a waterproof transparent tube (for example, a quartz tube) and set in the treated fluid on both sides of the vibrating stirring device. The light irradiation device in FIG. 9 has a light source disposed in the liquid. However, the light source may be disposed on or above the surface of the liquid rather than in the liquid, which can provide an acceptable effect.

In the present invention, the UV irradiation device may be one that has (i) a light source, (ii) a light-leaking portion disposed near and/or in close contact with the photocatalyst layer or the layer having a photocatalyst and a bactericidal metal inside the treatment tank, and (iii) an optical fiber for optically connecting the light source and the light-leaking portion.

The optical fiber is preferably composed of an assembly of a plurality of flexible fiber optical lines. Each fiber optic line preferably has a diameter of 0.1 to 5.0 mm.

In the present invention, the light-leaking portion is installed inside the treatment tank, or near and/or in close contact with the surface of the photocatalyst layer or the layer having a photocatalyst and a bactericidal metal disposed on the vibrating stirring device and various other constituent members disposed in the treatment tank. As a specific example of the installation, it is possible to use a presser member that can partially fix the light-leaking portion in the vicinity of the surface or in a close contact with the surface, together with a fastening device for fastening the presser member to the surface. The fastening device may be a mechanical device such as a screw and nut, or a chemical fastener such as an adhesive.

Light-leaking portions are preferably disposed near and/or in close contact with the surface of the photocatalyst layer or the layer having a photocatalyst and a bactericidal metal. It is particularly preferable if the light-leaking portions are disposed so as to be substantially mutually parallel at intervals of 1.0 mm to 100 mm.

Particularly preferable Parts or Components to which the surfaces that have the photocatalyst layer or the layer having a photocatalyst and a bactericidal metal are given are the vibration vanes and/or the vibration vane fixing members.

Figure 10:
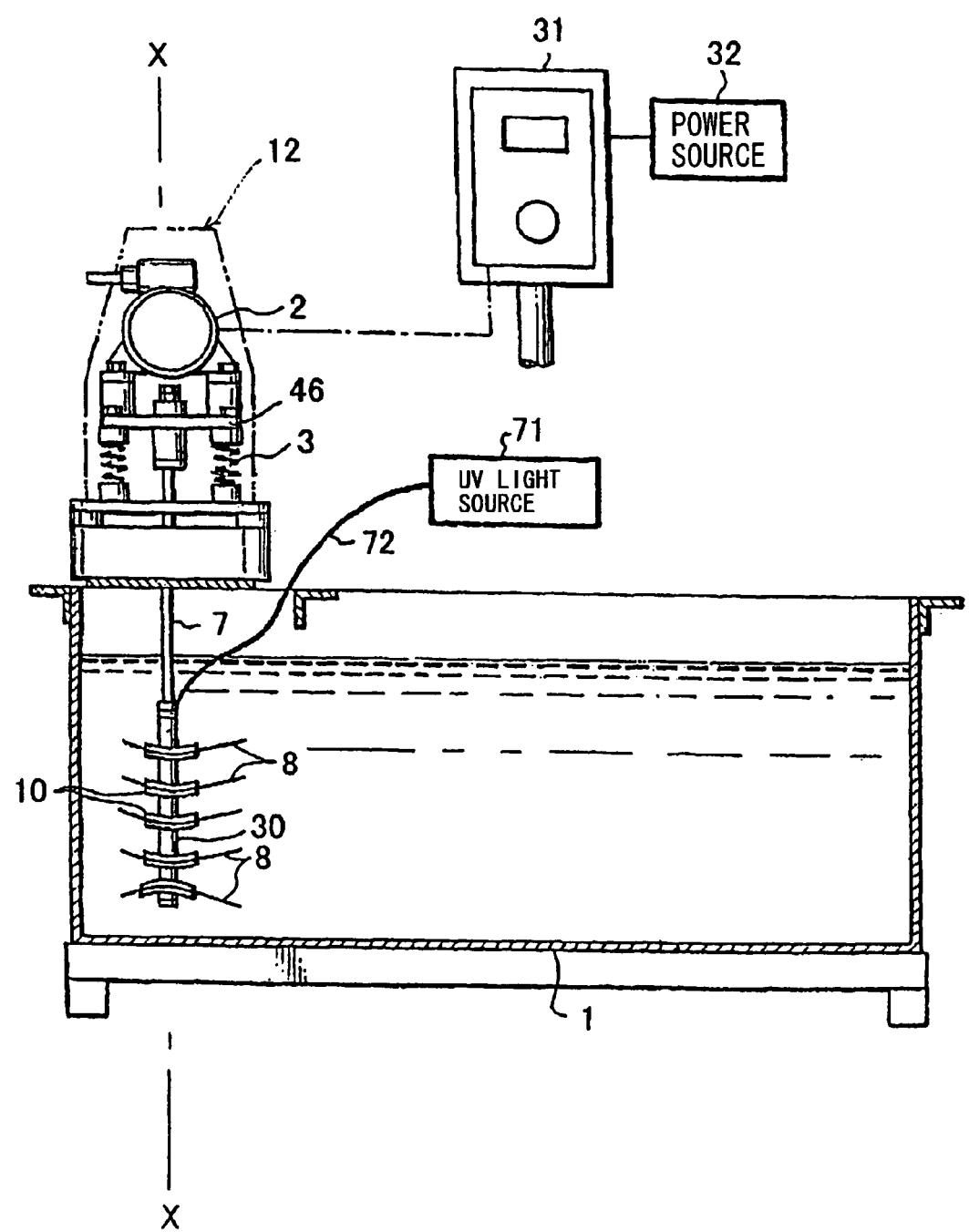
FIG. 10 is a schematic cross-sectional diagram of the production apparatus for an active antiseptic water-based fluid of an optical fiber UV-emitting type according to the present invention.
Figure 11:
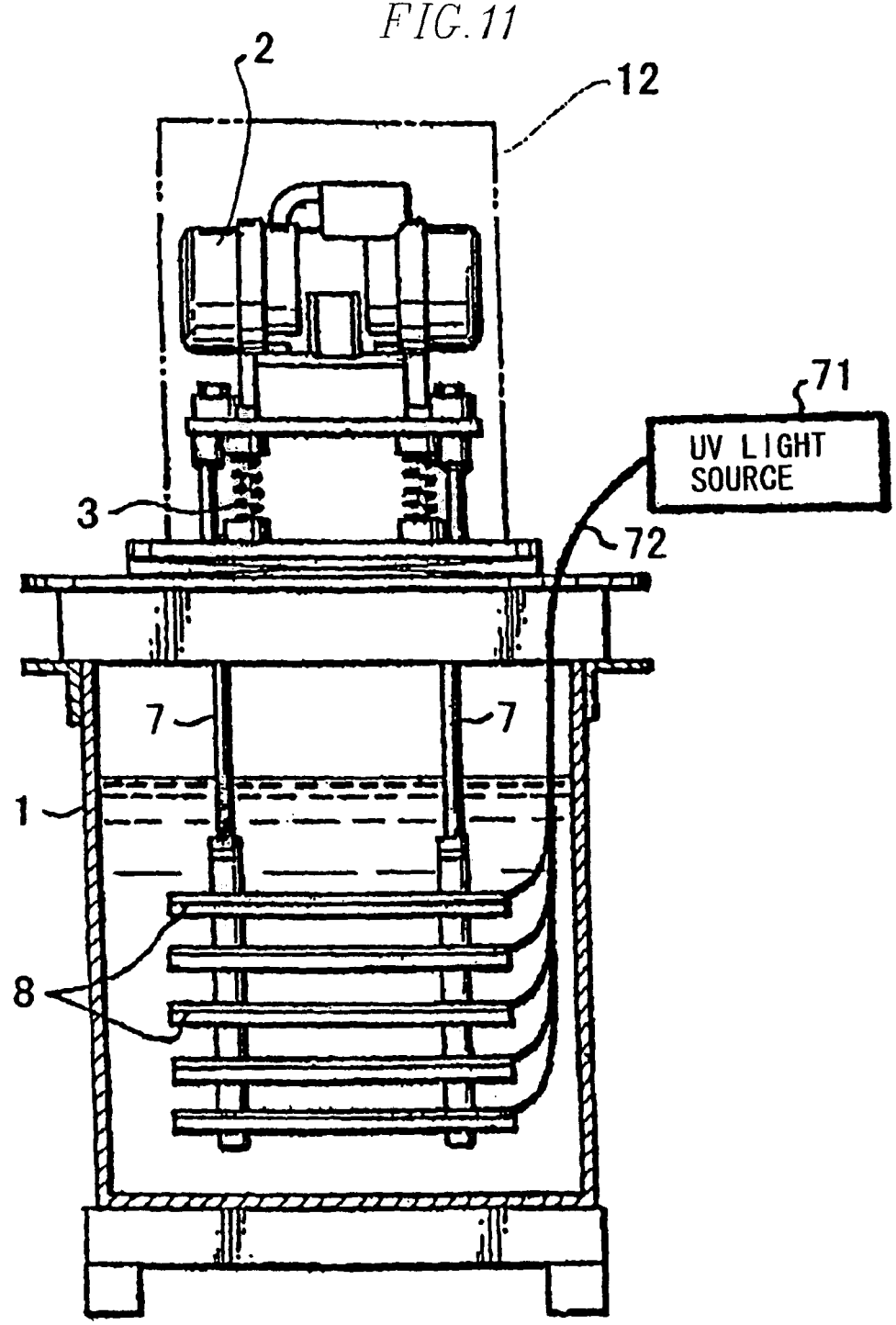
FIG. 11 is a cross-sectional diagram taken along the line X-X of FIG. 10.
Figure 12:
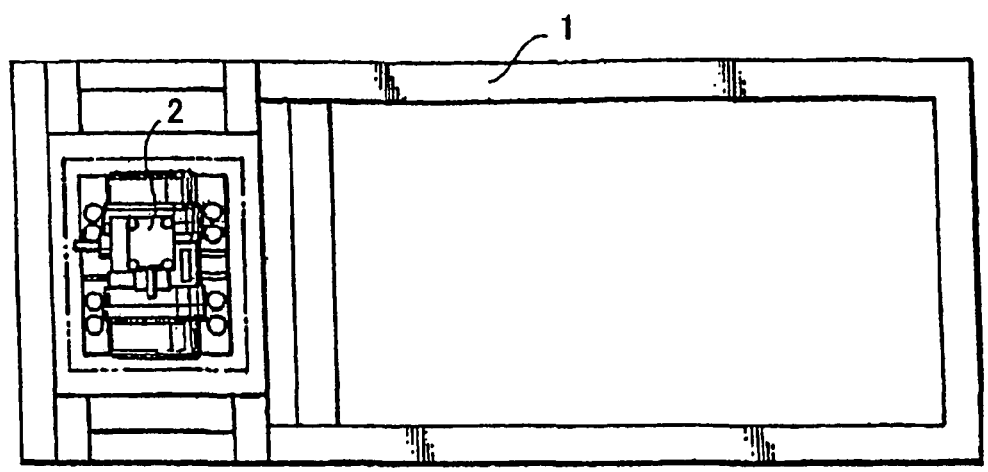
FIG. 12 is a plan view of the production apparatus for an active antiseptic water-based fluid of FIGS. 10 and 11.

FIGS. 10 to 12 show a specific example of the present invention in which the photocatalyst layer or the layer having a photocatalyst and a bactericidal metal is combined with the UV irradiation device.

FIG. 10 is a cross-sectional diagram, FIG. 11 is a cross-sectional diagram taken along the line X-X in FIG. 10, and FIG. 12 is a plan view. Although the main portions of this example shown in these figures are the same as those of the apparatus shown in FIGS. 1 and 2, the surface layer composed of a photocatalyst or a photocatalyst and a bactericidal metal is disposed on the vibration vanes 8, and a device for emitting UV light from a UV light source 71 placed outside the tank via an optical fiber 72 is disposed on the surface layer.

Figure 13:
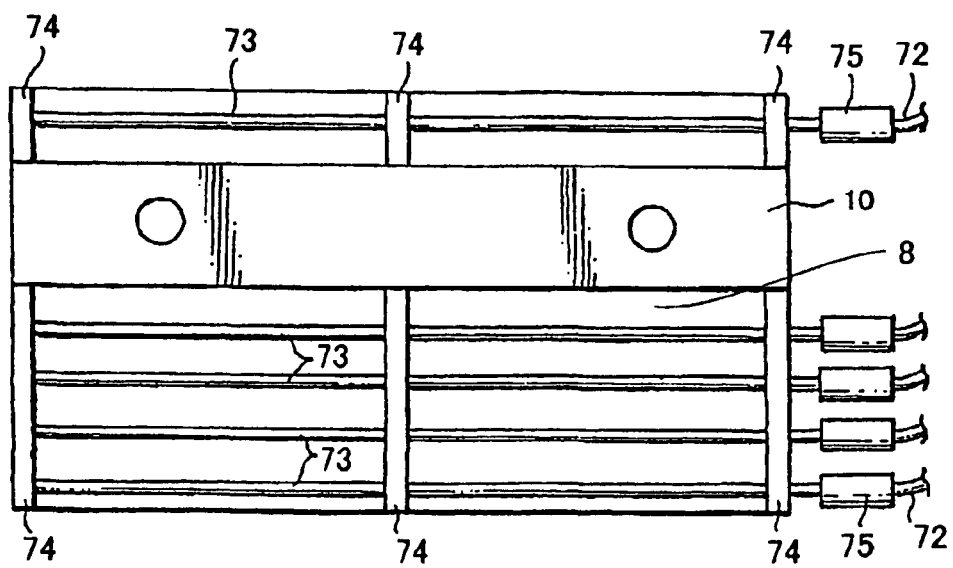
FIG. 13 is a plan view showing the light-leaking portion attached to the vibration vanes.
Figure 14:
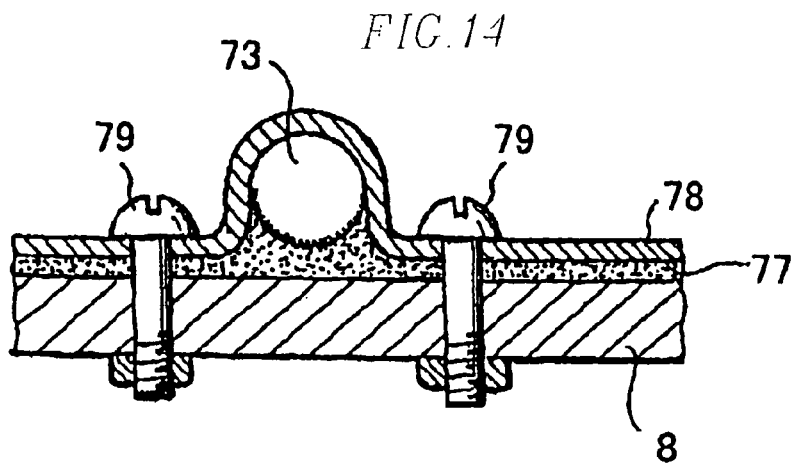
FIG. 14 is a partial cross-section diagram of FIG. 13 showing the light-leaking portion attached to the vibration vanes with a presser member and fastening device.
Figure 15:
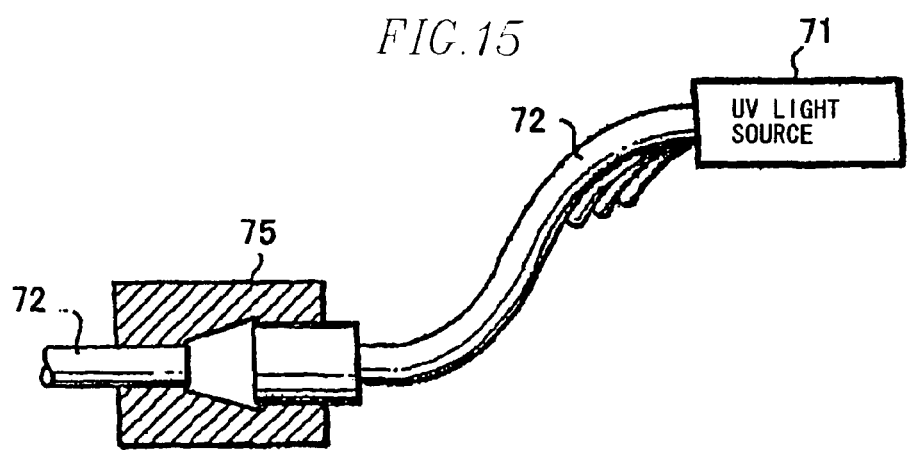
FIG. 15 is a schematic diagram showing an optical wave path from the light source to a location proximal to the vibration vanes.
Figure 16:
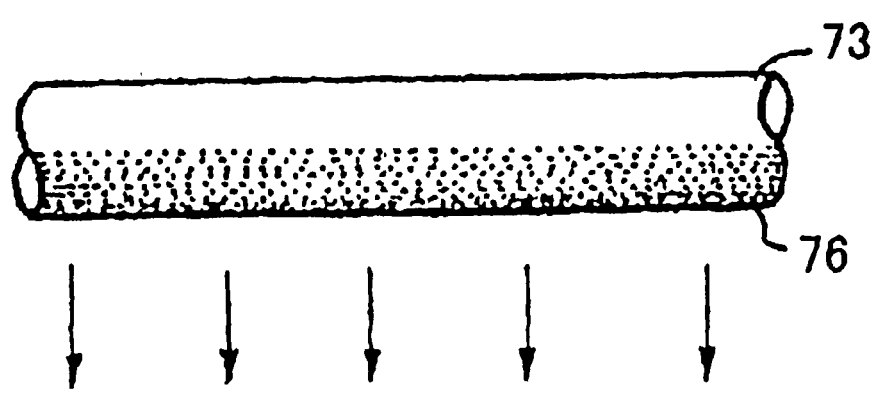
FIG. 16 is a partial side view of the light-leaking portion.
Figure 17:
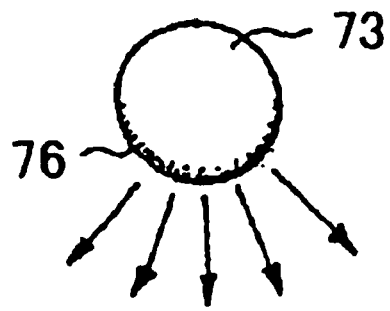
FIG. 17 is a cross-sectional diagram of the light-leaking portion.
Figure 18:
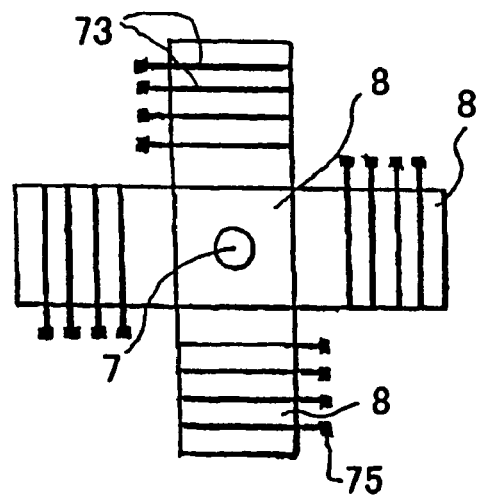
FIG. 18 is a schematic diagram showing an example of light-leaking portions attached to the vibration vanes.
Figure 19:
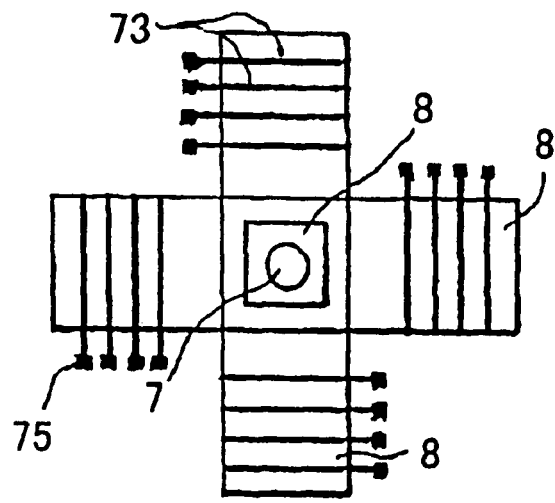
FIG. 19 is a schematic diagram showing another example of light-leaking portions attached to the vibration vanes.
Figure 20:
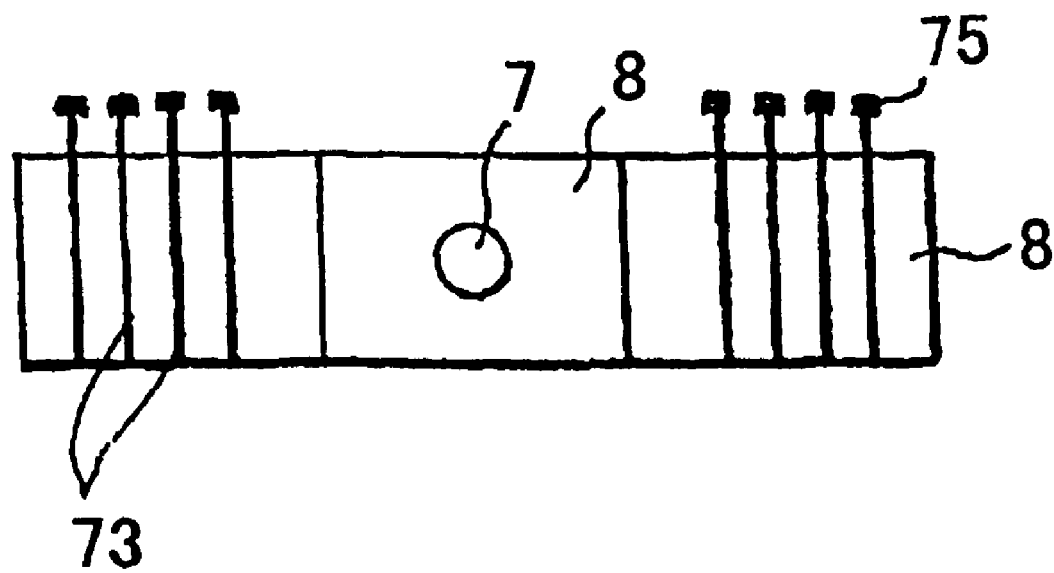
FIG. 20 is a schematic diagram showing still another example of light-leaking portions attached to the vibration vanes.
Figure 21:
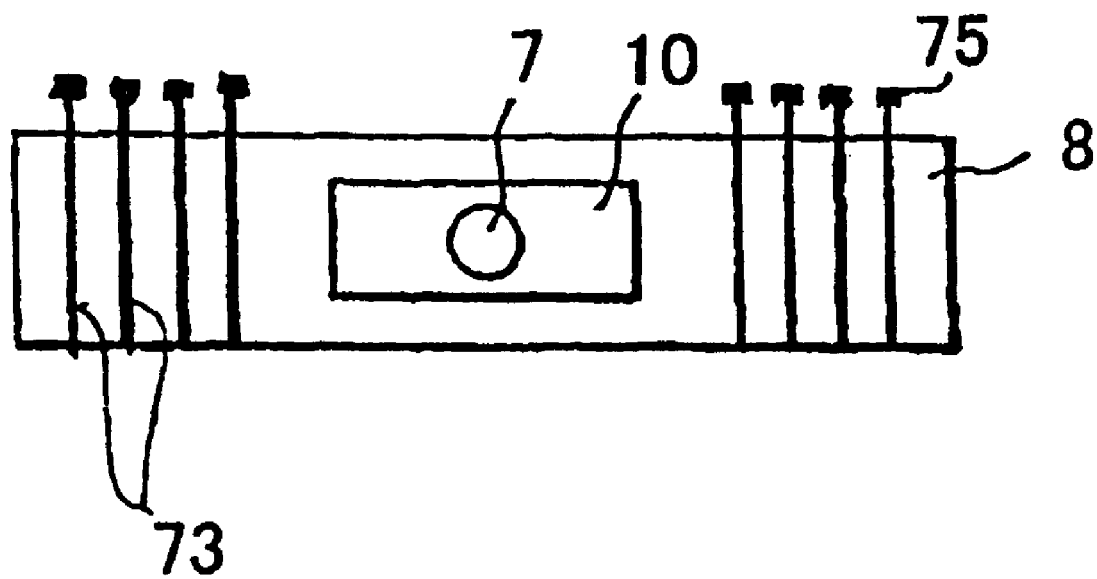
FIG. 21 is a schematic diagram showing a further example of light-leaking portions attached to the vibration vanes.

FIGS. 13 and 14 show light-leaking portions 73 disposed at 1.0 to 100 mm intervals in a substantially parallel fashion on the surface layer composed of a layer 77 that has a photocatalyst or a photocatalyst and a bactericidal metal on a vibration vane 8. There is no limitation on the constituent material for the light-leaking portions 73 as long as light transmitted via the optical fiber strikes the target object. As an example, it is possible to use an optical fiber whose lower portion surface is roughened by sandblasting or another blasting procedure, as shown in FIGS. 16 and 17. The optical fiber having the roughened surface may be configured so that the light introduced to the optical fiber leaks from the light-leaking area 76, which functions as the light-leaking portions 73. The light-leaking portions 73 are fastened with presser members 74 by using fastening devices each composed of a bolt and nut 79. A long thin flexible sheet, for example, a Teflon (registered trademark) sheet (polytetrafluoroethylene) may be used as the presser member 74.

A waterproof and/or water resistant connector 75 is preferably interposed between the light-leaking portion 73 and the optical fiber 72. A flexible material is advantageously used as the connector 75 because the vibrations of the vibration vanes can be absorbed. The light-leaking portions are each preferably connected to the light source with optical fibers.

FIGS. 18 to 21 are schematic diagrams showing the vibration vanes 8 and the state in which the light-leaking portions 73 are attached thereto. The light-leaking portions 73 are disposed facing substantially perpendicular to the distal direction of the vibration vanes 8. The curvatures of the light-leaking portions 73 produced by vibrations in the vibration vanes can thereby be reduced and damage to the light-leaking portions 73 can be alleviated.

The insulated vibrating stirring device of Japanese Patent Application No. 2001-192050 by the present applicant may be used as the vibrating stirring device in the present invention. A constant amount of current can thereby be allowed to flow to the treated fluid, and this contributes to antisepticization and sterilization in various ways. A constant current device is therefore preferably used to achieve this end.

Figure 23:
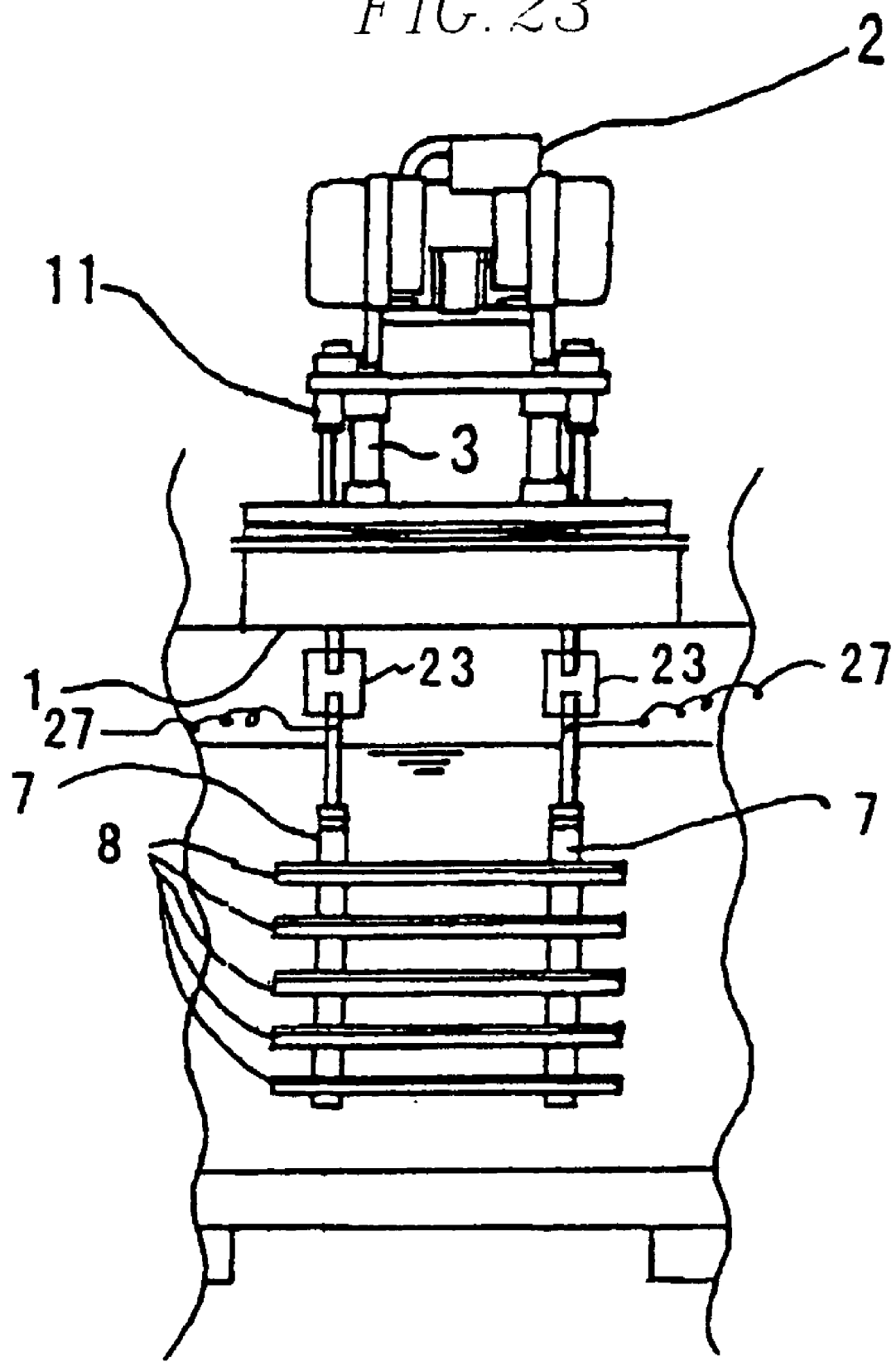
FIG. 23 is a cross-sectional diagram taken along the line Z-Z of FIG. 22.
Figure 32:
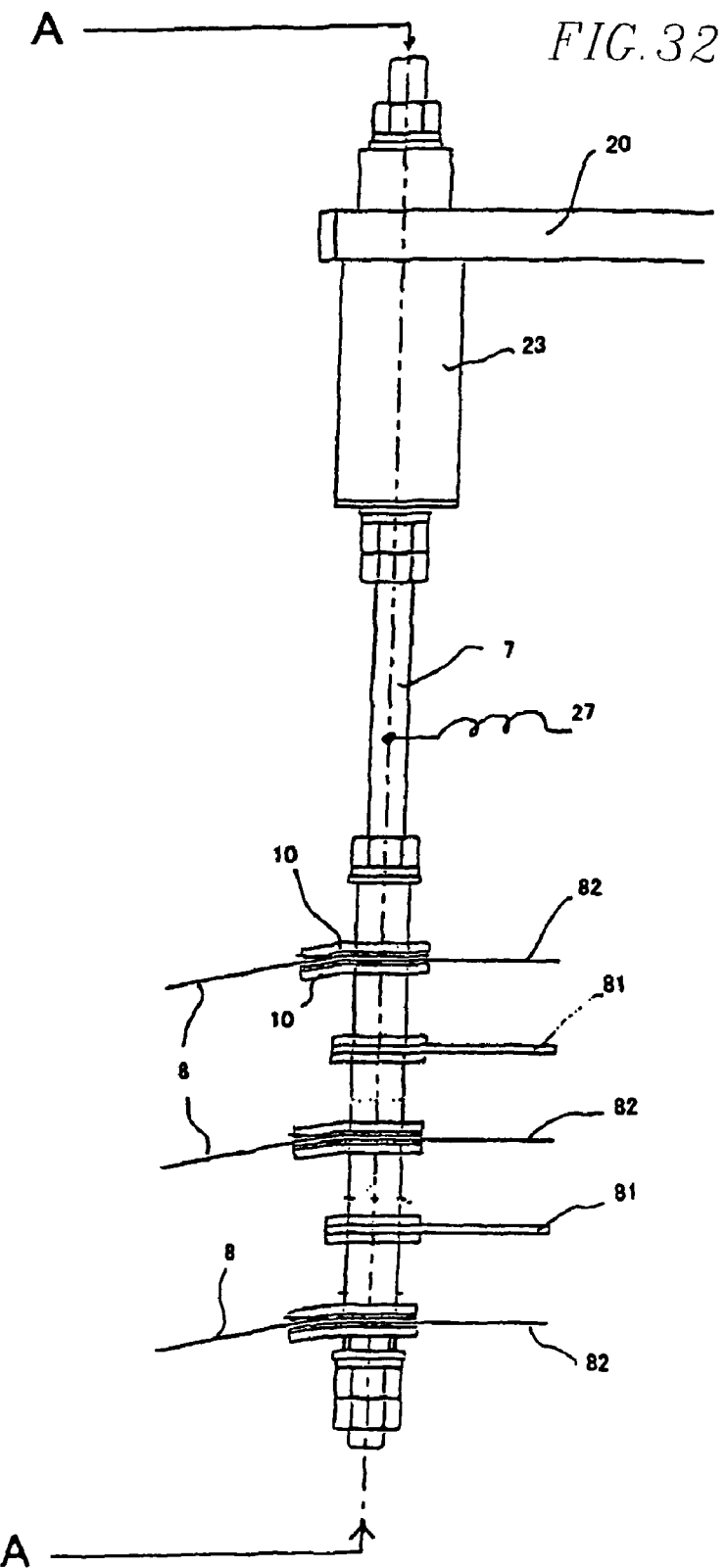
FIG. 32 is a side view of FIG. 31.

The insulated vibrating stirring device is provided with an electrically insulated area (denoted by reference numeral 23 in FIGS. 23 to 25, for example) on a portion of the linkage section between the vibration generator and the vibration rod or the vibration rod itself in the vibrating stirring device. A type of electrolytic phenomenon can be created in the water system in addition to vibration stirring by allowing a constant current to flow from, for example, a constant current device to the distal portion away from the electrically insulated area. Thus, the treated water becomes electrolyzed, and the bactericidal effect is sustained. Vibration vanes and auxiliary vibration vanes may be used as the device for transmitting an electric current to the treated system, as shown in FIGS. 23, 32, and other diagrams. It is also possible to insert a separate pair of electrodes into the treatment tank.

When carrying out the production method for active antiseptic water or an active antiseptic water-based fluid according to the present invention, it is possible to add an alkali metal salt (NaOH, KOH, or the like), an alkali metal halide, or other electrolytes to the treated water or the treated water-system through which current flows. Na or K is preferably used for the alkali metal, and chlorine is preferably used for the halogen.

An inverter digital-controller multifunctional small rectifier device (for example, Power Master, Model: PMD1, manufactured by Chuo Seisakusho, Ltd.) may be used as for the constant current device. The current provided thereby is typically 0.5 to 100 A, and is preferably 3 to 20 A; and the voltage is typically 1 to 15 V, and is preferably 2 to 4 V.

A power source that rectifies (including the addition of a direct current component) AC current and outputs the rectified current is ordinarily used in the present invention as the power source (constant electric current device) for generating electric current that flows to the insulated vibrating stirring device. Examples of the power source that may be used as a constant current device or a rectifier include a transistor-regulated power source, a dropper-type power source, a switching power source, a silicon rectifier, an SCR-type rectifier, a high-frequency rectifier, an inverter digital-controller rectifier device (for example, Power Master manufactured by Chuo Seisakusho, Ltd.), KTS Series devices manufactured by Sansha Electric Industry Co., an RCV power source manufactured by Shikoku Denki Co., a power source that supplies rectangular pulse current by switching transistors on and off and that is composed of a switching regulator power source and a transistor switch, a high-frequency switching current (using diodes to convert the alternating current into a direct current, then adding a 20 to 30 KHz high frequency waveform to the transformer by using power transistors, and once again rectifying the voltage to extract a smooth output), a PR-type rectifier, a high-frequency control-type high-speed pulse PR power source (for example, HiPR Series devices, manufactured by Chiyoda), and a thyristor antiparallel connection-type.

The current waveforms are described next. Selection of the electric current waveform is important in the present invention. Although the conditions for the required voltage and current cannot be specified unconditionally because the conditions are different depending on the bath composition, tank dimensions, and other factors, in the current situation the overall conditions can be adequately covered with a direct voltage of 1 to 15 V. In view of the above, the industry standard for a rated direct current power source for plating can be used, which consists of four types: 6 volts, 8 volts, 12 volts and 15 volts.

The pulse wave has a width W that is said to be sufficiently small in comparison with the period T. However this is not a strict definition. The pulse waveform also includes waveforms other than square waves. The operating speed of devices using pulse circuits has become faster and pulse widths of a nanosecond ($\sim 10^9$ s) or less can be handled. As the pulse width becomes narrower, maintaining a sharp shape on the leading edge and trailing edge of the pulse becomes difficult. This is due to the fact that the pulse contains high frequency components.

The type of pulse waves include saw tooth waves, ramp waves, triangular waves, composite waves, and rectangular waves (square waves), and other waveforms. Among them, square waves are particularly preferred in the present invention because of their electrical efficiency, smoothness, and other features.

An example of the pulse-plating power source is a source that includes a switching regulator-type direct current power source and a transistor switch and that feeds a pulse current with a rectangular waveform to the load through high-speed repetitions of turning-on and turning-off of the transistor.

A pulse waveform other than a direct current is preferably used in the present invention. The employment of a pulse waveform leads to a reduction in the amount of current and a prevention of increase in the electrical resistance.

When an insulated vibrating stirring device is used as the vibrating stirring device, a portion of the vibrating stirring device can be used as an electrode. One of a pair of insulated vibrating stirring devices can be used as the anode and the other can be used as the cathode. In this embodiment, each of the anode and cathode may be assigned to a single vibrating stirring device, or the anode may be assigned to one of the vibration rods attached to a single vibrating stirring device and the cathode may be assigned to the other vibration rod. It is also possible to use the insulated vibrating stirring device as, for example, the anode, and to set the metal of the treatment tank or another component to be the cathode.

Figure 24:
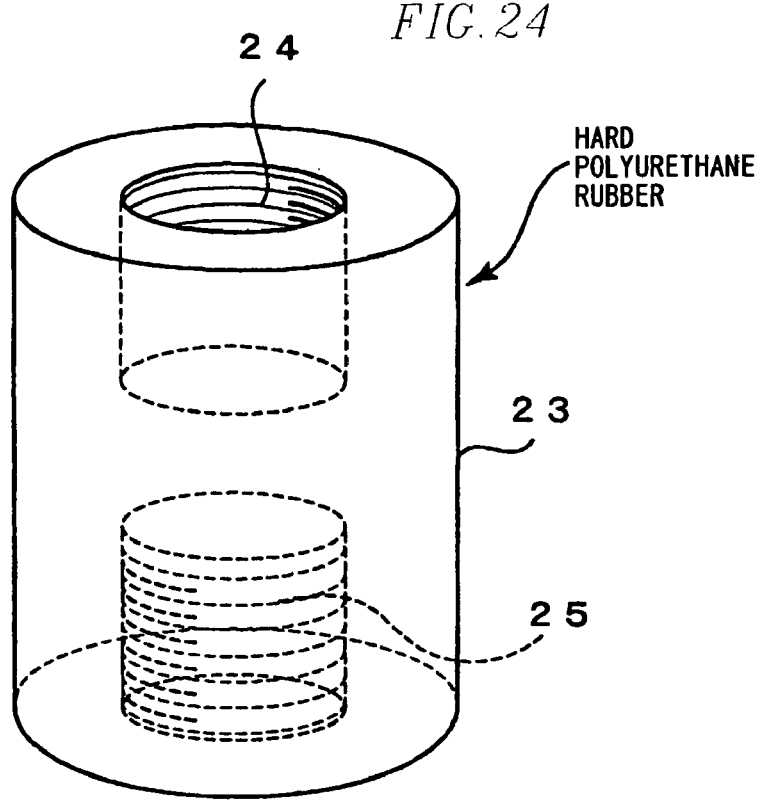
FIG. 24 is a perspective view showing an example of a columnar insulation member forming an insulation area included in the insulated vibrating stirring device of the present invention.
Figure 25:
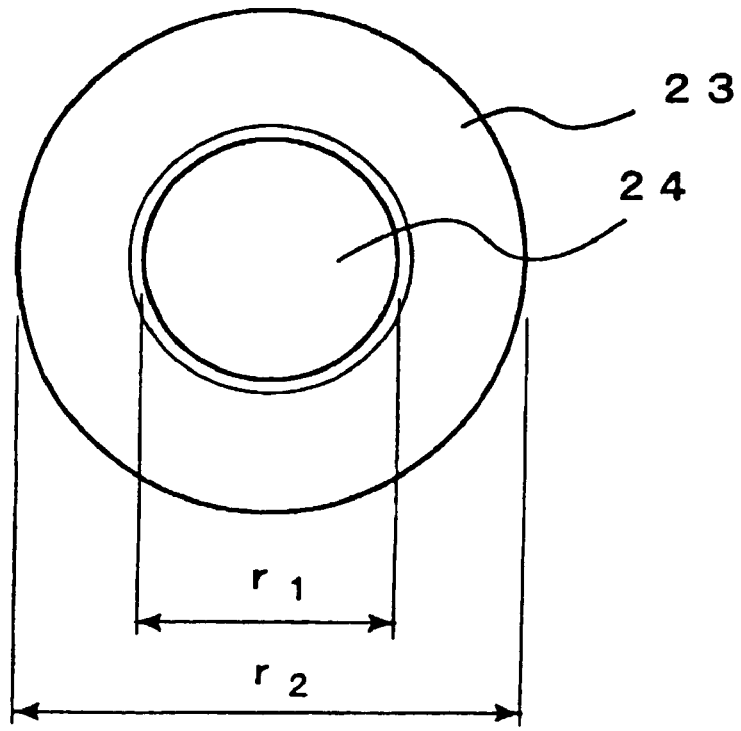
FIG. 25 is a plan view of FIG. 24.
Figure 26:
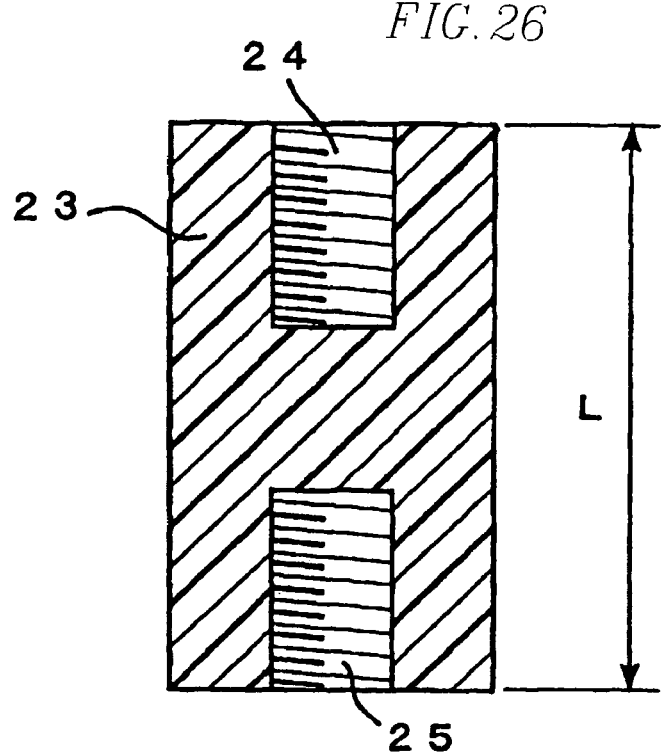
FIG. 26 is a longitudinal-sectional diagram of FIG. 24.
Figure 27:
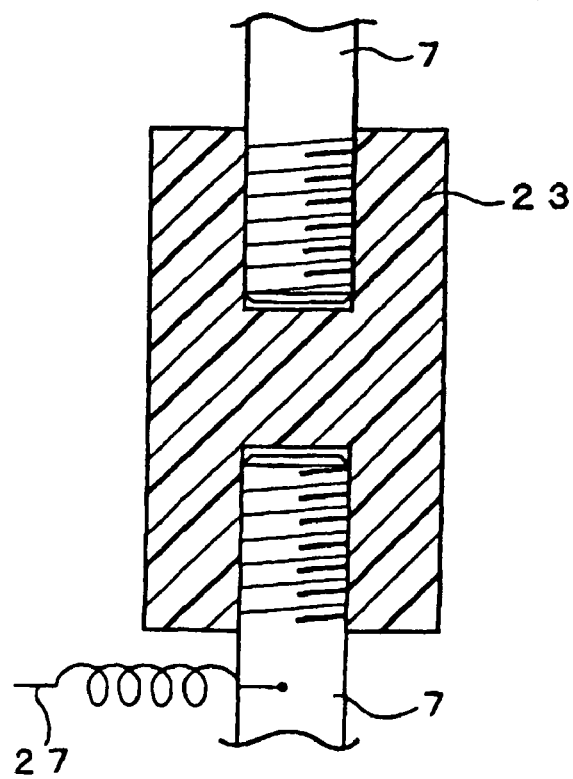
FIG. 27 is a longitudinal-sectional diagram in which the vibration rod is connected to the columnar insulation member of FIGS. 24 to 26

The technology of the insulated vibrating stirring device itself is described in Japanese Patent Application No. 2001-192050, a prior application by the present applicant, and an example thereof will be described hereinafter with reference to FIGS. 22 to 23. Vibrations produced by the vibration-generating device 12 are transmitted to the vibration rod 7 via the connector (stress-dispersing device) 11. Because the vibration rod 7 and vibration vanes 8 are used as electrodes in this example, the columnar insulation member 23 is inserted between the vibration-generating device 12 and vibration rod 7. As used in the present invention, the columnar insulation member 23 serves as a specific example of an electrically insulated area. Details of the columnar insulation member 23 are shown in FIGS. 24 to 27. FIG. 24 is a perspective view of a specific example of the insulation area, FIG. 25 a plan view thereof, and FIG. 26 a cross-sectional diagram. Reference numeral 23 denotes a columnar (made of hard rubber) insulation member that forms the insulation area, and apertures, more specifically fitting apertures 24 and 25 are formed in the top face and the bottom face of the column to receive the linkage band (for example, vibration transmission member 21 in FIG. 6) that connects the vibration rods 7 or the vibration rod with the vibrating stirring device. FIG. 27 shows the state in which the vibration rods 7 and 7 are inserted into the fitting apertures 24 and 25. Reference numeral 27 denotes an electric wire, which allows the vibration rod 7 and vibration vanes 8 to function as electrodes. In some cases, electrode auxiliary vanes 8' (refer to FIG. 28) may be used in combination with the vibration vanes 8. When they are employed, the vibration vanes do not necessarily have to function as electrodes, but may serve exclusively for vibration stirring, and a synthetic resin may be used as a material for the vibration vanes. The electrode auxiliary vanes 8' serve exclusively as electrodes, and the auxiliary vanes may be substantially devoid of vibration stirring ability.

Described below is a specific example of the dimensional relationship between the columnar insulation member (made of hard polyurethane rubber) 23 and the vibration rod 7. For example, when the vibrating rod has a diameter ($r_1$) of 16 mm, the diameter of the fitting aperture in FIG. 26 is naturally also 16 mm. The vibration rod serves as a male screw, and the sidewall of the fitting aperture is threaded. The diameter ($r_2$) of the columnar insulated member is 50 mm, and the length (L) of the columnar insulation member is 100 mm.

Figure 22:
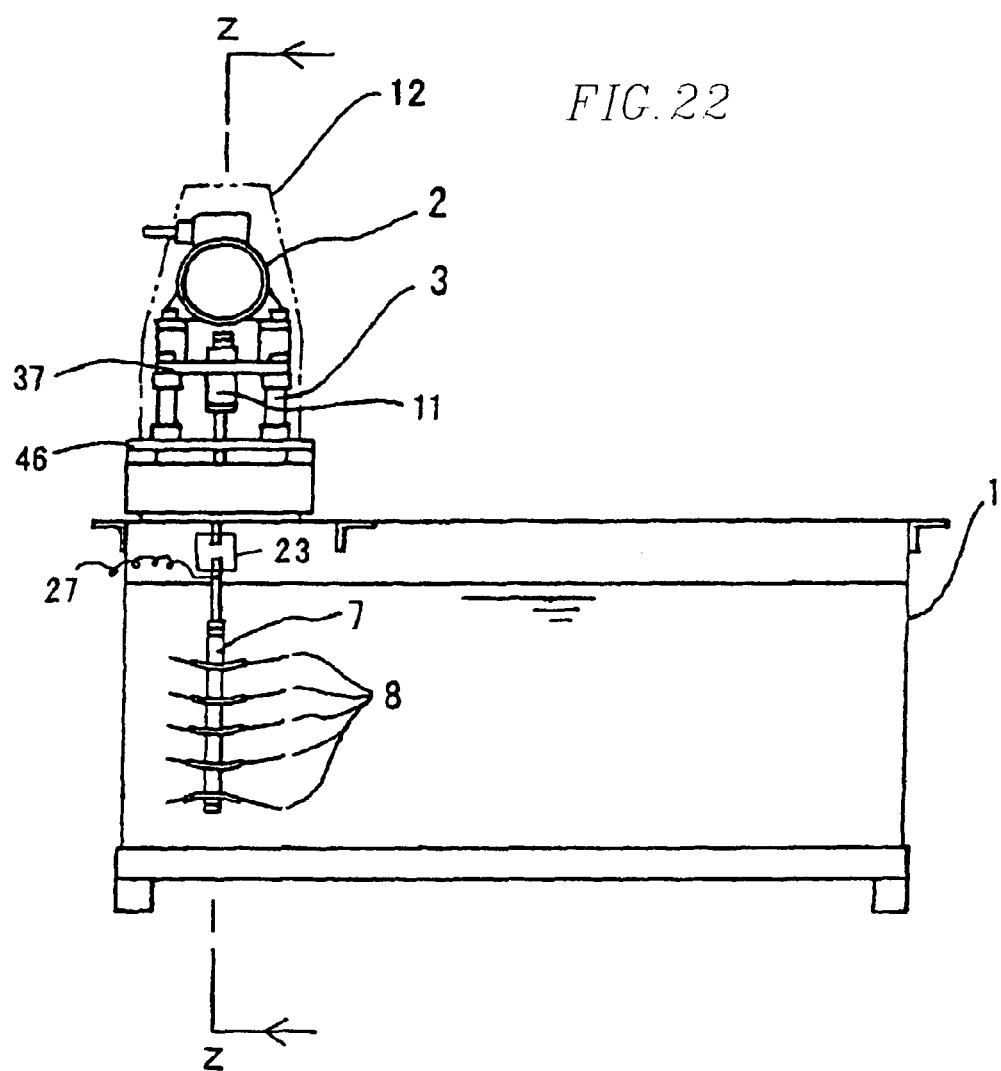
FIG. 22 is a cross-sectional diagram of an embodiment in which an insulated vibrating stirring device is used in place of the vibrating stirring device of FIG. 1.
Figure 28:
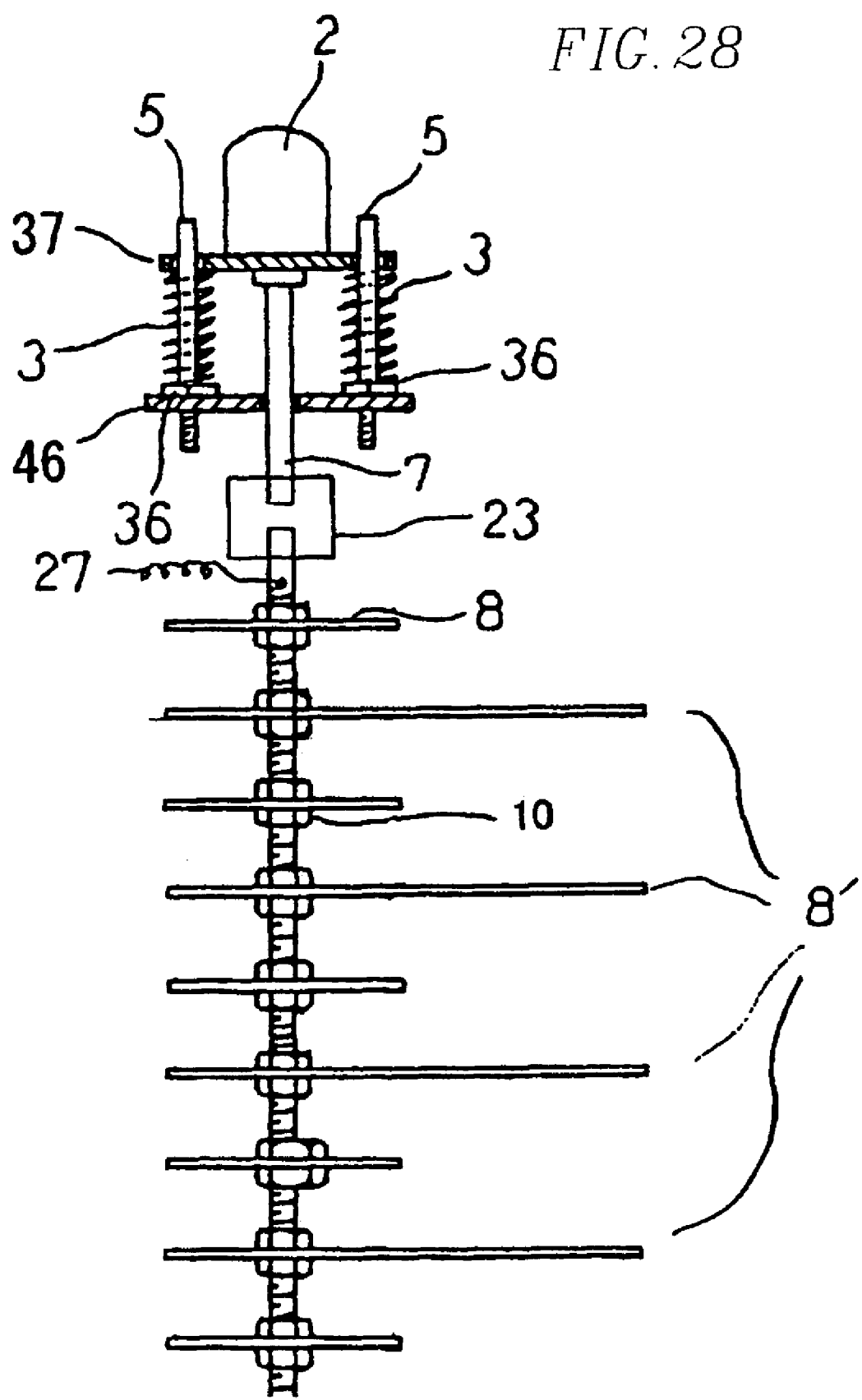
FIG. 28 shows a cross-sectional diagram of a type in which electrode auxiliary vanes 8' are provided in an insulated vibrating stirring device.

When the insulation area is an electrically insulated area, an electricity input area may be provided in a location between the electrically insulated area and the treated water or treated water system (for example, by connecting the electrical wire 27 to a metal vibration rod), as shown in FIGS. 22, 23, and 28.

In brief, if an insulated vibrating stirring device is used, the treated water can be subjected to electrolysis. The activating, antiseptic effect of the present invention is basically due to vibration stirring. However, the flow of electricity in the system and electrolysis associated therewith also contribute, to a certain extent, to the activating, antiseptic effect, and other effects. It is considered that hypochlorous acid has the greatest effect when NaCl is added to the system. If $TiO_2$ or another photocatalyst (which must be exposed to UV light) is used in conjunction therewith, an even greater effect can be obtained.

Figure 29:
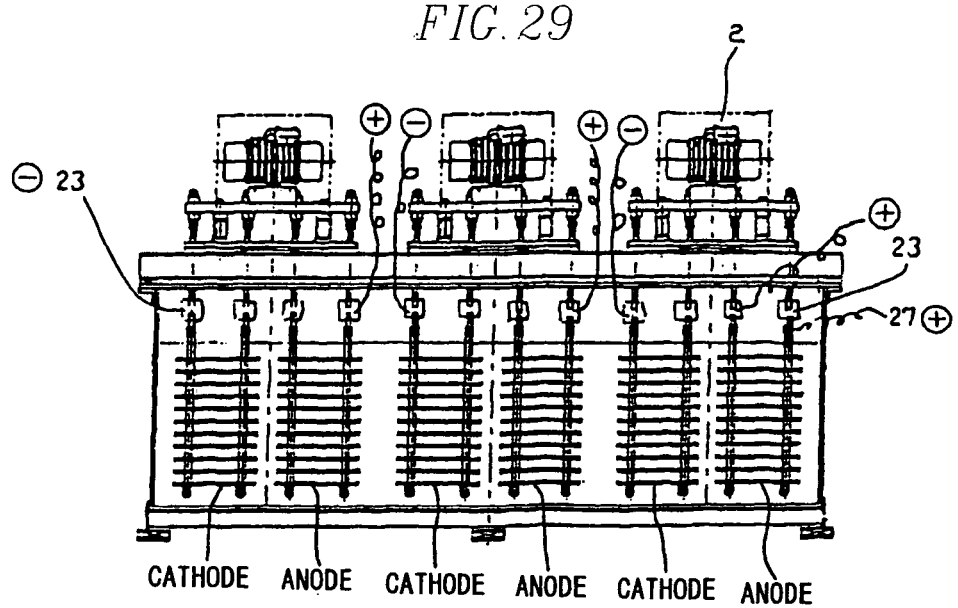
FIG. 29 is a cross-sectional diagram showing an example of an arrangement of vibration-generating devices and anodes and cathodes composed of vibration vanes in the insulated vibrating stirring device.
Figure 30:
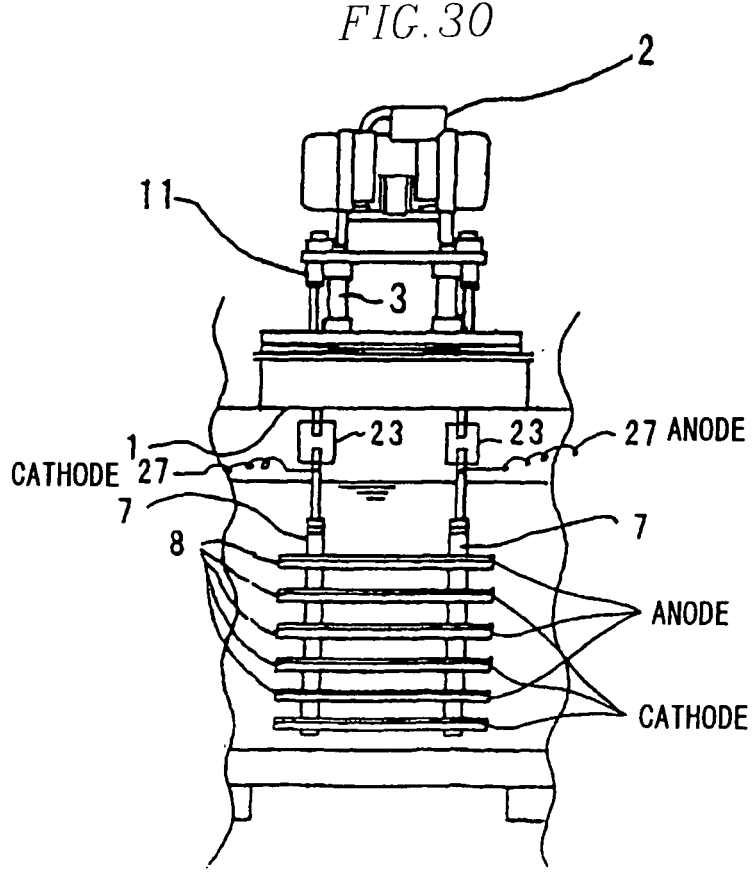
FIG. 30 is a cross-sectional diagram showing an example of an insulated vibrating stirring device of a type in which the positive pole and the negative pole are varied for each vibration vane.

When the vibration vanes and/or auxiliary vibration vanes are used as the electrodes, in most cases, all the vanes associated with a single vibration-generating device are used as the same pole. However, even when all the vibration rods and the vibration vanes (including the auxiliary vibration vanes) are connected to a single vibration-generating device, as shown in FIG. 29, a set of the rods and vanes may serve as the positive pole and another set may serve as the negative pole. When the vibration-generating device is a type in which vibration vanes are laid across two vibration rods, as shown in FIG. 30, the vibration vanes may be alternately assigned to positive and negative poles. In this case, since the vibration rod on the right side in FIG. 30 is a positive pole, the vibration vanes used as positive poles are attached so as to be electrically connected to the positive pole vibration rod; and since the vibration rod on the left side is a negative pole, the positive pole vibration vanes are attached so as to be electrically insulated from the left side vibration rod. The vibration vanes 8 that are used as the negative poles are attached to the vibration rods in the relationship where the electrical connections are reversed.

Figure 31:
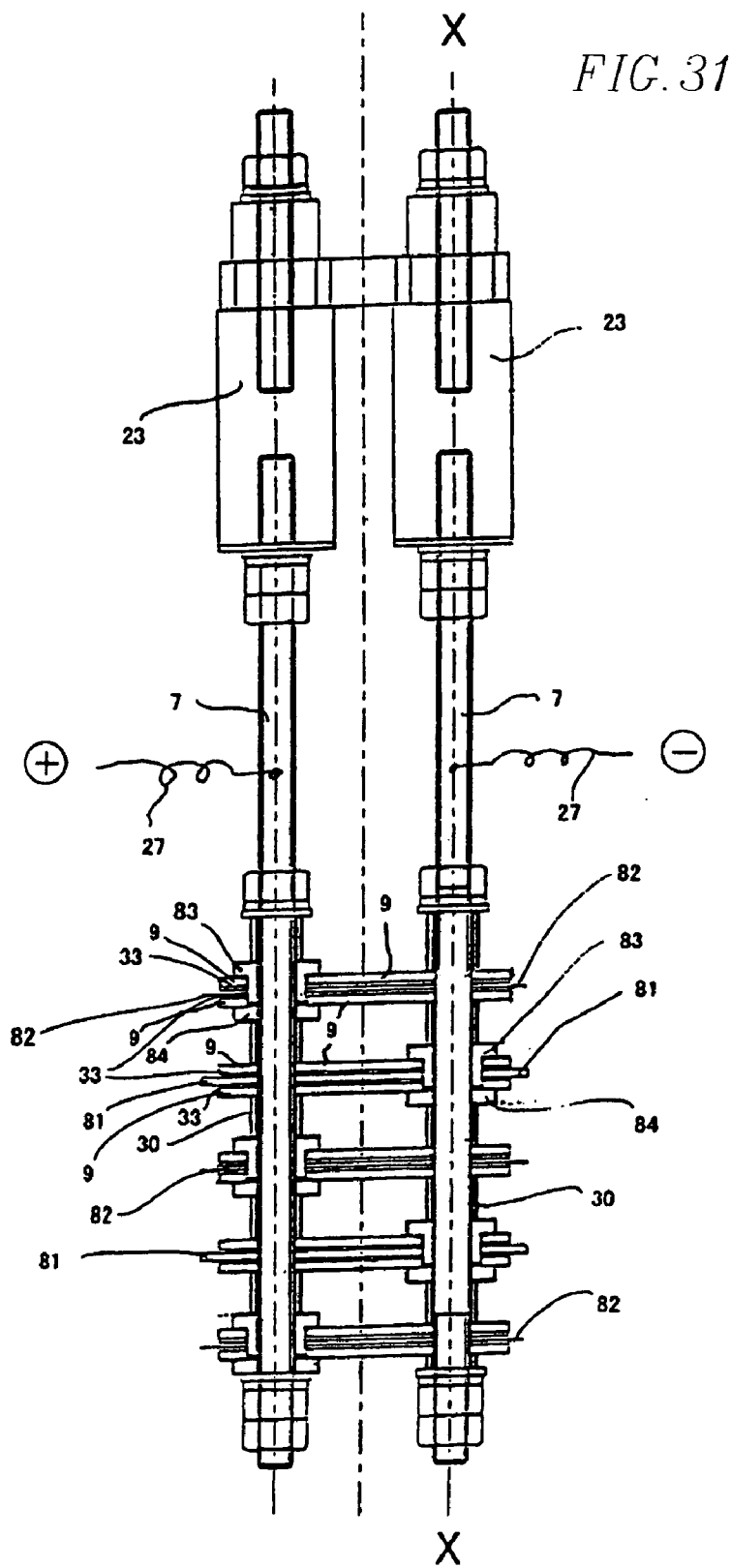
FIG. 31 is across-sectional diagram (taken along the line A-A of FIG. 32) showing an example of an insulated vibrating stirring device when one of the vibration rods is a positive pole and the other vibration rod is a negative pole in a vibrating stirring device that transmits vibrations produced by a single vibration motor to the vibration vanes via two vibration rods.

FIGS. 31 and 32 show a partial enlarged diagram of the vibrating stirring device that transmits vibrations produced by a single vibration motor to the vibration vanes via two vibration rods, and the device is of the type shown in FIG. 30. FIG. 31 is a cross-sectional diagram of the same portion as that shown in FIG. 30, and FIG. 32 is a cross-sectional diagram taken along the line X-X of FIG. 31. In the example of FIG. 31, the vibration rod on the left side is the positive pole; the first, third, and fifth vibration vanes 8 from the top are electrically insulated from the electrode (negative electrode) 82; and the second and fourth vibration vanes 8 from the top are electrically connected to the electrode (positive pole) 81. The vibration rod on the right side is a negative pole; the first, third, and fifth vibration vanes 8 from the top are electrically connected to the electrode (negative electrode) 82; and the second and fourth vibration vanes 8 from the top are electrically insulated from the electrode (positive pole) 81. The positional relationship in these diagrams is that a set of a vibration vane 8 and an electrode 81 or 82 projects left and right from the rods at substantially the same height, which stands in contrast to the relationship between the vibration vanes 8 and the electrode auxiliary vanes 8' in FIG. 28, in which a vibration vane, an electrode, a vibration vane, and so forth are attached in order from the top.

Figure 33:
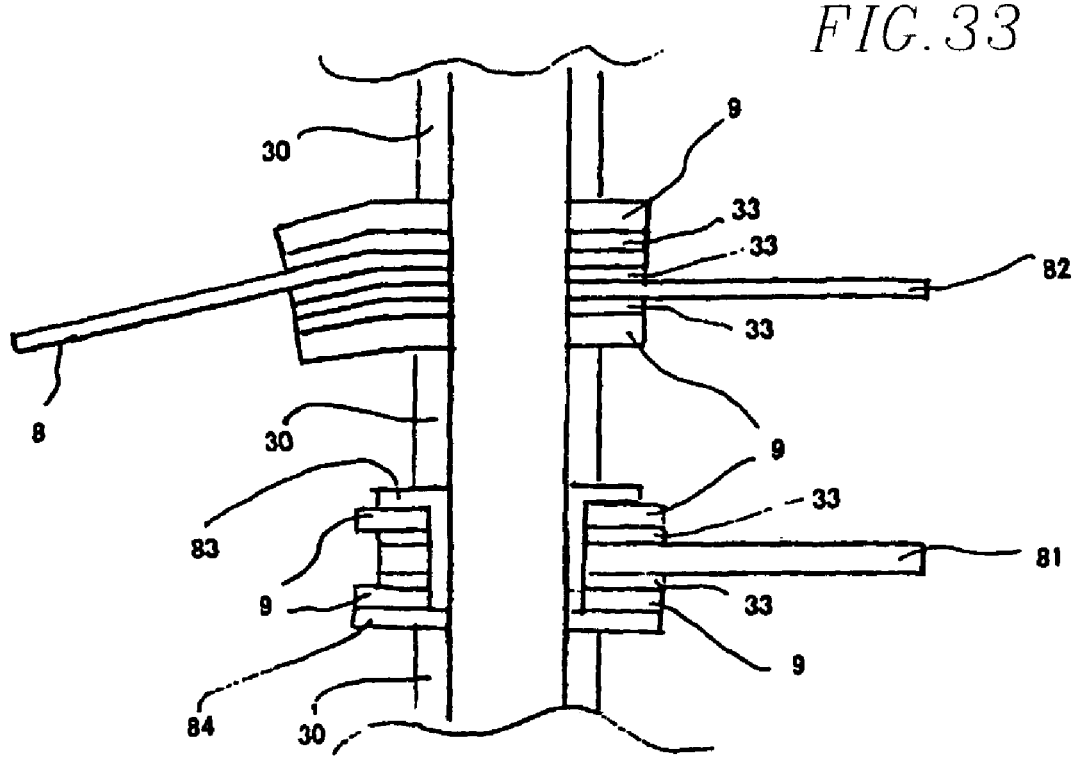
FIG. 33 is a partial enlarged diagram of the cross-section taken along the line X-X of FIG. 31.
Figure 34:
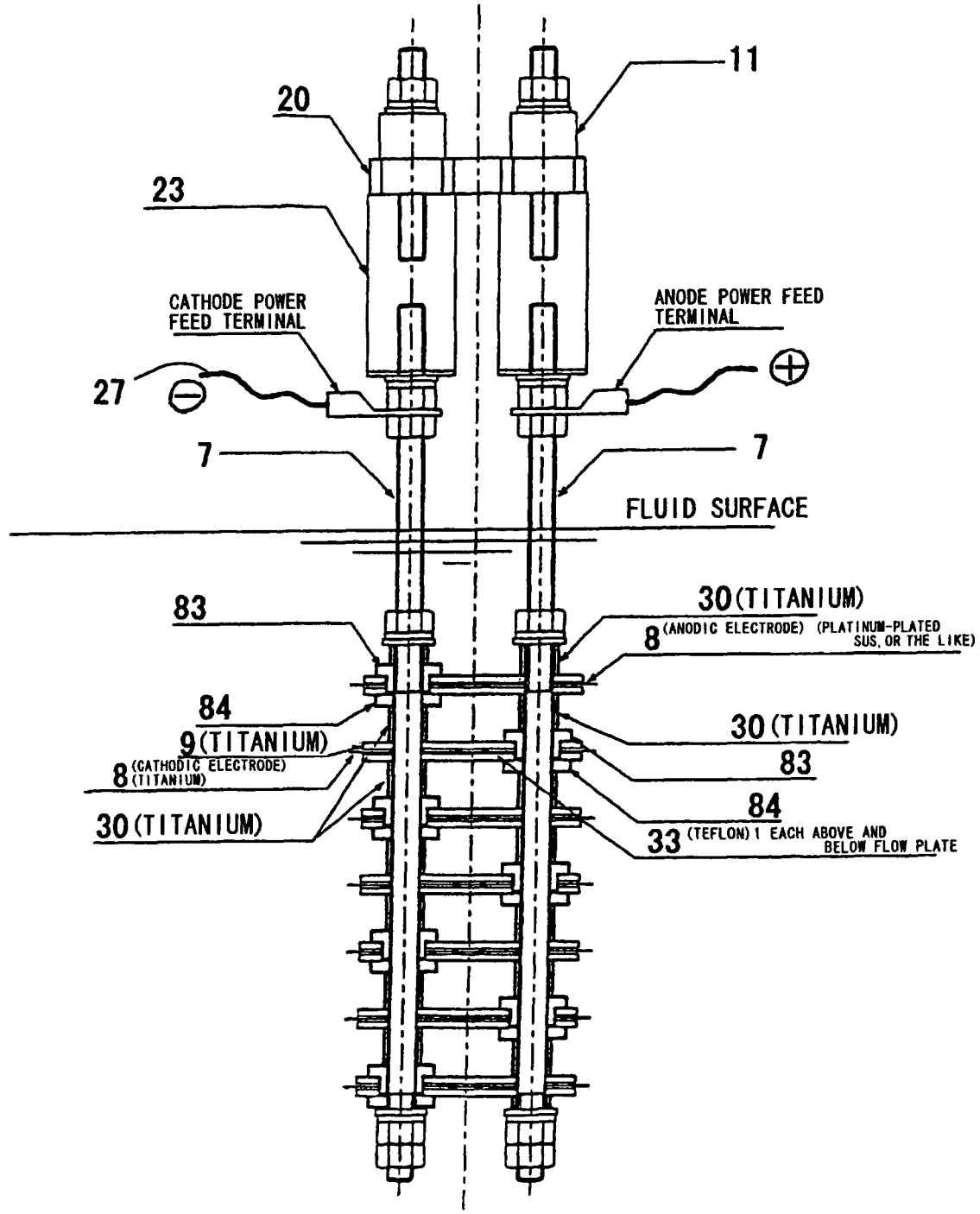
FIG. 34 is across-sectional diagram (taken along the line A-A of FIG. 35) showing an example of an insulated vibrating stirring device of the type in which the type shown in FIGS. 31 to 33 is further simplified.
Figure 35:
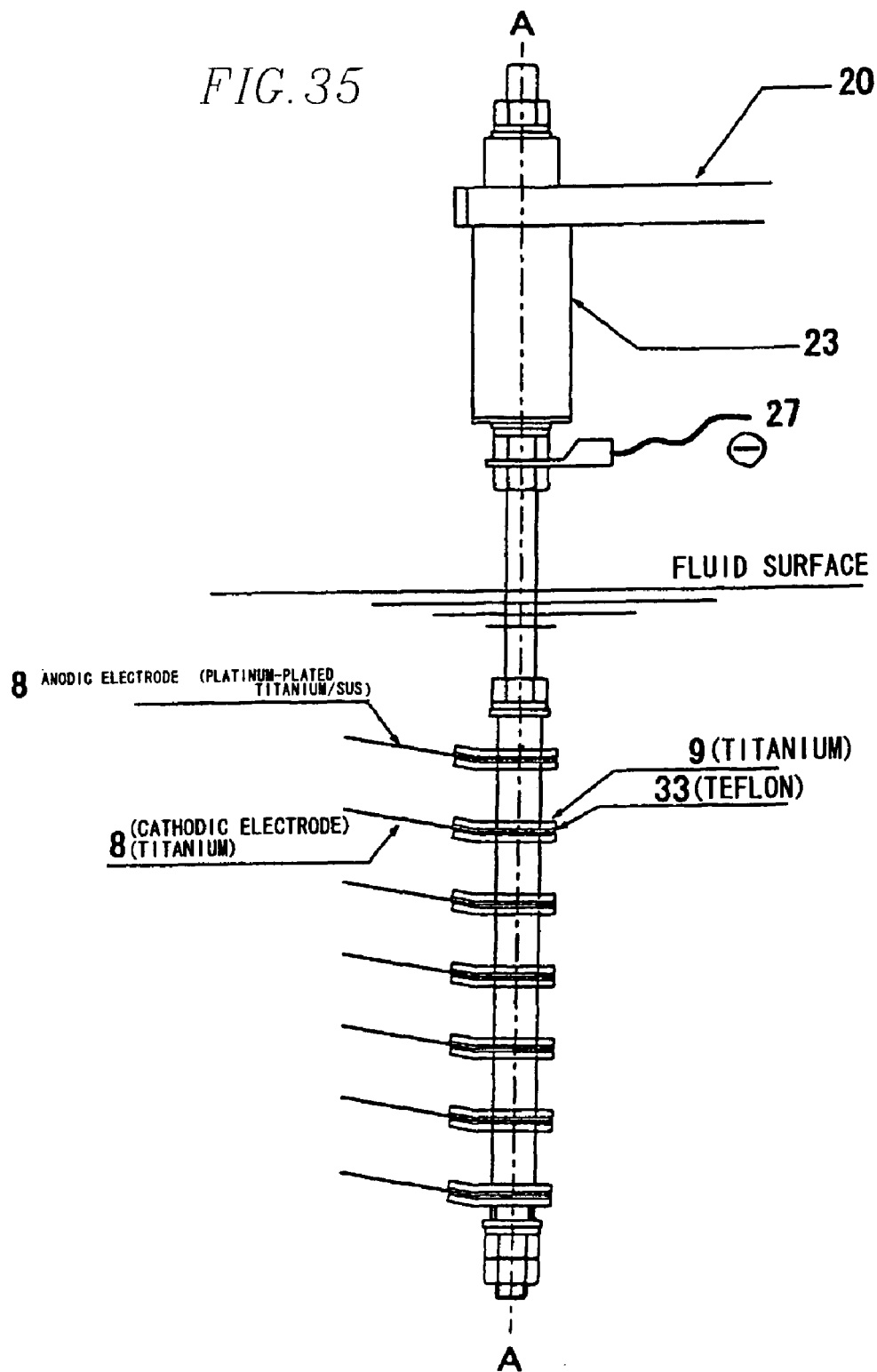
FIG. 35 is a side view of FIG. 34.

FIGS. 34 and 35 show a variation of the type shown in FIGS. 31 to 33. The type shown in FIGS. 31 to 33 has electrodes (auxiliary vanes) 81 and 82, in addition to the vibration vanes 8, as shown in FIG. 32. The electrodes (auxiliary vanes), which are not designed to bring about flow agitation to the system, are different from the vibration vanes. Therefore the type shown in FIGS. 34 and 35, which does not have such auxiliary vanes 81 and 82, provides greater flow to the system. However, since the electrode surface area is small, the limit of the electric current is low. When titanium is used as the cathode, the cathode does not oxidize. On the other hand, since the anode oxidizes when titanium is used for the anode, a titanium oxide film is formed and current stops flowing therethrough. Therefore the metal plate (titanium or SUS is commonly used) for the anode is plated with platinum. The platinum-plating film has a corresponding effect even if the film is not continuous, and a plated film thickness of about 1.3 to 2.5 μm is sufficient to achieve its purpose.

Described above is a type in which a photocatalyst, or a photocatalyst and a bactericidal metal, together with a UV irradiation mechanism is disposed on the electrodes or vibration vanes attached to a vibration rod. The type shown in FIGS. 36 to 38, however, is configured such that a photocatalyst set 93 in which a photocatalyst and a UV irradiation mechanism are combined is placed in the vicinity of the insulated vibrating stirring device 56. The photocatalyst set is so structured that a plurality of plate-like bodies 91 having a photocatalyst layer, for example an anatase-type titanium oxide layer, or a combination of the photocatalyst layer and a bactericidal metal layer on the surface thereof are placed at regular intervals and assembled using bolts and nuts 92, as shown in FIGS. 37 and 38. Each plate-like layer 91 is provided with a layer composed of a photocatalyst or a photocatalyst and a bactericidal metal, a UV irradiation device in the same manner as the vibration vanes.

When the insulated vibrating stirring device is driven, the treated fluid is caused to flow with good force and pass between the plate-like bodies 91 and 91. In order to prevent the photocatalyst set 93 from interfering with the flow of the treated fluid, the side faces in FIG. 38 are set so as to face the vibration vanes of the insulated vibrating stirring device. As a result, the photocatalyst set does not interfere with the vibrational flow, and since a photocatalyst set connected with the optical fibers does not vibrate, the optical fibers can be prevented from being damaged and there is no concern about other malfunctions due to vibration.

Figure 36:
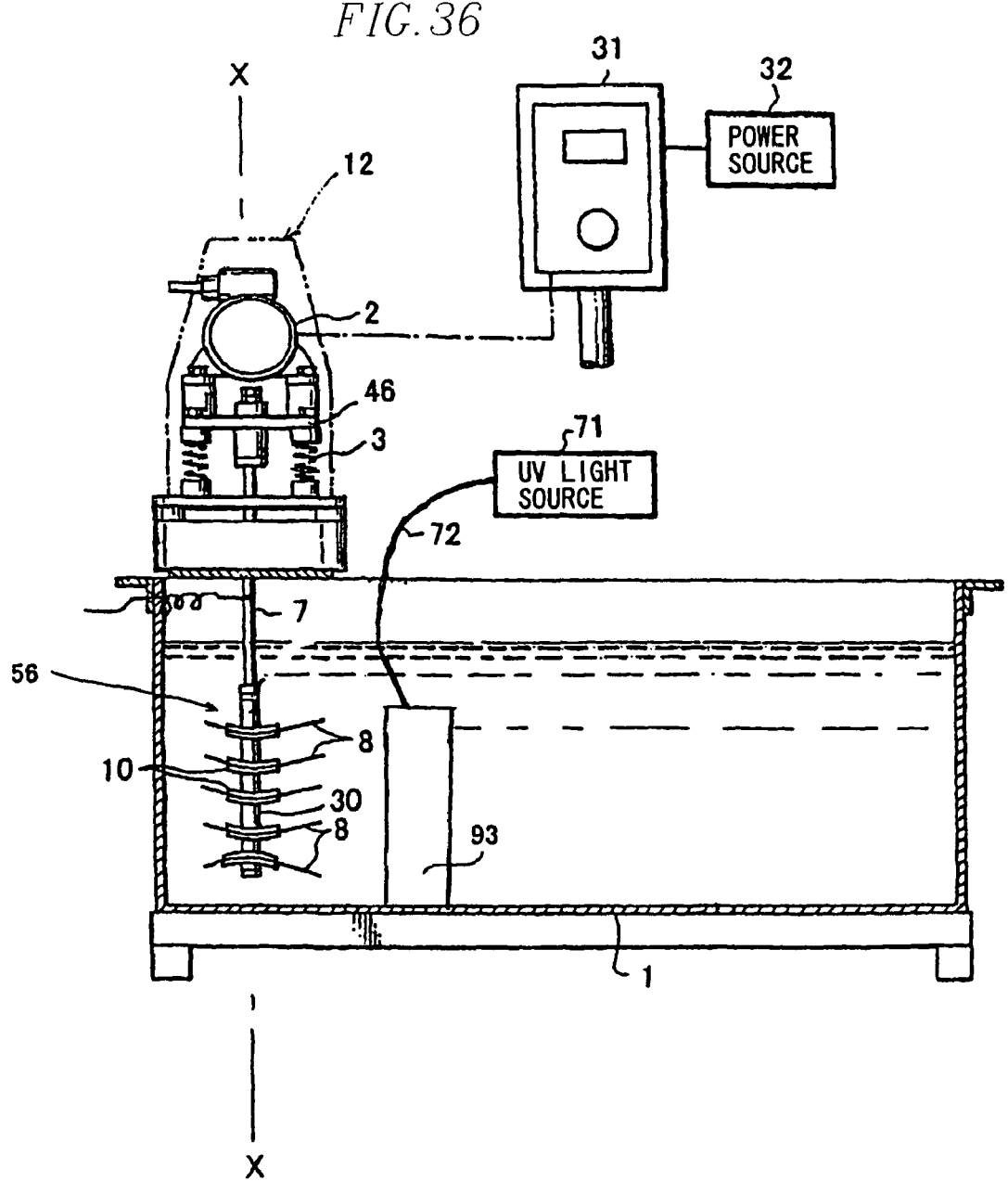
FIG. 36 is a schematic diagram showing an example of producing active antiseptic water or an active antiseptic water-based fluid in which a photocatalyst set is disposed next to the vibrating stirring device.

The photocatalyst may also be present in the treatment tank as particles in a dispersed state. The details of this configuration may be referred to in the specification of Japanese Patent Application No. 2000-395218 submitted by the present applicant. In short, a photocatalyst layer is formed on ceramic, metal, synthetic resin, magnetic particles, or electroconductive particles. The particle diameter is 0.1 to 5 μm, and is preferably 0.1 to 3 μm. FIGS. 13 and 14 show an embodiment in which a photocatalyst layer or a layer composed of a photocatalyst and a bactericidal metal are disposed on the surface portion (outside portion) of the vibration vanes. On the other hand, in the example of FIGS. 36 to 38, a plurality of plate-like bodies 91 having a photocatalyst layer (for example, TiO₂ film) or a layer composed of a photocatalyst and a bactericidal metal on at least the surface thereof, as shown in FIG. 37, are arranged with gaps, and the plates are integrated with bolts and nuts 92 to form a photocatalyst set 93. It is also possible to adopt a structure where UV light is emitted from a UV light source to the surface of the plate-like bodies 91 in the photocatalyst set 93 in the same way as the example as shown in FIGS. 13 to 14, and FIG. 36 depicts such a configuration. A photocatalyst set 93 with this structure is disposed so that the plate-like bodies 91, 91, . . . shown in FIGS. 37 and 38 are parallel with the direction of the treated fluid flow produced by vibrational stirring. In this case, the vibrating stirring device can be an ordinary device, but an insulated vibrating stirring device may also be used. It is also possible to assign the plate-like bodies 91 of the photocatalyst set to a positive pole and a negative pole alternately, and the poles used for causing an electrolytic reaction. In some cases, only the photocatalyst set may carry out the electrolytic reaction, or both the insulated vibrating stirring device and the photocatalyst set may be used to perform the reaction.

An ultrasonic emission may be jointly used in the present invention. An ultrasonic wave generation device used in ultrasonic washing or in other applications may be employed as the ultrasonic emission device. The ultrasonic wave frequency that is preferably used is 10 to 70 kHz, and particularly preferable is 10 to 35 kHz.

The active antiseptic water of the present invention is effective as drinking water; cooking water; additive water for beverages and processed foods; water that comes into contact with foods and beverages in the food and beverage processing step; water used in livestock, fish farming, and breeding; water used in plant cultivation; water used in the home; water for swimming pools; water stockpiles for disasters; and other applications. The active antiseptic water-based fluid of the present invention is a water-based fluid that contains the active antiseptic water of the present invention, and examples of the fluid include pastes (glue, ketchup, and other pastes), beverages, condiments (sauce, soy sauce, miso, and other condiments), and tofu. Well water, river water, and wastewater may be treated using the method and apparatus of the present invention for breaking down and removing halogen components, trihalomethanes, and dioxins contained in the water.

The present invention will be described hereinafter by means of examples, which do not limit the present invention in any manner.

EXAMPLE 1

Figure 39:
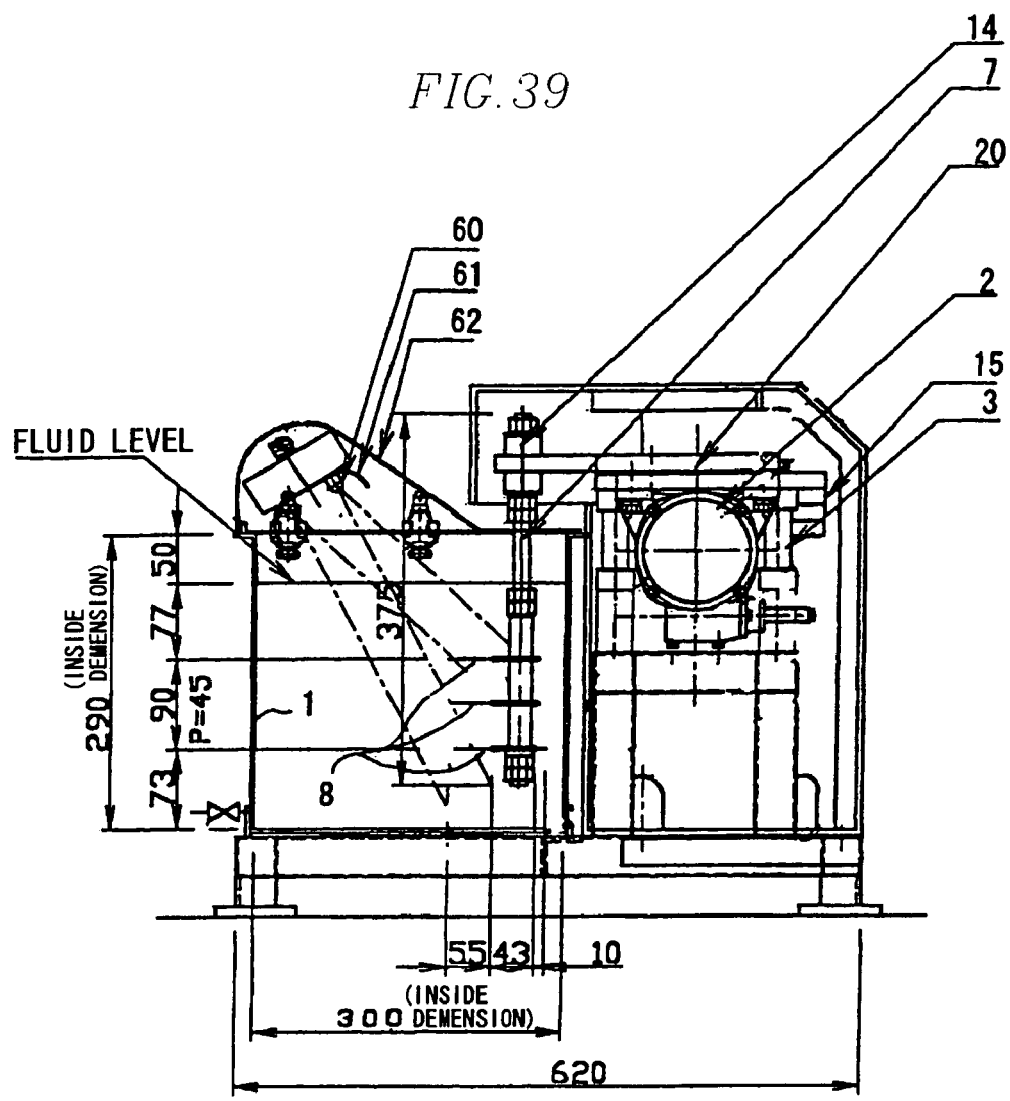
FIG. 39 is a cross-sectional diagram of the production apparatus for active antiseptic water or an active antiseptic water-based fluid of the present invention used in Example 1.
Figure 40:
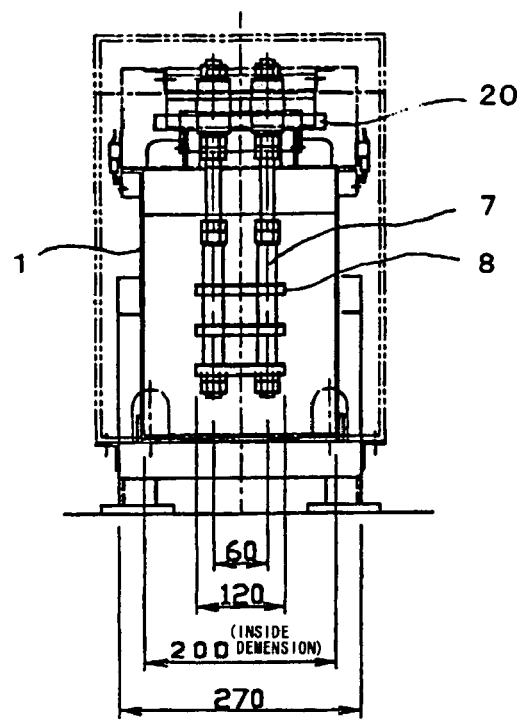
FIG. 40 is a side view of the vibrating stirring device portion in FIG. 39.
Figure 41:
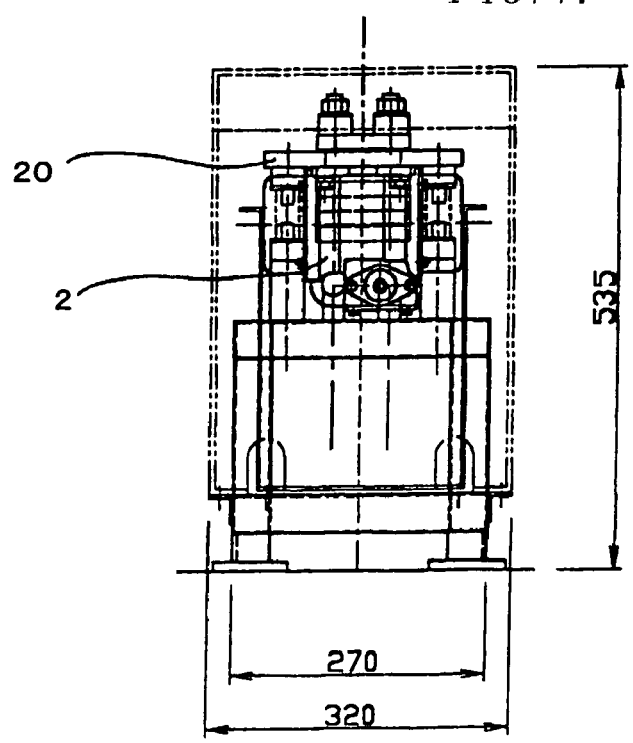
FIG. 41 is a side view from the right side of FIG. 39.

With the device shown in FIGS. 39 to 41, the active antiseptic water of the present invention was produced from tap water (nitrate nitrogen: 0.56 mg/L, nitrite nitrogen: 0.00 mg/L) of Kugahara, Ota-ku, Tokyo.

Vibration stirring device: (Product Name: Ultravibration α-agitator BB cleaner, tabletop model, manufactured by Japan Techno)

Vibration motor: Uras Vibrator KEE-2-2B (150 W×200 V×3-phase), manufactured by Murakami M.F.G. Co., Ltd.

Vibration rods: Two titanium rods with a diameter of 16 mm

Vibration vanes: Vanes having a surface layer composed of an anatase-type titanium oxide on the surface of a titanium plate with a thickness of 0.6 mm (the surface layer is composed of photocatalytic TiO₂ particles (particle diameter: 0.1 to 0.3 μm))

A Teflon (registered trademark) was used as the synthetic resin sheet denoted by reference numeral 33 in FIG. 4.

A titanium plate was used as the vibration vane-fixing member denoted by reference numeral 10 in FIG. 4.

A magnetic material was applied to the device by cutting a cross-shaped notch in the vibration vane fixing member 10, as shown in FIG. 8, and a strong magnetic body (rare earth strong magnetic body with a magnetic intensity of 15,000 gauss) was fitted therein.

Two black light UV lamps with a power of 10 W (FL10BLB-A, manufactured by Toshiba, central wavelength: 352 nm) were used as the UV light source.

The treatment tank was made of SUS304, with inside dimensions of 200×300×290 (height) mm.

A Fuji FVR-C9S inverter manufactured by Fuji Electric was used as the inverter. The vibrating stirring device was operated at 42 Hz at 20° C., and the amount of the nitrate ions ($NO_3^-$) and that of nitrite ions ($NO_2^-$) in the treated water were measured at fixed time intervals.

Vibrations produced by the vibrating stirring device caused the water to flow, and the flow velocity was 240 mm/second, measured with a three-dimensional electromagnetic flow meter (ACM300-A, manufactured by Alec Electronics).

Method for measuring $NO_3^-$ and $NO_2^-$ $NO_3^-$ and $NO_2^-$ were measured in accordance with JIS K0102 (1998).

The test results are shown in the table below.

TABLE 1

Water immediately after treatment

| Sample No. | Treatment time | Nitrate ions[1] | Nitrite ions[1] | pH | Temp. (° C.) |
|---|---|---|---|---|---|
| (1) | 0 | 2.5 mg/L | 0 | 7.6 | 20 |
| (2) | After 2 hours | 2.5 mg/L | 0.08 mg/L | 7.5 | 20 |
| (3) | After 3 hours | 2.4 mg/L | 0.1 mg/L | 7.5 | 20 |
| (4) | After 4 hours | 2.3 mg/L | 0.2 mg/L | 7.5 | 20 |
| (5) | After 7 hours | 2.2 mg/L | 0.3 mg/L | 7.5 | 20 |
| (6) | After 10 hours | 2.0 mg/L | 0.5 mg/L | 7.5 | 20 |

[1] By JIS K0102 43.2 1998
[2] By JIS K0102 43.1 1998

To determine the storage stability of the treated water, the treated water was placed in a ½-liter beaker and left to stand at room temperature. The cloudiness of the water in the beaker was observed with the naked eye, and the water stored in the beaker at room temperature was tested using JIS K0102 for tap water. The number of general bacteria was determined to be the total dependent culture bacteria composed of aerobic and anaerobic bacterium that formed colonies after 24 hours had elapsed in a standard agar medium (36° C.±1° C.).

TABLE 2

| Sample No. | Days left standing | | | | Number of general bacteria in the water on the 12th day |
|---|---|---|---|---|---|
| | 3 days | 6 days | 9 days | 12 days | |
| (1) | Δ | X | X | X | 10³ bacteria/mL |
| (2) | ○ | ○ | Δ | Δ | 40 bacteria/mL |
| (3) | ○ | ○ | ○ | ○ | 20 bacteria/mL |

TABLE 2-continued

| Sample No. | Days left standing | | | | Number of general bacteria in the water on the 12th day |
|---|---|---|---|---|---|
| | 3 days | 6 days | 9 days | 12 days | |
| (4) | ○ | ○ | ○ | ○ | 10 bacteria/mL or less |
| (5) | ○ | ○ | ○ | ○ | 10 bacteria/mL or less |
| (6) | ○ | ○ | ○ | ○ | 10 bacteria/mL or less |

○: Transparent, without clouding
Δ: Somewhat lacking in transparency
X: Colored, without substantially any transparency The samples were placed in 1-liter bottles, sealed, and stored at room temperature. The water in the bottles was examined for clouding with the naked eye.

TABLE 3

| Sample No. | Months left standing | | | |
|---|---|---|---|---|
| | 1 month | 3 months | 6 months | 8 months |
| (1) | ○ | Δ | X | X |
| (2) | ○ | ○ | Δ | Δ |
| (3) | ○ | ○ | ○ | ○ |
| (4) | ○ | ○ | ○ | ○ |
| (5) | ○ | ○ | ○ | ○ |
| (6) | ○ | ○ | ○ | ○ |

○: Transparent, without clouding
Δ: Somewhat lacking in transparency
X: Transparency lost, odor produced 700 mL portions of treated water were placed in six vases, and the vases were replenished with newly treated water for the evaporated amount of water every third day. Six lilies with the substantially same size were placed in the respective six vases, and the test was carried out.

TABLE 4

| Sample No. | Days elapsed | | | |
|---|---|---|---|---|
| | 3 days | 6 days | 9 days | 12 days |
| (1) | ◉ | ○ | Δ | X |
| (2) | ◉ | ◉ | ○ | Δ |
| (3) | ◉ | ◉ | ◉ | ◉ |
| (4) | ◉ | ◉ | ◉ | ◉ |
| (5) | ◉ | ◉ | ◉ | ◉ |
| (6) | ◉ | ◉ | ◉ | ◉ |

◉: The lily remained very fresh and alive.
○: The lily remained satisfactory alive.
Δ: The lily lost some of its luster.
X: The lily wilted.

EXAMPLE 2

Figure 42:
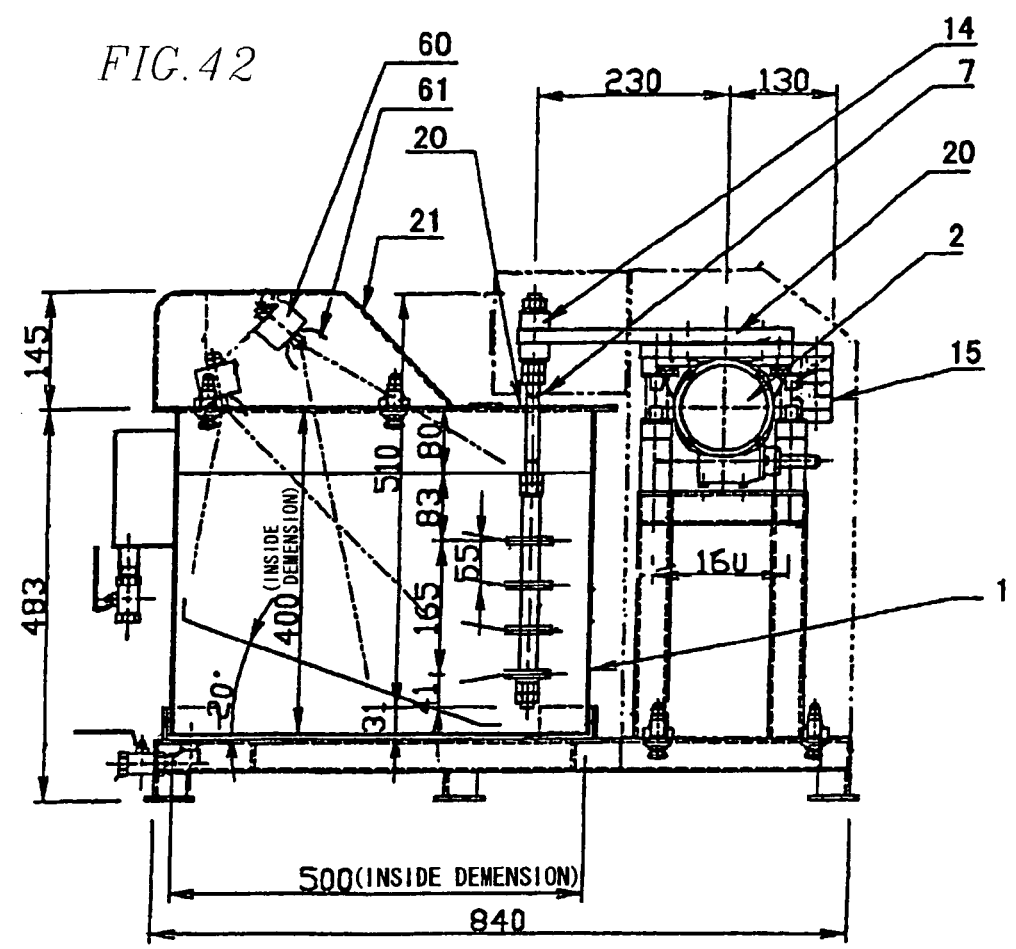
FIG. 42 is a cross-sectional diagram of the production apparatus for active antiseptic water or an active antiseptic water-based fluid of the present invention used in Example 2.
Figure 43:
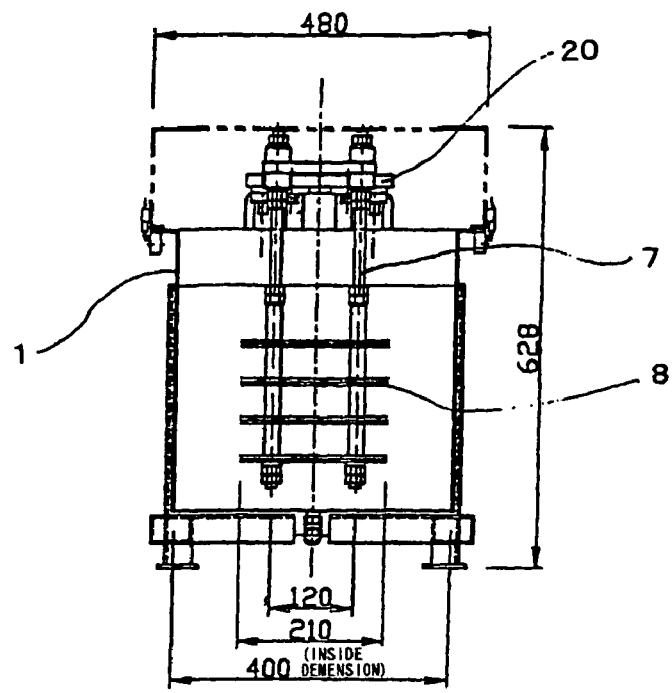
FIG. 43 is a side view of the vibrating stirring device portion in FIG. 42.
Figure 44:
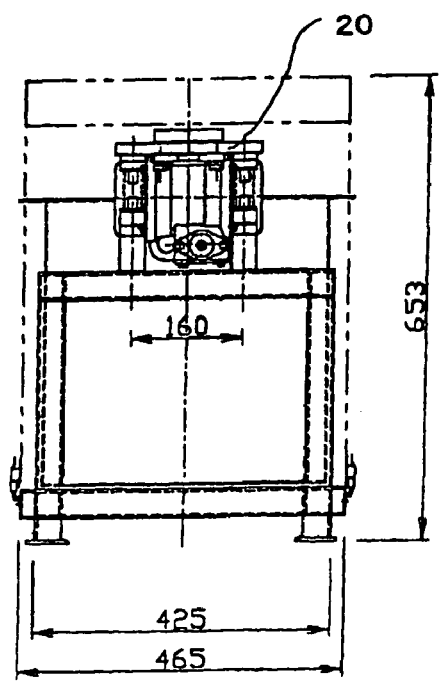
FIG. 44 is a side view from the right side of FIG. 43.

Using the device shown in FIGS. 42 to 44 (however, a magnetic material such as that shown in FIG. 8 is not mounted), the active antiseptic water of the present invention was produced from the water of an unnamed river.

Vibration stirring device: (Product Name: Ultravibration α-agitator, manufactured by Japan Techno)

Vibration motor: Uras Vibrator KEE-2-2B (150 W×200 V×3-phase), manufactured by Murakami M.F.G. Co., Ltd.

Vibration rods: Two titanium rods with a diameter of 16 mm

Vibration vanes: Vanes having a surface layer composed of an anatase-type titanium oxide on the surface of a titanium plate with a thickness of 0.6 mm.

A Teflon (registered trademark) was used as the synthetic resin sheet denoted by the symbol 33 in FIG. 4.

A titanium plate was used as the vibration vane-fixing member denoted by reference numeral 10 in FIG. 4.

Two UV lamps with a power of 10 W that emit near UV light, the central wavelength of which was 253.7 nm, were used as the UV light source.

The treatment tank was made of SUS304 with inside dimensions of 400×500×400 (height) mm.

A Fuji FVR-C9S inverter manufactured by Fuji Electric was used as the inverter, the vibrating stirring device was operated at 42 Hz at 20° C., and the amount of the sulfate ions ($SO_4^{2-}$) and that of sulfite ions ($SO_3^{2-}$) in the treated water were measured at fixed time intervals in the same manner as Example 1. The three-dimensional flow velocity produced by vibrating stirring was the same as that in Example 1.

The river water collected at a specific location was used for the treated fluid. The components of the river water are listed below. A simple measurement was carried out using a pack test.

TABLE 5

| Na | 7.5 mg/L |
|---|---|
| K | 2.3 mg/L |
| Ca | 8.2 mg/L |
| Mg | 4.5 mg/L |
| $HCO_3$ | 34.1 mg/L |
| $SO_4$ | 15.0 mg/L |
| Cl | 8.1 mg/L |
| $SiO_2$ | 15.4 mg/L |
| $NH_4$ | 0.0 mg/L |
| $SO_2$ | 0.0 mg/L |
| Evaporation residue | 75 mg/L |

The method for measuring sulfite ions is described below.

The sulfite ions were oxidized and converted into sulfate ions, the system was thereafter made into a hydrochloric acid solution. Then, a 10% $BaCl_2$ aqueous solution was dropped to form precipitations while the system was being stirred. The system was subjected to digestion for one hour, then, filtration, washing, and ignition. The resulting $BaSO_4$ was weighed.

TABLE 6

| Sample No. | Treatment time (h) | Sulfite ions (mg/L) | pH | Fluid Temp. (° C.) |
|---|---|---|---|---|
| (1) | 0 | 0 | 7.0 | 23 |
| (2) | 2 | 0.08 | 7.3 | 23 |
| (3) | 3 | 0.1 | 7.4 | 23 |
| (4) | 4 | 0.2 | 7.4 | 23 |
| (5) | 7 | 0.3 | 7.4 | 23 |
| (6) | 10 | 0.5 | 7.5 | 23 |

The treated water of this example exhibited substantially the same active antiseptic properties as that of Example 1 shown in TABLES 2 to 4.

Each of samples (1) to (6) was used to cook rice in an electric cooker. The resulting rice batches were placed in cooked-rice containers each, stored at 18° C., and the appearance, smell, and taste were examined. The results are shown in the table below.

TABLE 7

| Sample No. | Days elapsed | | | |
|---|---|---|---|---|
| | 3 days | 6 days | 9 days | 12 days |
| (1) | ○ | X | X | X |
| (2) | ○ | Δ | X | X |
| (3) | ○ | ○ | Δ | X |
| (4) | ○ | ○ | Δ | Δ |
| (5) | ○ | ○ | ○ | Δ |
| (6) | ○ | ○ | ○ | ○ |

○: Excellent appearance, smell, and taste
Δ: A slight odor
X: Moldy

EXAMPLE 3

An experiment for treating milk was carried out using the device shown in FIGS. 10 to 12.

The vibration motor and the vibrating stirring device used were the same as those used in Example, except that the UV light-leaking portion shown in FIGS. 13 to 17 was attached to the vibration vanes. The three-dimensional flow velocity was the same as that in Example 1.

An extra-high pressure mercury lamp with a power of 250 W (UV-light intensity: 4,000 mW/cm$^2$, dominant wavelength: 365 nm) manufactured by Moritex Corp. was used as the UV light source 71.

The properties of the resulting milk are shown in TABLES 8 and 9.

TABLE 8

| Sample No. | Treatment time (h) | Nitrite ions (mg/L) | Treatment Temp. (°C.) |
|---|---|---|---|
| A | 0 | 0.00 | 24 |
| B | 1 | 0.04 | 24 |
| C | 3 | 0.08 | 24 |
| D | 7 | 0.15 | 24 |

TABLE 9

| Sample No. | Storage stability (5° C. in a refrigerator) | | | | Number of general bacteria (bacteria/mL) |
|---|---|---|---|---|---|
| | Days elapsed | | | | |
| | 1 day | 2 days | 4 days | 6 days | |
| A | ○ | ○ | Δ | X | 3000 |
| B | ○ | ○ | ○ | ○ | 40 or less |
| C | ○ | ○ | ○ | ○ | 40 or less |
| D | ○ | ○ | ○ | ○ | 40 or less |

○: Normal
Δ: Texture causes worry about drinking
X: Foul smell

The number of general bacteria was determined to be the total dependent culture bacteria composed of aerobic and anaerobic bacterium that formed colonies after 24 hours had elapsed in a standard agar medium (36° C.±1° C.).

EXAMPLE 4

Tap water was treated in the same manner as Example 1 in which the device shown in FIGS. 31 to 33 was used.

Vibration stirring device: (Product Name: Insulated Ultravibration agitator α-EXI, manufactured by Japan Techno)

Vibration motor: Uras Vibrator KEE-2-2B (75 W×200 V×3-phase), manufactured by Murakami M.F.G. Co., Ltd.

Vibration rods: Two titanium rods with a diameter of 12 mm

Vibration vanes (forward direction): Vanes having a surface layer made of an anatase-type titanium oxide on the surface of a titanium plate.

Vibration auxiliary vanes:
Anode: Three platinum-plated titanium lath net
Cathode: Two titanium plates
Electrolysis conditions:
A direct current power source (4A, 5V) was used to send current between the anode and the cathode by the inverter control method with a Power Master manufactured by Chuo Seisakusho, Ltd.
Treatment tank: A heat-resistant vinyl chloride resin tank
Inside dimensions: 300×200×250 (H) mm
UV-light: Two UV-lamps (black light) with a power of 0.14 kW were used in accordance with the method of FIG. 9.

The insulated vibrating stirring device was driven at 43 Hz with an inverter. The three-dimensional flow velocity of the treatment water was 200 mm/second. The treated water had greater bactericidal ability than the treated water of Example 1. The bactericidal effect was maintained even after a one-month storage.

The treated water obtained by 10 hours of treatment in this example had 1 mg/L of nitrite ions and a reduction potential of 120 mV. A tomato was placed in the treatment tank and treated for two hours at 22° C. while the treated water was circulated between a large tank and the treatment tank. The tomato was then washed and the surface was inspected. The results are shown in the following table.

TABLE 10

| | Number of general bacteria | |
|---|---|---|
| | Before treatment | After treatment |
| Treated water of Example 4 | 10$^5$ bacteria/mL | 40 bacteria/mL or less |
| Tap water | 10$^5$ bacteria/mL | 1,000 bacteria/mL or less |

Because the treated water of the present example had been subjected to electrolysis, it improved the bactericidal, antiseptic properties to a greater extent than the treated waters of Examples 1 to 3.

The number of general bacteria was determined to be the total dependent culture bacteria composed of aerobic and anaerobic bacterium that formed colonies after 24 hours had elapsed in a standard agar medium (36° C.±1° C.).

EXAMPLE 5

The same apparatus as that used in Example 2, in which only a photocatalyst layer had been used on the surface of the vibration vanes, was used, except that a mixed layer of Ag and an anatase-type titanium oxide was employed as the surface of the vibration vanes. The mixed layer was formed by plating a titanium plate in an Ag-plating bath in which anatase-type titanium oxide particles (0.1 to 0.3 μm) were dispersed.

When the water obtained was used as washing water for finishing printed boards, mold did not grow even after the boards were left standing for three months at 25° C. and a humidity of 65%. On the other hand, when distilled water was used to wash and finish the same boards, mold grew after one week.

EXAMPLE 6

Treated water equivalent to sample (3) of Example 2 was used to produce sake by a normal brewing procedure in which base water, malt, and steamed rice were added to yeast mash three times in three days and allowed to ferment for a month. The liquor manufactured in Example 6 in this manner and commercially available sake were stored at 20° C., and the results of an examination for transparency are shown in the following table.

TABLE 11

|  | First day | After a month | After 6 months | After a year |
|---|---|---|---|---|
| Sake of Example 6 | Transparent | Transparent | Transparent | Transparent |
| Commercially available liquor | Transparent | Transparent | Some turbidity present | Clouded |

EXAMPLE 7

A Roscat (phonetic) grape was squeezed using a common method. The grape juice was collected, and diluted by adding water in a 1-to-1 ratio to a grape juice.

The water of sample No. (6) of Example 2 was used as the water in case A, and for comparison, tap water from the headquarters of Japan Techno was used as the water for case B. The results of the storage stability of cases A and B are shown in the following table.

TABLE 12

|  | Normal temperature storage | | Refrigerated (5° C.) storage | | |
|---|---|---|---|---|---|
|  | 2 days | 12 days | 2 days | 10 days | 30 days |
| Case A | ◯ | ◯ | ◯ | ◯ | ◯ |
| Case B | X | X | ◯ | X | X |

◯: No spoilage, can be consumed
X: Spoiled

EXAMPLE 8

(1) Vibration Stirring Device: (Product Name: Ultravibration α-Agitator, Model 2, Manufactured by Japan Techno; the Type Shown in FIGS. 1 and 2)

Vibration motor: Uras Vibrator KEE-2-2B (150 W×200 V×3-phase), manufactured by Yasukawa Electric Corp.

Vibration rods: Two titanium rods with a diameter of 16 mm

Vibration vanes: Five, with a thickness of 6 mm and made of titanium

Vibration vane fixing members: 10, made of titanium

Treatment tank: SUS 304,

Inside dimensions: 400×300×350 (height) mm.

Inverter: Fuji inverter FVR-C9S, manufactured by Fuji Electric

Treatment bath temperature: 20° C., and vibrationally stirred at 45 Hz (2) UV Light Source: (Type Shown in FIG. 9)

UV light: KLST-200, manufactured by Okaya Denki Sangyo 9 lights with an emission wavelength of 25.4 nm and an output of 3.2 W were set to one side of each fixed plate between the adjacent fixed plates each.

(3) Photocatalyst Set: (Refer to FIGS. 36 to 38)

As shown in FIG. 38, 10 titanium plates (dimensions: 160×100×5 mm) arranged in parallel at 25 mm intervals were used as the plate-like bodies having a photocatalyst layer. On the surface of the photocatalyst layer was formed an anatase-type titanium oxide layer.

The titanium oxide layer was a $Zn-Ni-TiO_2$ composite plated layer formed by composite electroplating in a mixed bath of $ZnSO_4-NiSO_4$ containing anatase-type titanium oxide particles (particle diameter: 0.1 to 0.3 μm). The sides of the fixed plates were set so as to face the vibrating stirring device, which means that the fixed plates were set so as to provide the least interference to the vibration stirring action. The distance between the distal ends of the vibration vanes and the sides of the fixed plates was 50 mm.

(4) Treatment

About 20 to 350 ppm of potassium metabisulfite ($K_2S_2O_5$) is ordinarily added to stum, which is the starting material for red wine prior to fermentation. In the present example, however, the stum prior to fermentation was subjected to photocatalytic UV light irradiation and vibration stirring for 2 hours at 20° C. using the above-described device, in lieu of adding $K_2S_2O_5$, and then a normal fermentation step was carried out.

For comparison, the same fermentation step was carried out without adding $K_2S_2O_5$, using stum that was not subjected to photocatalytic UV light irradiation and vibration stirring treatment.

The results are shown in the following table.

TABLE 13

|  |  | Example | Comparative example |
|---|---|---|---|
| Immediately after production | External appearance | Transparent | Transparent |
|  | Taste | Not pungent | Pungent |
| Stored for 1 month at 20° C. | External appearance | Transparent | Somewhat cloudy |
|  | Taste | Smooth | Slight odor with slightly inferior taste |

EXAMPLE 9

Example 1 was repeated and the chlorine ion, nitrate ion, nitrite ion concentrations were measured at the time the water was collected, after 10-minute treatment, and after 30-minute treatment. The measurement methods were carried out in accordance with JIS K0102, JIS K0102 43.2 (1998), and JIS K0102 43.1 (1998). The results are shown in TABLE 14.

TABLE 14

| Treatment time | pH | Temp. (° C.) | Chlorine ion concentration (mg/L) | Nitrate ion concentration (mg/L) | Nitrite ion concentration (mg/L) |
|---|---|---|---|---|---|
| Collection | 7.6 | 20 | 0.70 | 2.5 | 0 |
| 10 minutes | 7.6 | 20 | 0.00 | 2.5 | 0 |
| 30 minutes | 7.6 | 20 | 0.00 | 2.5 | 0 |

EXAMPLE 10

Example 2 was repeated and the chlorine ion, sulfate ion, sulfite ion concentrations were measured at the time the water was collected, after 10-minute treatment, and after 30-minute treatment, using the same methods described above. The results are shown in TABLE 15.

TABLE 15

| Treatment time | pH | Temp. (°C.) | Chlorine ion concentration (mg/L) | Sulfate ion concentration (mg/L) | Sulfite ion concentration (mg/L) |
|---|---|---|---|---|---|
| Collection | 7.0 | 20 | 8.10 | 0.15 | 0 |
| 10 minutes | 7.0 | 20 | 0.50 | 0.15 | 0 |
| 30 minutes | 7.0 | 20 | 0.00 | 0.15 | 0 |

EXAMPLE 11

Using the device shown in FIGS. 39 to 41, 12 liters of tap water was treated for 30 to 60 minutes, as shown in FIGS. 16 to 19. It was found that satisfactory drinking water was obtained by the treatment of the present invention.

Vibration stirring device: (Ultravibration agitator: Product name: BB cleaner, tabletop model, manufactured by Japan Techno)

Vibration motor: 75 W×200 V×3-phase

Vibration rods: Two, with a diameter of 16 mm and made of stainless steel

Vibration vanes: Four vanes having a surface layer composed of an anatase-type titanium oxide on the surface of a titanium plate with a thickness of 0.6 mm (the surface layer is composed of photocatalytic $TiO_2$ particles (particle diameter: 0.1 to 0.3 μm))

A Teflon (registered trademark) was used as the synthetic resin sheet denoted by reference numeral 33 in FIG. 4.

A titanium plate was used as the vibration vane-fixing member denoted by reference numeral 10 in FIG. 4.

Two black light UV lamps with a power of 10 W (FL10BLB-A, manufactured by Toshiba, central wavelength at 352 nm) were used as the UV light source.

The treatment tank was made of SUS304 with inside dimensions of 200×300×290 (height) mm.

A Fuji FVR-C9S inverter manufactured by Fuji Electric was used as the inverter. The vibrating stirring device was operated at 45 Hz at 20° C., and the components contained in the treated water were measured after 30-minute treatment and after 60-minute treatment.

Vibrations produced by the vibrating stirring device caused the water to flow, and the flow velocity was 240 mm/second when measured with a three-dimensional electromagnetic flow meter (ACM300-A, manufactured by Alec Electronics)

TABLE 16

| | | | Water quality inspection | | |
|---|---|---|---|---|---|
| Remarks | Items | Reference value | Before treatment | 30 minutes | 60 minutes |
| Pathogenic organisms | General bacteria | 100 counts/mL or less | 0 bacteria /mL | 0 | 0 |
| | E. coli bacteria | Must not be detected | Not detected | Not detected | Not detected |
| Inorganic substances and heavy metals | Cadmium | 0.01 mg/L or less | 0.00 mg/L | Not detected | Not detected |
| | Mercury | 0.0005 mg/L or less | 0.00 mg/L | Not detected | Not detected |

TABLE 16-continued

| | | | Water quality inspection | | |
|---|---|---|---|---|---|
| Remarks | Items | Reference value | Before treatment | 30 minutes | 60 minutes |
| | Selenium | 0.01 mg/L or less | 0.00 mg/L | Not detected | Not detected |
| | Lead | 0.05 mg/L or less | 0.00 mg/L | Not detected | Not detected |
| | Arsenic | 0.01 mg/L or less | 0.00 mg/L | Not detected | Not detected |
| | Hexad Chrome | 0.05 mg/L or less | 0.00 mg/L | Not detected | Not detected |
| | Cyanogen | 0.01 mg/L or less | 0.00 mg/L | Not detected | Not detected |
| | Nitrate nitrogen and nitrite nitrogen | 10 mg/L or less | 2.0 mg/L | Not detected | Not detected |
| | Fluorine | 0.8 mg/L or less | 0.11 mg/L | Not detected | Not detected |
| Sterilization byproducts | Chloroform | 0.06 mg/L or less | 0.0095 mg/L | Not detected | Not detected |
| | Dibromo chloromethane | 0.1 mg/L or less | 0.0034 mg/L | Not detected | Not detected |
| | Bromo dichloromethane | 0.03 mg/L or less | 0.0068 mg/L | Not detected | Not detected |
| | Bromoform | 0.09 mg/L or less | 0.0004 mg/L | Not detected | Not detected |
| | Trihalomethanes | 0.1 mg/L or less | 0.020 mg/L | 0.05 | 0.03 |
| Agricultural chemicals | 1,3-Dichloropropene (D-D) | 0.002 mg/L or less | 0.00 mg/L | Not detected | Not detected |
| | Simazine (CAT) | 0.003 mg/L or less | 0.00 mg/L | Not detected | Not detected |
| | Thiuram (thiram) | 0.006 mg/L or less | 0.00 mg/L | Not detected | Not detected |
| | Thiobencarb (benthiocarb) | 0.02 mg/L or less | 0.00 mg/L | Not detected | Not detected |

TABLE 17

| | | | Water quality inspection | | |
|---|---|---|---|---|---|
| Remarks | Items | Reference value | Before treatment | 30 minutes | 60 minutes |
| Color | Zinc | 1.0 mg/L or less | 0.00 mg/L | 0.00 | 0.00 |
| | Iron | 0.3 mg/L or less | 0.00 mg/L | 0.00 | 0.00 |
| | Copper | 1.0 mg/L or less | 0.00 mg/L | 0.00 | 0.00 |
| Taste | Sodium | 200 mg/L or less | 10 mg/L | 10 | 10 |
| Color | Manganese | 0.05 mg/L or less | 0.00 mg/L | 0.00 | 0.00 |
| Taste | Chlorine ions | 200 mg/L or less | 15.5 mg/L | 0.00 | 0.00 |
| | Calcium, magnesium, etc. (intensity) | 300 mg/L or less | 41.5 mg/L | 41.5 | 41.5 |
| | Evaporation residue | 500 mg/L or less | 110 mg/L | 110 | 110 |
| Foaming | Anionic surfactant | 0.2 mg/L or less | 0.00 mg/L | 0.00 | 0.00 |

TABLE 17-continued

<table>
<tr><th rowspan="3">Remarks</th><th rowspan="3">Items</th><th rowspan="3">Reference value</th><th colspan="3">Water quality inspection</th></tr>
<tr><th>Before treatment</th><th>30 minutes</th><th>60 minutes</th></tr>
<tr></tr>
<tr><td>Odor</td><td>1,1,1-trichloro-ethane</td><td>0.3 mg/L or less</td><td>0.00 mg/L</td><td>0.00</td><td>0.00</td></tr>
<tr><td></td><td>Phenols</td><td>0.005 mg/L or less</td><td>0.00 mg/L</td><td>0.00</td><td>0.00</td></tr>
<tr><td>Taste</td><td>Organic substances, etc. (amount of potassium permanganate consumed)</td><td>10 mg/L or less</td><td>1.2 mg/L</td><td>1.2</td><td>1.2</td></tr>
<tr><td>Basic properties</td><td>pH value</td><td>5.8 or higher, 8.6 or less</td><td>7.2</td><td>7.0</td><td>7.0</td></tr>
<tr><td></td><td>Taste</td><td>Must not be abnormal</td><td>No abnormality</td><td>7.0</td><td>7.0</td></tr>
<tr><td></td><td>Odor</td><td>Must not be abnormal</td><td>No abnormality</td><td>7.0</td><td>7.0</td></tr>
<tr><td></td><td>Chromaticity</td><td>5 mg/L or less</td><td>0 mg/L</td><td>0</td><td>0</td></tr>
<tr><td></td><td>Turbidity</td><td>2 mg/L or less</td><td>0 mg/L</td><td>0</td><td>0</td></tr>
</table>

TABLE 18

<table>
<tr><th rowspan="3">Remarks</th><th rowspan="3">Items</th><th rowspan="3">Target value</th><th colspan="3">Water quality inspection</th></tr>
<tr><th>Before treatment</th><th>30 minutes</th><th>60 minutes</th></tr>
<tr></tr>
<tr><td>Color</td><td>Manganese</td><td>0.01 mg/L or less</td><td>0.00 mg/L</td><td>Not detected</td><td>Not detected</td></tr>
<tr><td></td><td>Aluminum</td><td>0.2 mg/L or less</td><td>0.00 mg/L</td><td>Not detected</td><td>Not detected</td></tr>
<tr><td>Odor</td><td>Evaporation residue</td><td>ca. 1 mg/L or less</td><td>0.7 mg/L</td><td>0.05</td><td>0.05</td></tr>
<tr><td></td><td>Odor intensity (TON)</td><td>3 or less</td><td>1</td><td>1</td><td>1</td></tr>
<tr><td>Taste</td><td>Free carbon</td><td>20 mg/L or less</td><td>0.00 mg/L</td><td>0.00</td><td>0.00</td></tr>
<tr><td></td><td>Organic substances, etc. (amount of potassium permanganate consumed)</td><td>3 mg/L or less</td><td>1.2 mg/L</td><td>1.2</td><td>1.2</td></tr>
<tr><td></td><td>Calcium, magnesium, etc. (hardness)</td><td>10 mg/L or more, 100 mg/L or less</td><td>41.5 mg/L</td><td>41.5</td><td>41.5</td></tr>
<tr><td></td><td>Evaporation residue</td><td>30 mg/L or more, 200 mg/L or less</td><td>110 mg/L</td><td>110</td><td>110</td></tr>
<tr><td>Turbidity</td><td>Turbidity</td><td>(*1)</td><td>0.00 degree</td><td>0.00</td><td>0.00</td></tr>
<tr><td>Decay</td><td>Langelier index</td><td>ca. −1 or higher, but as near to 0 as possible</td><td>−1.6</td><td>−1.6</td><td>−1.6</td></tr>
<tr><td></td><td>pH value</td><td>ca. 7.5</td><td>7.5</td><td>7.5</td><td>7.5</td></tr>
</table>

(*1)... 1 degree or less at water faucet, 0.1 degree or less at water distribution facility intake port

TABLE 19

<table>
<tr><th rowspan="3">Remarks</th><th rowspan="3">Items</th><th rowspan="3">Index value</th><th colspan="3">Water quality inspection</th></tr>
<tr><th>Before treatment</th><th>30 minutes</th><th>60 minutes</th></tr>
<tr></tr>
<tr><td>When chlorine dioxide is used as the oxidant/Disinfectant</td><td>Chlorine dioxide</td><td>0.6 mg/L less</td><td>Not or detected</td><td>Not detected</td><td>Not detected</td></tr>
<tr><td></td><td>Nitrite ions</td><td>0.6 mg/L or less</td><td>0.1 mg/L</td><td>0.2</td><td>0.2</td></tr>
<tr><td>Sterilization byproducts</td><td>Formaldehyde</td><td>0.08 mg/L or less (tentative)</td><td>0.006 mg/L</td><td>0.00</td><td>0.00</td></tr>
<tr><td></td><td>Dichloroacetic acid</td><td>0.02 mg/L or less (tentative)</td><td>0.003 mg/L</td><td>Not detected</td><td>Not detected</td></tr>
<tr><td></td><td>Trichloroacetic acid</td><td>0.3 mg/L or less (tentative)</td><td>0.002 mg/L</td><td>Not detected</td><td>Not detected</td></tr>
<tr><td></td><td>Dichloroacetonitrile</td><td>0.08 mg/L or less (tentative)</td><td>0.00 mg/L</td><td>Not detected</td><td>Not detected</td></tr>
<tr><td></td><td>Chloral hydrate</td><td>0.03 mg/L or less (tentative)</td><td>0.007 mg/L</td><td>Not detected</td><td>Not detected</td></tr>
<tr><td>Unintended byproducts</td><td>Dioxins</td><td>pg-TEQ/L or less (tentative)</td><td>0.00 degree</td><td>0.000</td><td>0.000</td></tr>
</table>

*TEQ = Total Equivalent Quality
pg = pico gram

EXAMPLE 12

The steps of Example 11 were repeated, except that the vibrating stirring device was operated at 40 Hz using the inverter. Also tested for comparison was the case in which the fluid was exposed to UV light without vibrational stirring. The results are shown in TABLE 20.

TABLE 20

<table>
<tr><th rowspan="2">Treatment time</th><th colspan="2">Chlorine ion concentration (ppm)</th></tr>
<tr><th>Example 12</th><th>Comparative example</th></tr>
<tr><td>Start</td><td>20</td><td>20</td></tr>
<tr><td>5 minutes</td><td>0.05</td><td>20</td></tr>
<tr><td>10 minutes</td><td>0.00</td><td>20</td></tr>
<tr><td>30 minutes</td><td>0.00</td><td>20</td></tr>
</table>

The chlorine ion concentration was measured in accordance with JIS K0102.

EXAMPLE 13

Vibration stirring device: (Product Name: Ultravibration sterilizing α-agitator BB-cleaner, tabletop model, manufactured by Japan Techno)

Vibration motor: Uras Vibrator KEE-2-2B (75 W×200 V×3-phase), manufactured by Murakami M.F.G. Co., Ltd.

Vibration rods: Two titanium rods with a diameter of 16 mm

Vibration vanes (forward direction): Titanium plates with a thickness of 6 mm (The vibration vanes of this example were not provided with an anatase-type titanium oxide layer on the surface of the titanium plates because the photocatalyst set described below is used.)

Inverter: Manufactured by Fuji Electric

Photocatalyst set (refer to FIGS. 36 to 38): A set consisting of 10 titanium plates having an anatase-type titanium oxide layer, arranged at intervals of 25 mm was used as the plate-like bodies having a photocatalyst layer shown in FIG. 38.

Treatment tank: Stainless steel
Inside dimensions: 300×200×290 (H) mm
UV-light: Two UV-lamps (black light) with a power of 10 W were used in accordance with the method of FIG. 9

The insulated vibrating stirring device was driven at 42 Hz with an inverter. The three-dimensional flow velocity of the treated water was 200 mm/second. The treated water was tap water, and 0.7 mg/L of residual chlorine was contained in the water prior to treatment. However, the level was reduced to 0.00 mg/L after 15-minute treatment.

Goldfish and carp were raised in the treated water, and very good results were obtained.

The treated water was also used as the water for a flower arrangement, and the life of the arranged flowers was extended by about 5 times in comparison with normal water.

EXAMPLE 14

Using the same device as in Example 1, 12 liters of raw tap water was placed in the treatment tank, and the vibrating stirring device was driven at 40 Hz. For comparison, raw tap water was treated by UV irradiation alone, without the operation of the vibrating stirring device. The relationship between the treatment time and the chlorine concentration in the treated water is shown in the following table.

TABLE 21

| | Chlorine content | |
|---|---|---|
| Treatment time | Present Example (vibrational stirring and UV irradiation) | Comparative example (only UV irradiation) |
| Start | 20 ppm | 20 ppm |
| 5 minutes | 0.05 ppm | 15 ppm |
| 10 minutes | 0.00 ppm | 10 ppm |
| 30 minutes | 0.00 ppm | 8 ppm |

The method for measuring the chlorine content was in accordance with JIS K0102 (1986).

The concentration of nitrate nitrogen ($NO_3^-$) and nitrite nitrogen ($NO_2^-$), which are the nitrate ions in the present example, are shown in the following table.

TABLE 22

| | Before treatment | After 10-minute treatment | Measurement method (20° C.) |
|---|---|---|---|
| Nitrate nitrogen $NO_3^-$ | 0.25 mg/L | 0.25 mg/L | JIS K0102 43-2(1998) |
| Nitrite nitrogen $NO_2^-$ | 0.0 mg/L | 0.0 mg/L | JIS K0102 43-2(1998) |
| PH | 7.6 | 7.5 | |
| Residual chlorine | 20 mg/L | 0.00 mg/L | JIS K0102 (1986) |

What is claimed is:

1. A production method for active antiseptic water or an active antiseptic water-based fluid that contains 0.08 to 0.5 mg/L of nitrite ions and/or sulfite ions, and that contains substantially no chlorine, the method comprising:
using a treatment apparatus having:
a treatment tank,
a vibrating stirrer disposed inside the treatment tank and comprising an insulated vibrating stirrer having a vibration generator, a vibration rod connected to the vibration generator or a linkage section between the vibration generator and the vibration rod, at least one vibration vane for vibration and at least one auxiliary vane fixed to the vibration rod, wherein the auxiliary vane is substantially devoid of vibration ability, a vibration vane-fixing member, and an insulation member for electrically separating the vibration rod or a vibration transmission member in a non-immersed position in a treatment bath, near the vibration generator and away from the vibration vane and auxiliary vane,
a photocatalyst layer or a layer having a photocatalyst and a bactericidal metal, disposed on any surface inside the treatment tank, and
a light irradiator for emitting light to the photocatalyst layer or the layer having a photocatalyst and a bactericidal metal, disposed inside and/or outside the treatment tank;
placing water or a water-containing fluid to be treated in the treatment tank;
generating a desired vibration between 10 and 200 Hz in the at least one vibration vane by the vibration generator to cause the at least one vibration vane to vibrate at an amplitude of 0.01 to 15 mm;
irradiating the photocatalyst layer or the photocatalyst and bactericidal metal with light for 30 minutes or longer; and
allowing electric current to flow for 30 minutes or longer in the water or water-containing fluid to be treated to break down, reduce, or remove halogen components in the water, and convert one or more of the nitrogen components contained in the water into nitrite ions, and sulfur components into sulfite ions, wherein
the at least one auxiliary vane or a combination of the at least one auxiliary vane and at lease one component selected from a group of the vibration generator, the vibration rod, and the vibration vane-fixing member serves as an anode or a cathode.

2. The production method according to claim 1, wherein the treatment apparatus further comprises a magnetic force generation member disposed inside the treatment tank.

3. The production method according to claim 1, wherein the photocatalyst layer or the layer comprising a photocatalyst and a bactericidal metal is disposed in such a way to cover at least a portion of the vibration vane or the auxiliary vane.

4. The production method according to claim 1, wherein a flow velocity of the treated fluid produced by vibration stirring is 150 mm/second or higher as measured with a three-dimensional electromagnetic flow meter.

5. The production method according to claim 1, wherein one or more of the treated fluid, the photocatalyst layer, and the layer comprising a photocatalyst and a bactericidal metal are exposed to ultrasonic waves.

6. A production apparatus for active antiseptic water or an active antiseptic water-based fluid, comprising:
a treatment tank;
a vibrating stirrer disposed inside the treatment tank comprising
an insulated vibrating stirrer having a vibration generator, a vibration rod connected to the vibration generator or a linkage section between the vibration generator and the vibration rod, at least one vibration vane for vibration and at least one auxiliary vane fixed to the vibration rod, wherein the auxiliary vane is substantially devoid of vibration ability, a vibration vane-fixing member, and an insulation member for electrically separating the vibration rod or the vibration transmission member in a non-immersed position in the treatment bath, near the vibration generator and away from the vibration vane and auxiliary vane;
a photocatalyst layer or a layer having a photocatalyst and a bactericidal metal, disposed on any surface inside the treatment tank; and
a light irradiator for emitting light to the photocatalyst layer or the layer having a photocatalyst and a bactericidal metal, disposed inside or outside the treatment tank, wherein the light irradiator comprises a light source, a light-leaking portion disposed near and/or in close contact with the photocatalyst layer or the layer having a photocatalyst and a bactericidal metal inside the treatment tank, and an optical fiber for optically connecting the light source and the light-leaking portion, and wherein the at least one auxiliary vane or a combination of the at least one auxiliary vane and at least one component selected from a group of the vibration generator, the vibration rod, and the vibration vane-fixing member serves as an anode or a cathode.

7. The production apparatus according to claim 6, further comprising a magnetic force generation member disposed inside the treatment tank.

8. The production apparatus according to claim 6, wherein the photocatalyst layer or the layer having a photocatalyst and a bactericidal metal is disposed in such a way to cover a portion of the vibration vane and/or auxiliary vane.

9. The production apparatus according to claim 6, wherein the photocatalyst layer or the layer having a photocatalyst and a bactericidal metal, and the light-leaking portion are formed on at least a portion of a plate-like body, and one or more plate-like bodies are disposed inside the treatment tank facing in a direction that least obstructs a flow produced by vibration generator.

10. The production apparatus according to claim 6, further comprising an ultrasonic emitter.

11. A method for breaking down, reducing, or removing halogen components contained in water, the method comprising:
using a treatment apparatus having:
a treatment tank,
a vibrating stirrer disposed inside the treatment tank, the vibrating stirrer comprising:
an insulated vibrating stirrer having (a) a vibration generator, (b) a vibration rod connected to the vibration generator or a linkage section between the vibration generator and the vibration rod, at least one vibration vane for vibration and at least one auxiliary vane fixed to the vibration rod, wherein the auxiliary vane is substantially devoid of vibration ability, a vibration vane-fixing member, and an insulation member for electrically separating the vibration rod or the vibration transmission member disposed in a non-immersed position in a treatment bath, near the vibration generator and away from the vibration vane and the auxiliary vane,
a photocatalyst layer or a layer having a photocatalyst and a bactericidal metal, disposed on any surface inside the treatment tank, and
a light irradiator for emitting light to the photocatalyst layer or the layer having a photocatalyst and a bactericidal metal, disposed inside or outside the treatment tank;
placing water or a water-containing fluid to be treated in the treatment tank; and carrying out the following steps for 1 minute or longer and less than 30 minutes:
generating a desired vibration between 10 and 200 Hz in a vibration vane by using a vibration generator, and transmitting the vibrations to the vibration vane to cause the vibration vane to vibrate at an amplitude of 0.01 to 15 mm,
irradiating the photocatalyst or the photocatalyst and bactericidal metal with light, and
allowing electric current to flow in the water or water-containing fluid to be treated, wherein the at least one auxiliary vane or a combination of the at least one auxiliary vane and at least one component selected from a group of the vibration generator, the vibration rod, and the vibration vane-fixing member serves as an anode or a cathode.

12. The method according to claim 11, wherein the treatment apparatus further comprises a magnetic force generation member disposed inside the treatment tank.

13. The method according to claim 11 or 12, wherein the photocatalyst layer or the layer comprising a photocatalyst and a bactericidal metal is disposed in such a way to cover a portion of the vibration vane and/or auxiliary vane.

14. The method according to claims 11 or 12, wherein a flow velocity of the treated fluid produced by vibration stirring is 150 mm/second or higher, measured with a three-dimensional electromagnetic flow meter.

15. The method according to claims 11 or 12, wherein one or more of the treated fluid, the photocatalyst layer, and the layer comprising a photocatalyst and a bactericidal metal are exposed to ultrasonic waves.

16. An apparatus for breaking down, reducing, or removing halogen components contained in water, comprising:
a treatment tan
k,
a vibrating stirrer disposed inside the treatment tank, comprising
an insulated vibrating stirrer having a vibration generator, a vibration rod connected to the vibration generator or a linkage section between the vibration generator and the vibration rod, at least one vibration vane for vibration and at least one auxiliary vane fixed to the vibration rod, wherein the auxiliary vane is substantially devoid of vibration ability, a vibration vane-fixing member, and an insulation member for electrically separating the vibration rod or the vibration transmission member disposed in a non-immersed position in a treatment bath, near the vibration generator and away from the vibration vane and the auxiliary vane,
a photocatalyst layer or a layer having a photocatalyst and a bactericidal metal, disposed on any surface inside the treatment tank, and
a light irradiator for emitting light to the photocatalyst layer or the layer having a photocatalyst and a bactericidal metal, disposed inside and/or outside the treatment tank, wherein the light irradiator comprises a light source, a light-leaking portion disposed near or in close contact with the photocatalyst layer or the layer having a photocatalyst and a bactericidal metal inside the treatment tank, and an optical fiber for optically connecting the light source and the light-leaking portion, wherein the at least one auxiliary vane or a combination of the at least one auxiliary vane and at least one component selected from a group of the vibration generator, the vibration rod, and the vibration vane-fixing member serves as an anode or a cathode.

17. The apparatus according to claim 16, further comprising a magnetic force generation member disposed inside the treatment tank.

18. The apparatus according to claim 16, wherein the photocatalyst layer or the layer having a photocatalyst and a bactericidal metal is disposed in such a way to cover a portion of one or more of the vibration vane and the auxiliary vane.

19. The apparatus according to claim 16, wherein the photocatalyst layer, or the layer having a photocatalyst and a bactericidal metal, and the light-leaking portion are formed on at least a portion of a plate-like body, and one or more plate-like bodies are disposed inside the treatment tank, facing in a direction that least obstructs a flow produced by vibration generator.

20. The apparatus according to claim 16, further comprising an ultrasonic emitter.

21. The apparatus according to claim 6, wherein said at least one vibration vane vibrates at an amplitude of 0.01 to 15 mm at a vibration frequency between 10 and 100 Hz.

22. The apparatus according to claim 16, wherein said at least one vibration vane vibrates at an amplitude of 0.01 to 15 mm at a vibration frequency between 10 and 100 Hz.

* * * * *